(12) United States Patent
Signorelli et al.

(10) Patent No.: US 9,515,499 B2
(45) Date of Patent: Dec. 6, 2016

(54) PRODUCTION LOGGING INSTRUMENT

(71) Applicant: FastCAP SYSTEMS Corporation, Boston, MA (US)

(72) Inventors: Riccardo Signorelli, Boston, MA (US); John J. Cooley, Boston, MA (US); Morris Green, Brighton, MA (US); Ira M. Turner, Niantic, CT (US); Jenna McGrath, Cambridge, MA (US); Padmanaban Sasthan Kuttipillai, Malden, MA (US)

(73) Assignee: FastCAP Systems Corporation, Boston, MA (US)

( * ) Notice: Subject to any disclaimer, the term of this patent is extended or adjusted under 35 U.S.C. 154(b) by 578 days.

(21) Appl. No.: 13/669,396

(22) Filed: Nov. 5, 2012

(65) Prior Publication Data

US 2013/0271066 A1 Oct. 17, 2013

Related U.S. Application Data

(60) Provisional application No. 61/555,100, filed on Nov. 3, 2011, provisional application No. 61/624,080, filed on Apr. 13, 2012.

(51) Int. Cl.
| | |
|---|---|
| *H02J 7/00* | (2006.01) |
| *E21B 41/00* | (2006.01) |
| *E21B 47/01* | (2012.01) |
| *E21B 47/12* | (2012.01) |
| *G01V 11/00* | (2006.01) |

(52) U.S. Cl.
CPC ......... *H02J 7/0042* (2013.01); *E21B 41/0085* (2013.01); *E21B 47/011* (2013.01); *E21B 47/122* (2013.01); *G01V 11/002* (2013.01)

(58) Field of Classification Search
USPC ....................................................... 320/107
See application file for complete search history.

(56) References Cited

U.S. PATENT DOCUMENTS

| | | | | |
|---|---|---|---|---|
| 3,824,129 | A * | 7/1974 | Fagan ........................ | 429/162 |
| 4,849,699 | A * | 7/1989 | Gill et al. .................. | 324/339 |
| 5,493,626 | A * | 2/1996 | Schultz et al. ............. | 385/101 |
| 6,843,119 | B2 | 1/2005 | Patey et al. | |
| 7,699,102 | B2 | 4/2010 | Storm et al. | |
| 2003/0048697 | A1 | 3/2003 | Hirsch et al. | |
| 2010/0066560 | A1* | 3/2010 | McDaniel et al. ......... | 340/854.9 |
| 2010/0182075 | A1* | 7/2010 | Yang et al. .................. | 327/540 |
| 2011/0080689 | A1 | 4/2011 | Bielawski et al. | |

FOREIGN PATENT DOCUMENTS

EP 1918508 5/2008

* cited by examiner

*Primary Examiner* — Robert Grant
(74) *Attorney, Agent, or Firm* — Wolf, Greenfield & Sack PC

(57) ABSTRACT

A logging system and method for operating a logging system are typically used in a wellbore. The logging system may include a logging instrument including a rechargeable energy storage and logging electronics, and a cable configured to trickle charge the rechargeable energy storage. The rechargeable energy storage may include an ultracapacitor. The rechargeable energy storage may be trickle charged through the cable from a remote power source.

13 Claims, 26 Drawing Sheets

Primary Structures of Cations

HOUSING WITH EXPOSED INTERNAL SURFACES

HOUSING WITH BARRIER OVER INTERNAL SURFACES

Power Converter - 181

Power Converter - 181

Power Converter - 181

PRODUCTION LOGGING INSTRUMENT

CROSS REFERENCE TO RELATED APPLICATIONS

This application claims priority based on Provisional Application No. 61/555,100 filed Nov. 3, 2011 and Provisional Application No. 61/624,080 filed Apr. 13, 2012, which are hereby incorporated by reference in their entirety.

BACKGROUND OF THE INVENTION

Field of the Invention

The invention disclosed herein relates to exploration for oil and gas and, in particular, to a downhole instrument for production well-logging.

Description of the Related Art

In the exploration for oil and gas, it is necessary to drill a wellbore into the Earth. Evaluation of the Earth and the surrounding formations is often undertaken with the use of sophisticated tooling lowered into the wellbore. Evaluations, or well-logging, may be completed while drilling (measurement while drilling, (MWD or LWD)) or after drilling, such as by lowering of a wireline.

A variety of instruments may be used. Instruments that are directed to technologies such as radiation measurement (gamma and neutron generation), and measurements involving acoustic, seismic, resistivity, magnetic resonance, are often used as is fluid sampling, and various other forms of spectroscopy. Unfortunately, the various tools and instruments that are useful for well logging generally involve intricate equipment that requires a connection to a power supply and other ancillary equipment topside. Therefore, logging equipment is removed from the well before a well enters into production.

However, removing logging equipment from a well leaves operators in a situation where it is impossible to characterize the resources downhole. Accordingly, operators periodically stop production to conduct well logging and assess a health of a respective production well. Of course, cessation of production has a great financial impact on the operator.

Thus, what are needed are methods and apparatus suited for conducting well logging in a production environment. Preferably, the methods and apparatus should provide for a variety of types of analyses with minimal impact on production.

BRIEF SUMMARY OF THE INVENTION

An instrument for performing measurements downhole during production of a well includes: survey components, a communications channel, downhole electronics, and a power block. The power block provides power to the production logging instrument. The power block may include a generator, a power supply connection (such as to a topside power supply), a primary battery, and a high temperature rechargeable energy storage. Ultracapacitors may be used in the energy storage According to a first aspect of the invention, a method for operating a logging system comprises: trickle charging a rechargeable energy storage during a first time period; and operating logging electronics using power from the rechargeable energy storage during a second time period that is shorter than the first time period.

According to a second aspect of the invention, a method for operating a logging system comprises: trickle charging a rechargeable energy storage of a logging instrument located in a wellbore; and operating logging electronics of the logging instrument using power from the rechargeable energy storage during selected time periods.

According to a third aspect of the invention, a logging system comprises: a logging instrument including a rechargeable energy storage, a cable and electronics configured to charge the rechargeable energy storage from a remote power source.

According to a fourth aspect of the invention, a logging instrument comprises: a logging electronics configured to perform a logging operation; and a rechargeable energy storage configured to receive trickle charging from a remote power source and to supply power to the logging electronics during selected time periods.

According to a fifth aspect of the invention, a logging instrument comprises: logging electronics configured to perform a logging operation, and one or more sensors selected from sensor types including pressure, temperature, casing collar locator, accelerometer, acoustic density, seismic, caged and inline flow meters, solid-state flow meters, capacitance, inductance, resistivity, acoustic transmit and/or receive, passive gamma, active gamma, fluid sampling, formation sampling, magnetic resonance imaging, nuclear magnetic resonance, directional or inertial sensors, magnetic sensors and gyroscopes; and a high temperature rechargeable energy storage configured to supply power to the logging electronics.

According to a sixth aspect of the invention, a method for operating a logging system comprises: moving a logging instrument vertically in a well by way of a cable that supports the logging instrument mechanically and provides transmission of information and/or transmission of power, wherein the logging instrument comprises a high temperature rechargeable energy storage.

According to a seventh aspect of the invention, a method for operating a logging system comprises: moving a logging instrument vertically in a well during at least one time period by way of a cable that supports the logging instrument and provides transmission of information and/or transmission of power; and holding the logging instrument at a fixed position in the well during a second time period, wherein the logging instrument comprises a high temperature rechargeable energy storage.

According to an eighth aspect of the invention, a distributed logging system comprises: a plurality of logging instruments disposed at distinct locations within a well, wherein at least one of the logging instruments comprises a high temperature rechargeable energy storage.

According to a ninth aspect of the invention, a logging system comprises: an energy input including a primary battery, a remote source and/or a generator; a high temperature rechargeable energy storage; and a load to receive energy from the rechargeable energy storage.

BRIEF DESCRIPTION OF THE DRAWINGS

The subject matter which is regarded as the invention is particularly pointed out in the specification. The foregoing and other features and advantages of the invention are apparent from the following detailed description taken in conjunction with the accompanying drawings in which.

DETAILED DESCRIPTION

Disclosed herein are various configurations of a production logging instrument adapted for use in a downhole environment. The production logging instrument provides users with logging information during production from a well. In order to provide context for the production logging instrument and methods for use, some background information and definitions are provided.

Figure 1:
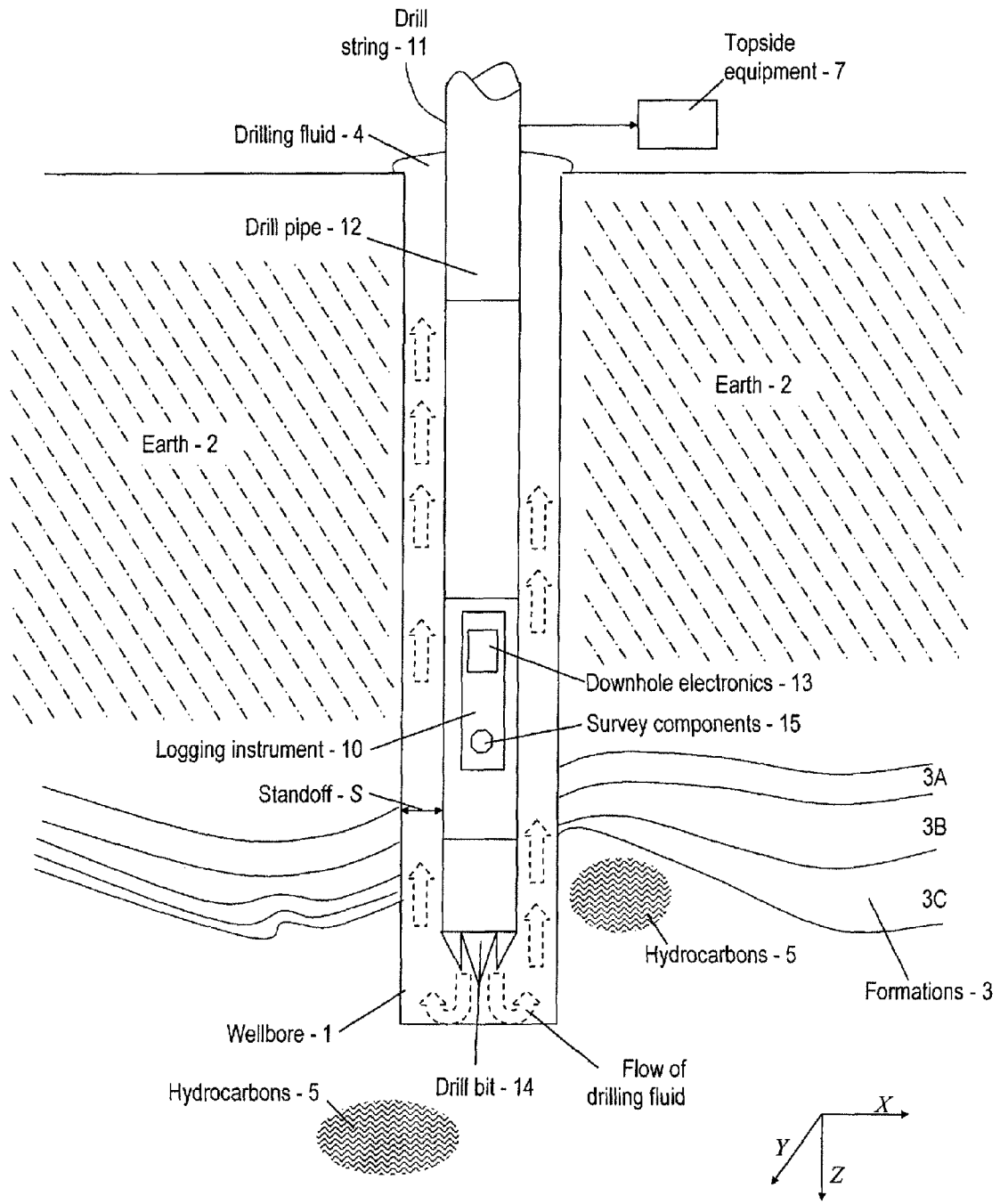
FIG. 1 illustrates an exemplary embodiment of a drill string that includes a logging instrument.

Refer now to FIG. 1 where aspects of an apparatus for drilling a wellbore 1 (also referred to as a "borehole") are shown. As a matter of convention, a depth of the wellbore 1 is described along a Z-axis, while a cross-section is provided on a plane described by an X-axis and a Y-axis.

In this example, the wellbore 1 is drilled into the Earth 2 using a drill string 11 driven by a drilling rig (not shown) which, among other things, provides rotational energy and downward force. The wellbore 1 generally traverses sub-surface materials, which may include various formations 3 (shown as formations 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formations 3 are formed of sub-surface materials. Accordingly, as used herein, it should be considered that while the term "formation" generally refers to geologic formations, and "sub-surface material," includes any materials, and may include materials such as solids, fluids, gases, liquids, and the like.

In this example, the drill string 11 includes lengths of drill pipe 12 which drive a drill bit 14. The drill bit 14 also provides a flow of a drilling fluid 4, such as drilling mud. The drilling fluid 4 is often pumped to the drill bit 14 through the drill pipe 12, where the fluid exits into the wellbore 1. This results in an upward flow of drilling fluid 4 within the wellbore 1. The upward flow generally cools the drill string 11 and components thereof, carries away cuttings from the drill bit 14 and prevents blowout of pressurized hydrocarbons 5.

The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the drill string 11 and a wall of the wellbore 1. This layer is referred to as a "standoff layer," and includes a thickness, referred to as "standoff, S."

The drill string 11 generally includes equipment for performing "measuring while drilling" (MWD), also referred to as "logging while drilling" (LWD). Performing MWD or LWD generally calls for operation of a logging instrument 10 that is incorporated into the drill string 11 and designed for operation while drilling. Generally, the logging instrument 10 for performing MWD is coupled to an electronics package which is also on board the drill string 11, and therefore referred to as "downhole electronics 13." Generally, the downhole electronics 13 provides for at least one of data collection, data analysis, and operational control such as electromechanical actuation (s), communications, power processing and the like. Often, the logging instrument 10 and the downhole electronics 13 are coupled to topside equipment 7. The topside equipment 7 may be included to further control operations, provide greater analysis capabilities as well as data logging and the like. A communications channel (discussed below) may provide for communications to the topside equipment 7, and may operate via pulsed mud, wired pipe, EM telemetry, fiber optic and other technologies as are known in the art and are practicable for a given application.

Figure 2:
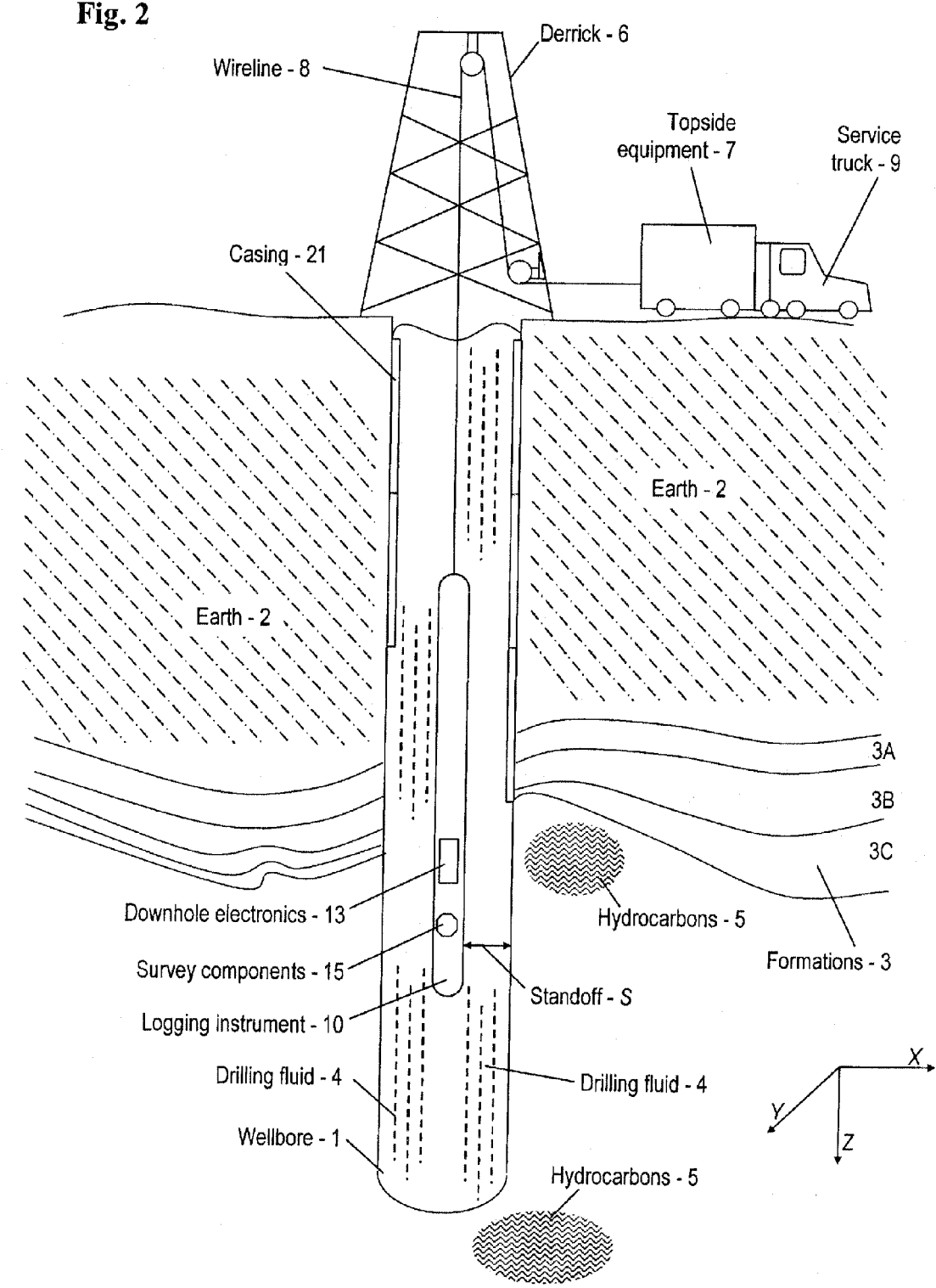
FIG. 2 illustrates an exemplary embodiment for well logging with an instrument deployed by a wireline.

Referring now to FIG. 2, an exemplary logging instrument 10 for wireline logging of the wellbore 1 is shown. As a matter of convention, a depth of the wellbore 1 is described along a Z-axis, while a cross-section is provided on a plane described by an X-axis and a Y-axis. Prior to well logging with the logging instrument 10, the wellbore 1 is drilled into the Earth 2 using a drilling apparatus, such as the one shown in FIG. 1.

In some embodiments, the wellbore 1 has been filled, at least to some extent, with drilling fluid 4. The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from logging operations during wireline logging. Generally, a layer of materials will exist between an outer surface of the logging instrument 10 and a wall of the wellbore 1. This layer is referred to as a "standoff layer," and includes a thickness, referred to as "standoff, S."

A casing 21 may be inserted into the wellbore 1 to ensure physical integrity. The casing may be formed in the wellbore 1, inserted therein, or otherwise disposed in the wellbore 1. The casing 21 may be segmented or continuous. For purposes of discussion herein, the casing 21 generally includes various installations of cementatious outer casing 21, as well as inner production tubing (such as production tubing).

Generally, in wireline logging, the logging instrument 10 is lowered into the wellbore 1 using a wireline 8 deployed by a derrick 6 or similar equipment. Generally, the wireline 8 includes suspension apparatus, such as a load bearing cable, as well as other apparatus. The other apparatus may include a power supply, a communications link (such as wired or optical) and other such equipment. Generally, the wireline 8 is conveyed from a service truck 9 or other similar apparatus (such as a service station, a base station, etc, . . . ). Often, the wireline 8 is coupled to topside equipment 7. The topside equipment 7 may provide power to the logging instrument 10, as well as provide computing and processing capabilities for at least one of control of operations and analysis of data.

In permanent logging, the logging instrument may be conveyed into the wellbore in a number of ways. In some embodiments, the logging instrument is "tubing conveyed" meaning that at least a portion of the logging instrument is fixed to a portion of the production tubing prior to insertion in the wellbore. When the tubing is inserted into the wellbore, the logging instrument is conveyed with it. In some embodiments, the logging instrument is conveyed by wireline, i.e. it is lowered into the wellbore in a similar fashion as in wireline logging. In some embodiments, the logging instrument is "casing conveyed" meaning that at least a portion of the logging instrument is fixed to a portion of the production casing prior to insertion in the wellbore. Other conveyance methods are possible as seen fit by the designer. Both tubing and wireline conveyance accommodate retrofit designs while casing conveyance generally requires that the logging instrument is installed during well completion.

Generally, a permanent logging instrument may be connected to a permanent downhole cable (PDC). A PDC may be single or multi-conductor. Each conductor, may be solid or stranded. The conductors may be insulated, encapsulated, armored, or some combination. Multiple conductors may be twisted or configured coaxially. The cable may be designed for transmission of electricity, either power, information or both; it may also be designed to support a substantial mechanical load, for instance in wireline conveyance embodiments.

In some embodiments, power is transmitted to the production logging instrument 100 over a fiber optic cable. An exemplary device for providing power over fiber is provided by RLH Industries of Orange, Calif., and sold as a "Power Over Fiber System (PoF).

The electronics 13 may include at least one of a power converter, a controller, a processor and the like. Generally, the electronics 13 provide for commanding power from the power block 44 to at least one of the communications channel 43 and the survey components 15. The electronics 13 may initiate energy conservation measures, such as by shutting down at least one of the communications channel 43 and the survey components 15. Energy conservation (also referred to as a "sleep state" or "sleep mode") may be initiated when a power condition (such as a state of charge) in the power block 44 does not meet a desired threshold.

In some embodiments, the electronics 13 regulate discharge of power from a plurality of types of energy storage 42. For example, the electronics 13 may draw power from at least one ultracapacitor to satisfy initial start-up load that may be associated with some devices (such as a mud-pulsing communications channel 43). Thus, the electronics 13 may provide a "soft start" thereby enhancing a usable lifetime of at least one battery in the energy storage 42.

The electronics 13 may condition power from the power block 44 as appropriate. For example, the electronics 13 may simulate power produced by a certain type of supply (for example, may simulate power provided by a battery while drawing on an ultracapacitor); the electronics 13 may buffer power, pulse power and otherwise generally provide power in a fashion deemed appropriate.

Generally, the logging instrument 10 includes apparatus for performing measurements "downhole" or in the wellbore 1. Such apparatus include, for example, a variety of survey components 15. Exemplary survey components 15 may include radiation detectors, shielding, sensors, transducers, and many of the other various survey components 15 known in the art. The components 15 may communicate with downhole electronics 13 as appropriate. The measurements and other sequences as may be performed using the logging instrument 10 are generally performed to ascertain and qualify a presence of hydrocarbons 5.

Figure 3:
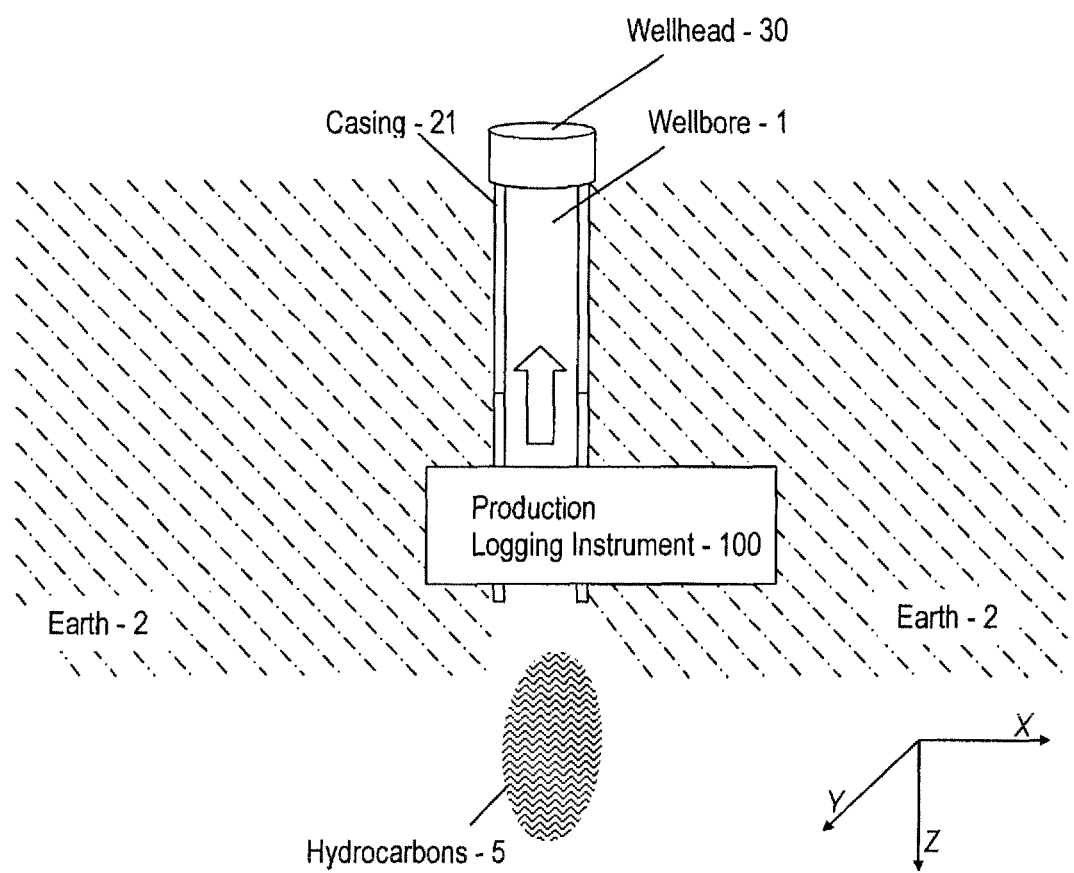
FIG. 3 depicts an exemplary embodiment for well logging with a production logging instrument.

Referring now to FIG. 3, there is shown an exemplary production logging instrument 100. The production logging instrument 100 may be deposited within the wellbore 1, where it is left after other equipment is withdrawn. The production logging instrument 100 may be deposited downhole by use of other equipment, such as a tractor (not shown). In some embodiments, the production logging instrument 100 may include elements of a tractor (such as a motor and track), such that the production logging instrument 100 is self-placing.

Once production is initiated, the drilling fluid 4 is expelled from the wellbore 1. A flow of the hydrocarbons 5 is established. During initiation of production, a wellhead 30 is placed over the wellbore 1. The wellhead 30 provides for regulation of flow from the wellbore 1, and accommodates extended periods of extraction of the hydrocarbons 5. As shown by the upward arrow, when the production logging instrument 100 is in place, production (the withdrawal of hydrocarbons 5) may continue unabated.

Figure 4:
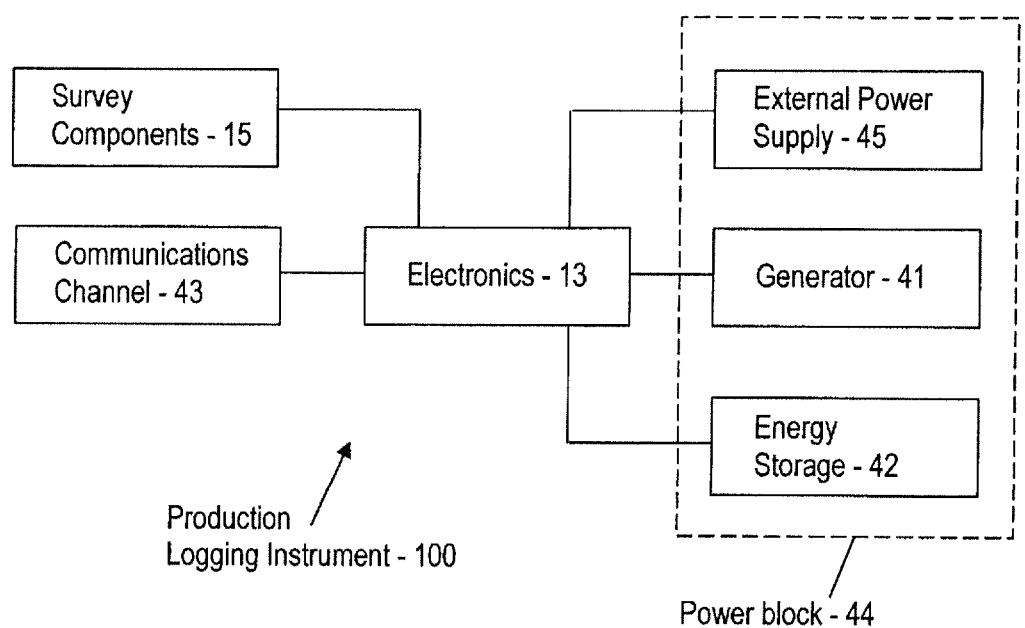
FIG. 4 depicts components of the production logging instrument of FIG. 3.

Referring now to FIG. 4, components of an exemplary production logging instrument 100 are shown. In this example, the production logging instrument 100 includes the survey components 15, a communications channel 43, the downhole electronics 13, and a power block 44. The power block 44 provides power to the production logging instrument 100.

The energy source 401 that is included in the power supply 115 may include a variety of energy inputs. The energy inputs may be generally divided into three categories. The categories include primary batteries, remote systems, and generators.

The generator 41 may include a flow driven generator (such as one driven by flow of production). For example, the generator 41, may include a rotary generator, a vibrational energy generator (such as a displacement type of generator), or other types of power generators. Other types of energy generation devices may be used alone or in combination with each other. Exemplary types of generators include, without limitation, rotary generators, electromagnetic displacement generators, magnetostrictive displacement generators, piezoelectric displacement generators, thermoelectric generators, thermophotovoltaic generators, and may include connections to remote generators, such as a wireline connection to a generator or power supply that is maintained topside. Such generators are well known in the industry. Generally, an output of the generator 41 is regulated by the downhole electronics 13. However, the output may be regulated on board the generator 41, thus enabling a direct connection from the generator 41 to the energy storage 42. Exemplary energy storage 42 includes various forms of batteries, ultracapacitors and the like. In some embodiments, the energy storage 42 (and/or other components of the production logging instrument 100) are replaceable, and may be switched out during a downhole maintenance evolution with, for example, a wireline tool that provides for remote manipulations by an operator.

An exemplary communications channel 43 includes components for providing EM telemetry, where signals may be conveyed through the casing 21 and/or surrounding environs by use of electric, magnetic or electromagnetic fields. Likewise, the communications channel may be operated through the casing 21 (specifically, for example, through metallic production tubing or by use of the casing 21 as a waveguide). Communications may be accomplished with pulsed fluids, through optical channels, through wired systems and by other techniques as may be known in the art, or later developed.

Some embodiments of the production logging instrument 100 include those disposed in a housing that is an annular cylinder, thus accommodating flow through the production logging instrument 100. Other embodiments may include a solid, cylindrical form with a low cross-sectional area (i.e., of a low diameter). The production logging instrument 100 may include extensible arms or other components (not shown) which assist with, for example, placement and/or retention downhole. In short, the production logging instrument 100 may generally be of any physical form desired by designers, fabricators, operators and the like.

In some embodiments the logging instrument is conveyed with the aid of a "carrier"—a specially designed section of the production tubing that carries the logging instrument as the production tubing is inserted into the wellbore. The carrier is an annular cylinder that accommodates flow through its center portion. The carrier may be designed to a-fix a logging instrument such as one that has a solid cylindrical form. Alternatively, the logging instrument may be designed as part of the carrier. In either case, the carrier may be designed to permit access of the logging instrument to both the inside of the production tubing and the outer annulus. Access through the wall of the production tubing may be accommodated by way of a "port" incorporated in the carrier—a mechanical opening or otherwise passive portion of the carrier for transmission of various parameters be they electrical, thermal, pressure-related, or otherwise.

As mentioned above, an exemplary energy storage 42 includes an ultracapacitor. In some embodiments, the energy storage 42 is adapted for high temperature operation (e.g., up to about 210 degrees Celsius). Other components that may be used in the energy storage 42 include, for example, rechargeable batteries, reversible fuel cells and the like. In short, various embodiments of the energy storage 42 include forms suited for operation at an elevated temperature and exhibit a long life span. An exemplary ultracapacitor is described later herein with regard to FIG. 8.

In some embodiments, the production logging equipment 100 is adapted for use without the energy storage 42 (or with a failed energy storage 42). In some of these embodiments, power from other components of the power block 44 is used to power the downhole electronics 13 and other components that need power.

The downhole logging instrument 100 may be used as a standalone system, in combination with other downhole logging instruments 100 (such as to provide for local measurements, as well as passing of data between other downhole logging instruments 100), or in any arrangement deemed appropriate. In some embodiments, it may be desired to exclude the communications channel 43, and to simply use the production logging instrument 100 as a logging device that is later retrieved. In these embodiments, data may be downloaded from the production logging instrument 100 once the production logging instrument 100 is topside.

In general, embodiments of the production logging instrument 100 are equipped to ascertain at least one of ambient temperature, flow rate, ambient pressure, ambient and/or induced radiation levels (e.g., gamma), resistivity, fluid density, fluid capacitance, fluid dielectric properties and porosity of the surrounding formations 3.

In some embodiments, the power supply connection 45 includes a wired connection to a topside power supply. In some embodiments, wireless (EM) signals (such as a very low frequency signal) may be used to transmit power, where the production logging instrument 100 includes a receiver for receiving power. In further embodiments, wireline or wired casing may be used to transmit power. In some further embodiments, a waveguide (such as the casing 21) may be relied upon to provide for transmission of the power.

Figure 5:
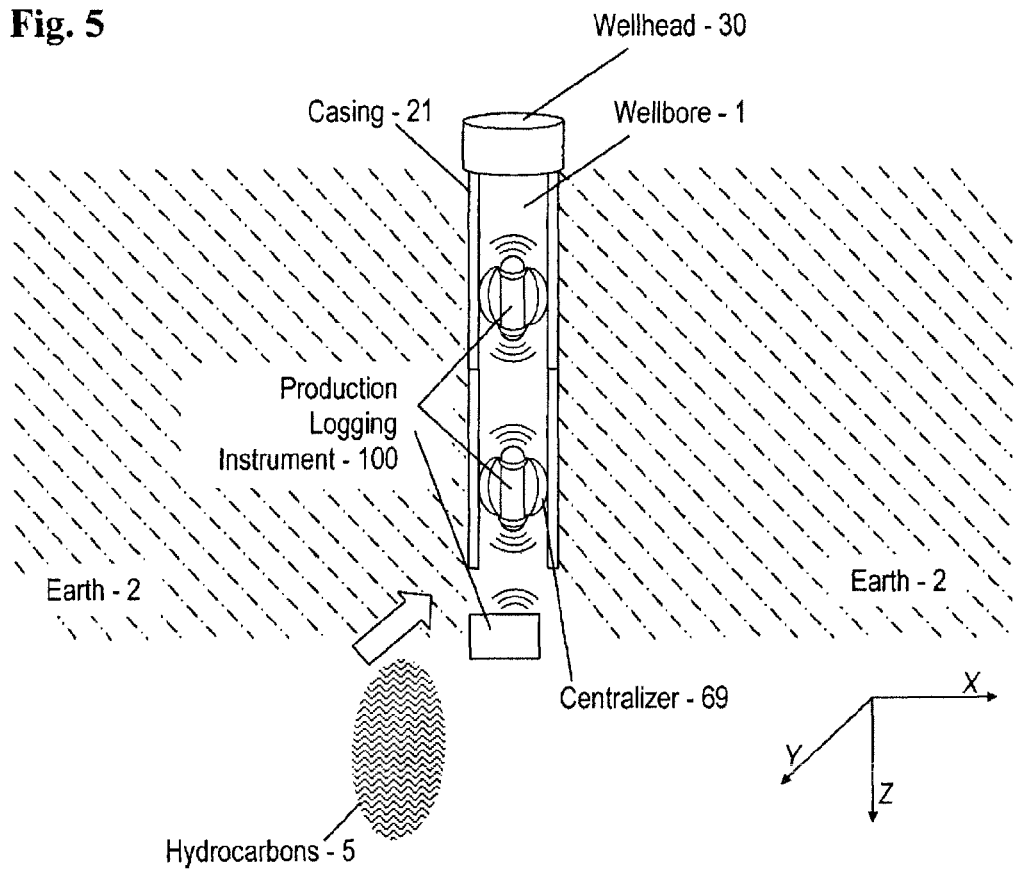
FIG. 5 depicts an exemplary configuration making use of a plurality of production logging instruments.

Referring now to FIG. 5, an exemplary configuration making use of a plurality of the production logging instruments 100 is shown. In this example, the plurality of production logging instrument 100 is distributed within the wellbore 1. A first type of the production logging instrument 100 is placed at the bottom of the wellbore 1. Advantageously, this type may include components that are not conveniently placed at an intermediate location in the wellbore 1. For example, a bottom type production logging instrument 100 may include additional energy storage 42, additional survey components 15, and/or other types of generators 41 that are not conveniently disposed at an intermediate location in the wellbore 1. A second type of production logging instrument 100 (for convenience, referred to as an "intermediate type," or by other similar terms) is used. In this example, both types of production logging instrument 100 are rigidly disposed within the casing. One embodiment of a device for disposing the production logging instrument 100 within the casing 21 includes, for example, a centralizer 69. The intermediate type may be designed to have a low cross-sectional area, and therefore provide minimal reductions in production or flow of the hydrocarbons 5.

The intermediate production logging instrument 100 may be used to provide for well logging at locations along a length of the wellbore 1. This may be useful for, among other things, characterizing or identifying depletion of the hydrocarbons 5 in the surrounding Earth 2. Additionally, each of the intermediate production logging instrument 100 may be equipped with two way communications, such that each respective intermediate production logging instrument 100 may pass data from another production logging instrument 100 along the wellbore 1, ultimately to a topside receiver. This latter embodiment may be used, for example, to improve communications reliability, range and/or bandwidth.

Figure 6:
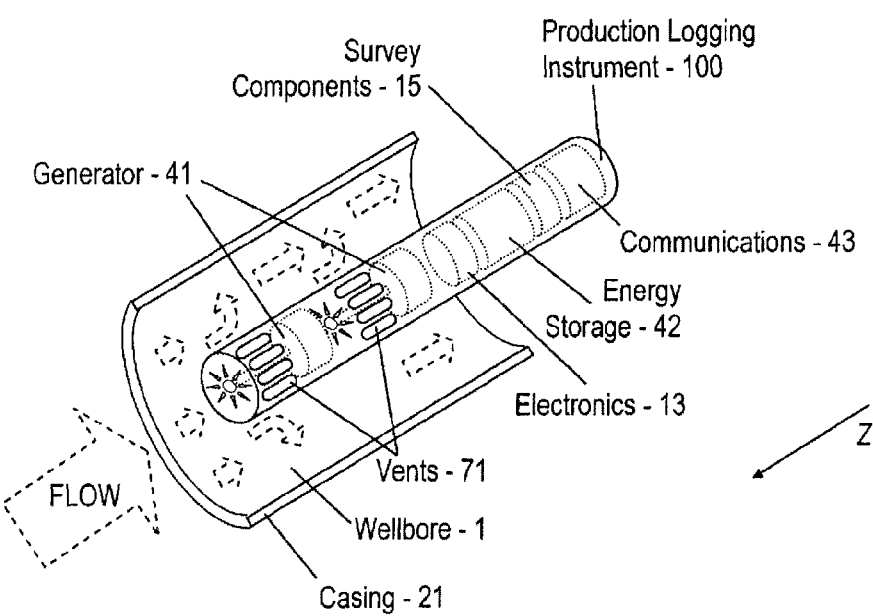
FIG. 6 depicts another embodiment of the production logging instrument.

One example of the production logging instrument 100 is shown in greater detail with further regard to FIG. 6.

Referring now also to FIG. 6, an embodiment of the production logging instrument 100 is shown. In this example, the production logging instrument 100 includes a plurality generators 41 (i.e., rotary type generators). Flow of hydrocarbons 5 within the wellbore 1 is directed into a shroud that surrounds blades of the turbine and causes the generator 41 to produce power. After flowing over the blades of the turbine, the flow exits through side vents 71 and continues ascent along the wellbore 1. In this embodiment, the production logging instrument 100 may be conveniently and reliably centered in the wellbore 1 via a centralizer 69 (as shown in FIG. 6).

When a plurality of generators 41 is included in the production logging instrument 100 (some embodiments include only one generator 41), flow of the hydrocarbons 5 may be guided around each of the generators 41. That is, a set of side vents 71 may be provided that correlate with each of the generators 41. Each set of side vents 71 generally includes a shutter (such as rotatable shutter, not shown) to close off the respective side vents 71. Accordingly, an operator may selectively operate each one of the generators 41 (or the electronics 13 may be configured to automatically switch between generators 41). Thus, as each of the generators 41 reaches the end of a useful life, another one of the generators 41 may be brought into service, thereby providing for a long life of the production logging instrument 100.

Figure 7:
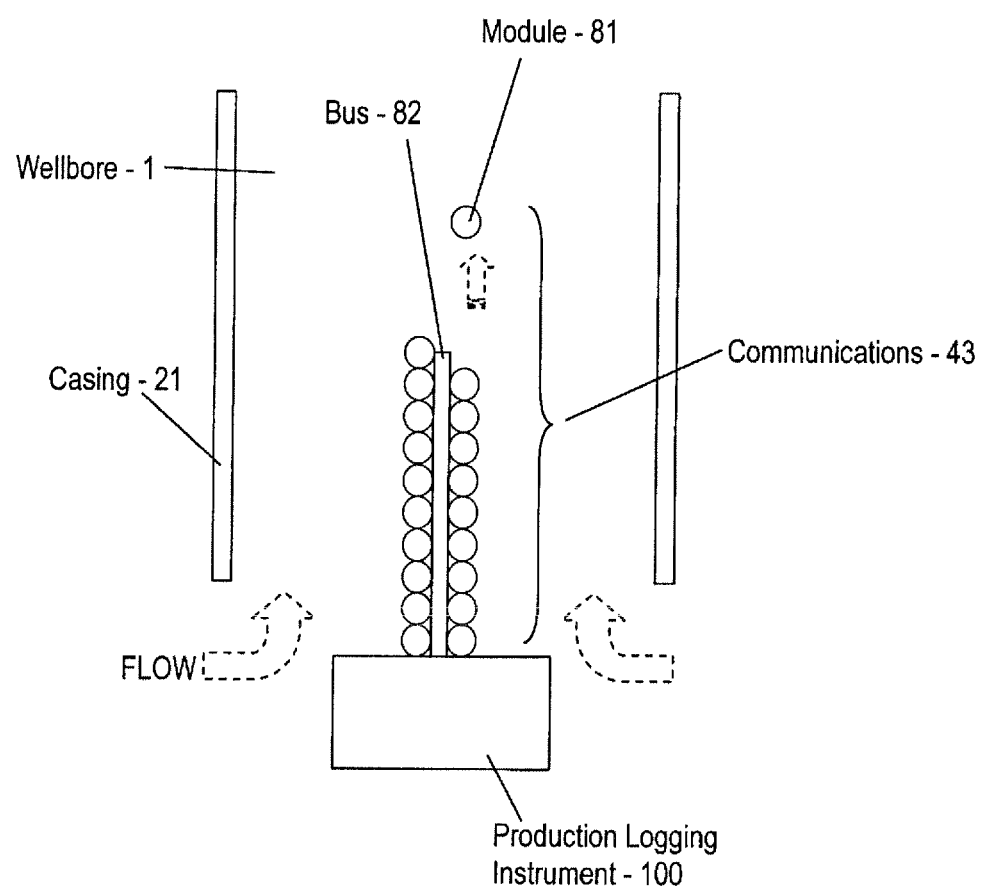
FIG. 7 depicts another embodiment of the production logging instrument.

Referring now to FIG. 7, another embodiment of the production logging instrument 100 is shown. Once placed in situ, the production logging instrument 100 begins logging and tracks values for various parameters. In this embodiment, the production logging instrument 100 includes a modular communications channel 43 that includes a plurality of discrete and physically separable elements (i.e., modules 81). Communications occur at periodic intervals, such as once a month, when the production logging instrument 100 downloads associated data into one of the plurality of modules 81. Each module 81 may include, for example, a power supply (such as a ceramic capacitor), a memory (such as a micro-SD card, or an equivalent), and a remote identification device (such as a radiofrequency identification (RFID) tag (or antenna)). Each of the modules 81 may be coupled to the production logging instrument 100 through a bus 82. Generally, the bus 82 includes components for distributing power and communicating with each of the modules 81. Additionally, the bus 82 includes a plurality of releases (such as electromagnetic or electromechanical release devices) for selectively releasing each of the modules 81.

As each interval concludes, the production logging instrument 100 ensures that the relevant dataset is stored on the selected memory, for instance it may power up a respective one of the plurality of modules 81 by charging the on-board power supply, programming the memory (i.e., downloads data to the memory), and then releasing the module 81 into the flow of hydrocarbons 5. The flow then carries the module 81 along to the wellhead 30. Once the released module 81 nears the wellhead 30 where extraction of the hydrocarbons 5 is accomplished, remote identification of the module 81 is accomplished. For example, an RFID receiver (not shown) will detect the RFID tag (not shown). Once detected, a detection signal may be sent to an operator and/or an automated system (such as a motor operated valve) for diversion of the module 81 to a recovery point.

Once the module 81 is recovered by the operator, data may then be downloaded. Advantageously, very high granularity data (data resulting from frequent sampling and/or sampling of numerous properties and parameters) may be obtained from the well. Further, the data may be correlated with other wells, such as other nearby wells. Accordingly, the dynamics of production for an oil field may then be characterized. This offers producers insight into development of additional wells, depletion of existing wells and other insights into the production activities.

In some embodiments, the communications channel 43 includes a fiber optic element (not shown). The fiber optic element may be used to communicate directly from the production logging instrument 100 to a topside fiber optic signal receiver. The fiber optic element may also be used as an interferometer, and provide users with other data as may be collected therefrom. An exemplary embodiment of a fiber optic interferometer is provided in U.S. patent application Ser. No. 12/368,576, entitled "Fiber Optic Sensor System Using White Light Interferometry," which is incorporated by reference herein in its entirety.

As an overview, the power supply 115 generally includes electrical storage and a generator for generating electrical output. The energy storage may include any type of technology practicable. In various embodiments, the energy storage includes at least one ultracapacitor (which is described below with reference to FIG. 3). Generally, in each instance, the energy storage provides a High Temperature Rechargeable Energy Storage (HTRES). In some embodiments, the HTRES is configured for operation at a temperature that is within a temperature range of between about 80 degrees Celsius to about 210 degrees Celsius.

Additional embodiments of HTRES include, without limitation, chemical batteries, aluminum electrolytic capacitors, tantalum capacitors, ceramic and metal film capacitors, hybrid capacitors magnetic energy storage, for instance, air core or high temperature core material inductors. Other types of that may also be suitable include, for instance, mechanical energy storage devices, such as fly wheels, spring systems, spring-mass systems, mass systems, thermal capacity systems (for instance those based on high thermal capacity liquids or solids or phase change materials), hydraulic or pneumatic systems. One example is the high temperature hybrid capacitor available from Evans Capacitor Company Providence, R.I. USA part number HC2D060122 DSCC10004-16 rated for 125 degrees Celsius. Another example is the high temperature tantalum capacitor available from Evans Capacitor Company Providence, R.I. USA part number HC2D050152HT rated to 200 degrees Celsius. Yet another example is an aluminum electrolytic capacitor available from EPCOS Munich, Germany part number B41691A8107Q7, which is rated to 150 degrees Celsius. Yet another example is the inductor available from Panasonic Tokyo, Japan part number ETQ-P5M470YFM rated for 150 degrees Celsius. Additional embodiments are available from Saft, Bagnolet, France (part number Li-ion VL 32600-125) operating up to 125 degrees Celsius with 30 charge-discharge cycles, as well as a li-ion battery (experimental) operable up to about 250 degrees Celsius, and in experimental phase with Sadoway, Hu, of Solid Energy in Cambridge, Mass.

As a matter of discussion, embodiments of the power supply 115 discussed herein involve use of a high temperature ultracapacitor, however, this is not limiting of technologies that may be included in the energy storage of the power supply 115. Exemplary aspects of an ultracapacitor suited for use as the high temperature energy storage are now introduced.

Disclosed herein is a capacitor that provides users with improved performance over a wide range of temperatures. For example, the capacitor may be operable at temperatures ranging from about as low as minus 40 degrees Celsius to as high as about 210 degrees Celsius. In some embodiments, the capacitor is operable temperatures ranging from about 80 degrees Celsius to as high as about 210 degrees Celsius.

In general, the capacitor includes energy storage media that is adapted for providing high power density and high energy density when compared to prior art devices. The capacitor includes components that are configured for ensuring operation over the temperature range, and includes any one or more of a variety of forms of electrolyte that are likewise rated for the temperature range. The combination of construction, energy storage media and electrolyte result in capabilities to provide robust operation under extreme conditions. To provide some perspective, aspects of an exemplary embodiment are now introduced.

Figure 8:
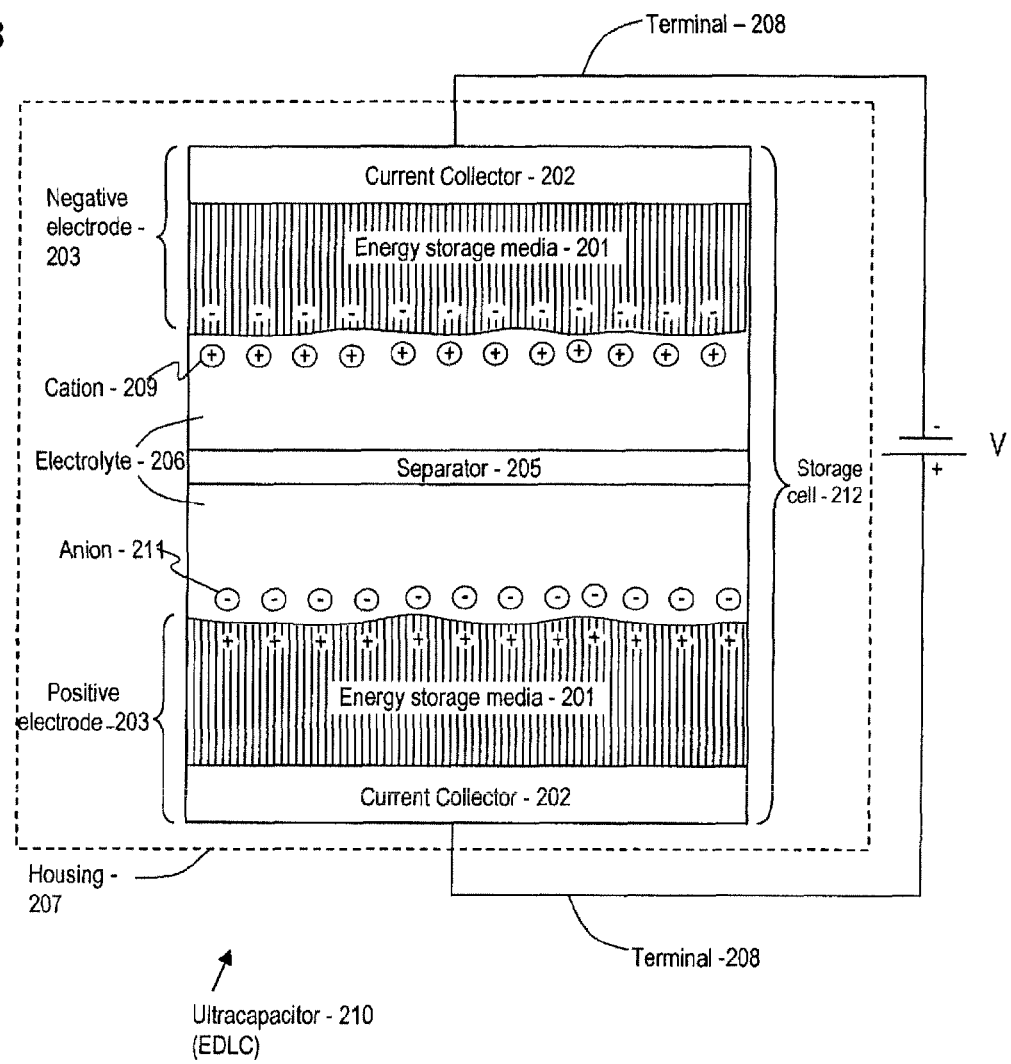
FIG. 8 illustrates aspects of an exemplary ultracapacitor.

As shown in FIG. 8, an exemplary embodiment of a capacitor is shown. In this case, the capacitor is an "ultracapacitor 210." The exemplary ultracapacitor 210 is an electric double-layer capacitor (EDLC). The EDLC includes at least one pair of electrodes 203 (where the electrodes 203 may be referred to individually as one of a "negative electrode 203" and a "positive electrode 203," however, this is merely for purposes of referencing herein). When assembled into the ultracapacitor 210, each of the electrodes 203 presents a double layer of charge at an electrolyte interface. In some embodiments, a plurality of electrodes 203 is included (for example, in some embodiments, at least two pairs of electrodes 203 are included). For purposes of discussion, only one pair of electrodes 203 are shown. As a matter of convention herein, at least one of the electrodes 203 uses a carbon-based energy storage media 201 (as discussed further herein) to provide energy storage. However, for purposes of discussion herein, it is generally assumed that each of the electrodes includes the carbon-based energy storage media 201. It should be noted that an electrolytic capacitor differs from an ultracapacitor because, in an electrolytic capacitor, the metallic electrodes typically differ greatly (at least an order of magnitude) in area.

Each of the electrodes 203 includes a respective current collector 202 (also referred to as a "charge collector"). In some embodiments, the electrodes 203 are separated by a separator 205. In general, the separator 205 is a thin structural material (usually a sheet) used to separate the negative electrode 203 from the positive electrode 203. The separator 205 may also serve to separate pairs of the electrodes 203. Once assembled, the electrodes 203 and the separator 205 provide a storage cell 212. Note that, in some embodiments, the carbon-based energy storage media 201 may not be included on one or both of the electrodes 203. That is, in some embodiments, a respective electrode 203 might consist of only the current collector 202. The material used to provide the current collector 202 could be roughened, anodized or the like to increase a surface area thereof. In these embodiments, the current collector 202 alone may serve as the electrode 203. With this in mind, however, as used herein, the term "electrode 203" generally refers to a combination of the energy storage media 201 and the current collector 202 (but this is not limiting, for at least the foregoing reason).

At least one form of electrolyte 206 is included in the ultracapacitor 210. The electrolyte 206 fills void spaces in and between the electrodes 203 and the separator 205. In general, the electrolyte 206 is a substance that disassociates into electrically charged ions. A solvent that dissolves the substance may be included in some embodiments of the electrolyte 206, as appropriate. The electrolyte 206 conducts electricity by ionic transport.

Generally, the storage cell 212 is formed into one of a wound form or prismatic form which is then packaged into a cylindrical or prismatic housing 207. Once the electrolyte 206 has been included, the housing 207 may be hermetically sealed. In various examples, the package is hermetically sealed by techniques making use of laser, ultrasonic, and/or welding technologies. In addition to providing robust physical protection of the storage cell 212, the housing 207 is configured with external contacts to provide electrical communication with respective terminals 208 within the housing 207. Each of the terminals 208, in turn, provides electrical access to energy stored in the energy storage media 201, generally through electrical leads which are coupled to the energy storage media 201.

As discussed herein, "hermetic" refers to a seal whose quality (i.e., leak rate) is defined in units of "atm-cc/second," which means one cubic centimeter of gas (e.g., He) per second at ambient atmospheric pressure and temperature. This is equivalent to an expression in units of "standard He-cc/sec." Further, it is recognized that 1 atm-cc/sec is equal to 1.01325 mbar-liter/sec. Generally, the ultracapacitor 210 disclosed herein is capable of providing a hermetic seal that has a leak rate no greater than about $5.0 \times 10^{-6}$ atm-cc/sec, and may exhibit a leak rate no higher than about $5.0 \times 10^{-10}$ atm-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non-destructive method. In one example of this technique, the ultracapacitor 210 is placed into an environment of helium. The ultracapacitor 210 is subjected to pressurized helium. The ultracapacitor 210 is then placed into a vacuum chamber that is connected to a detector capable of monitoring helium presence (such as an atomic absorption unit). With knowledge of pressurization time, pressure and internal volume, the leak rate of the ultracapacitor 210 may be determined.

Figure 18:
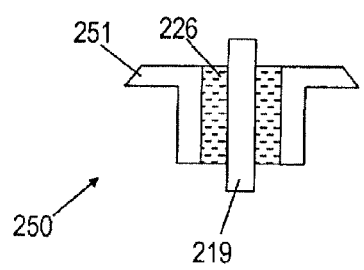
FIG. 18 is a cross-sectional view of an electrode assembly that includes a glass-to-metal seal.
Figure 19:
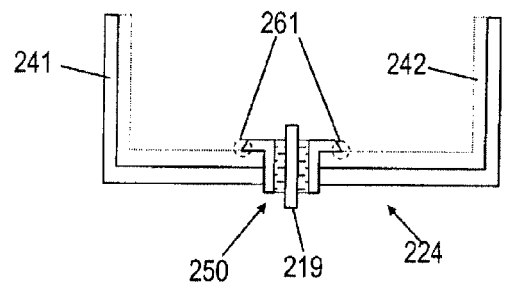
FIG. 19 is a cross-sectional view of the electrode assembly of FIG. 18 installed in the cap of FIG. 17B.
Figure 20:
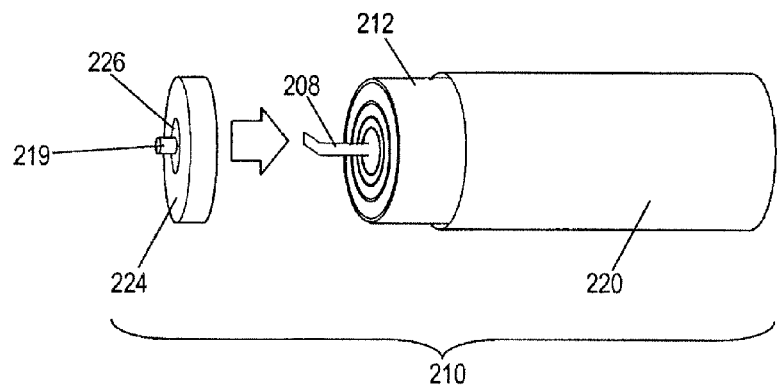
FIG. 20 depicts an arrangement of the energy storage cell in process of assembly.

In some embodiments, at least one lead (which may also be referred to herein as a "tab") is electrically coupled to a respective one of the current collectors 202. A plurality of the leads (accordingly to a polarity of the ultracapacitor 210) may be grouped together and coupled to into a respective terminal 208. In turn, the terminal 208 may be coupled to an electrical access, referred to as a "contact" (e.g., one of the housing 207 and an external electrode (also referred to herein for convention as a "feed-through" or "pin")). Reference may be had to FIGS. 18, 19 and 20. Consider now the energy storage media 201 in greater detail.

In the exemplary ultracapacitor 210, the energy storage media 201 is formed of carbon nanotubes. The energy storage media 201 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In an exemplary method for fabricating carbon nanotubes, an apparatus for producing an aligned carbon-nanotube aggregate includes apparatus for synthesizing the aligned carbon-nanotube aggregate on a base material having a catalyst on a surface thereof. The apparatus includes a formation unit that processes a formation step of causing an environment surrounding the catalyst to be an environment of a reducing gas and heating at least either the catalyst or the reducing gas; a growth unit that processes a growth step of synthesizing the aligned carbon-nanotube aggregate by causing the environment surrounding the catalyst to be an environment of a raw material gas and by heating at least either the catalyst or the raw material gas; and a transfer unit that transfers the base material at least from the formation unit to the growth unit. A variety of other methods and apparatus may be employed to provide the aligned carbon-nanotube aggregate.

In some embodiments, material used to form the energy storage media 201 may include material other than pure carbon (and the various forms of carbon as may presently exist or be later devised). That is, various formulations of other materials may be included in the energy storage media 201. More specifically, and as a non-limiting example, at least one binder material may be used in the energy storage media 201, however, this is not to suggest or require addition of other materials (such as the binder material). In general, however, the energy storage media 201 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 201.

In one set of embodiments, the carbonaceous material includes at least about 60% elemental carbon by mass, and in other embodiments at least about 75%, 85%, 90%, 95% or 98% by mass elemental carbon.

Carbonaceous material can include carbon in a variety forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 201 are provided herein as examples. These embodiments provide robust energy storage and are well suited for use in the electrode 203. It should be noted that these examples are illustrative and are not limiting of embodiments of carbonaceous material suited for use in energy storage media 201.

In general, the term "electrode" refers to an electrical conductor that is used to make contact to another material which is often non-metallic, in a device that may be incorporated into an electrical circuit. Generally, the term "electrode," as used herein, is with reference to the current collector 202 and the additional components as may accompany the current collector 202 (such as the energy storage media 201) to provide for desired functionality (for example, the energy storage media 201 which is mated to the current collector 202 to provide for energy storage and energy transmission).

Turning to the current collector 202, in some embodiments, the current collector 202 is between about 0.5 micrometers (μm) to about 25 micrometers (μm) thick. In some embodiments, the current collector 202 is between about 20 micrometers (μm) to about 40 micrometers (μm) thick. The current collector 202 may appear as a thin layer, such as layer that is applied by chemical vapor deposition (CVD), sputtering, e-beam, thermal evaporation or through another suitable technique. Generally, the current collector 202 is selected for its properties such as conductivity, being electrochemically inert and compatible with the energy storage media 201 (e.g., CNT). Some exemplary materials include aluminum, platinum, gold, tantalum, titanium, and may include other materials as well as various alloys.

Once the current collector 202 is joined with the energy storage media 201 (e.g., CNT), an electrode element 215 is realized. Each electrode element 215 may be used individually as the electrode 203, or may be coupled to at least another electrode element 215 to provide for the electrode 203.

The separator 205 may be fabricated from various materials. In some embodiments, the separator 205 is non-woven glass. The separator 205 may also be fabricated from fiberglass, ceramics and fluoro-polymers, such as polytetrafluoroethylene (PTFE), commonly marketed as TEFLON™ by DuPont Chemicals of Wilmington, Del. For example, using non-woven glass, the separator 5 can include main fibers and binder fibers each having a fiber diameter smaller than that of each of the main fibers and allowing the main fibers to be bonded together.

For longevity of the ultracapacitor 210 and to assure performance at high temperature, the separator 205 should have a reduced amount of impurities and in particular, a very limited amount of moisture contained therein. In particular, it has been found that a limitation of about 200 ppm of moisture is desired to reduce chemical reactions and improve the lifetime of the ultracapacitor 210, and to provide for good performance in high temperature applications. Some embodiments of materials for use in the separator 205 include polyamide, polytetrafluoroethylene (PTFE), polyetheretherketone (PEEK), aluminum oxide ($Al_2O_3$), fiberglass, and glass-reinforced plastic (GRP).

In general, materials used for the separator 205 are chosen according to moisture content, porosity, melting point, impurity content, resulting electrical performance, thickness, cost, availability and the like. In some embodiments, the separator 205 is formed of hydrophobic materials.

Accordingly, procedures may be employed to ensure excess moisture is eliminated from each separator 205. Among other techniques, a vacuum drying procedure may be used.

Note that, in some embodiments, the ultracapacitor 210 does not require or include the separator 205. For example, in some embodiments, such as where the electrodes 203 are assured of physical separation by geometry of construction, it suffices to have electrolyte 206 alone between the electrodes 203. More specifically, and as an example of physical separation, one such ultracapacitor 210 may include electrodes 203 that are disposed within a housing such that separation is assured on a continuous basis. A bench-top example would include an ultracapacitor 210 provided in a beaker.

The ultracapacitor 210 may be embodied in several different form factors (i.e., exhibit a certain appearance). Examples of potentially useful form factors include, a cylindrical cell, an annular or ring-shaped cell, a flat prismatic cell or a stack of flat prismatic cells comprising a box-like cell, and a flat prismatic cell that is shaped to accommodate a particular geometry such as a curved space. A cylindrical form factor may be most useful in conjunction with a cylindrical tool or a tool mounted in a cylindrical form factor. An annular or ring-shaped form factor may be most useful in conjunction with a tool that is ring-shaped or mounted in a ring-shaped form factor. A flat prismatic cell shaped to accommodate a particular geometry may be useful to make efficient use of "dead space" (i.e., space in a tool or equipment that is otherwise unoccupied, and may be generally inaccessible).

While generally disclosed herein in terms of a "jelly roll" application (i.e., a storage cell 212 that is configured for a cylindrically shaped housing 207), the rolled storage cell 223 may take any form desired. For example, as opposed to rolling the storage cell 212, folding of the storage cell 212 may be performed to provide for the rolled storage cell 223. Other types of assembly may be used. As one example, the storage cell 212 may be a flat cell, referred to as a "coin type" of cell. Accordingly, rolling is merely one option for assembly of the rolled storage cell 223. Therefore, although discussed herein in terms of being a "rolled storage cell 223", this is not limiting. It may be considered that the term "rolled storage cell 223" generally includes any appropriate form of packaging or packing the storage cell 212 to fit well within a given design of the housing 207.

Various forms of the ultracapacitor 210 may be joined together. The various forms may be joined using known techniques, such as welding contacts together, by use of at least one mechanical connector, by placing contacts in electrical contact with each other and the like. A plurality of the ultracapacitors 210 may be electrically connected in at least one of a parallel and a series fashion.

The electrolyte 206 includes a pairing of cations 209 and anions 211 and may include a solvent. The electrolyte 206 may be referred to as an "ionic liquid" as appropriate. Various combinations of cations 209, anions 211 and solvent may be used. In the exemplary ultracapacitor 210, the cations 209 may include at least one of 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof as well as other equivalents as deemed appropriate. Additional exemplary cations 209 include imidazolium, pyrazinium, piperidinium, pyridinium, pyrimidinium, and pyrrolidinium (structures of which are depicted in FIG. 4). In the exemplary ultracapacitor 210, the anions 211 may include at least one of bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, γ-butyrolactone, nitrile, tricyanohexane, any combination thereof or other material(s) that exhibit appropriate performance characteristics.

Figure 9:
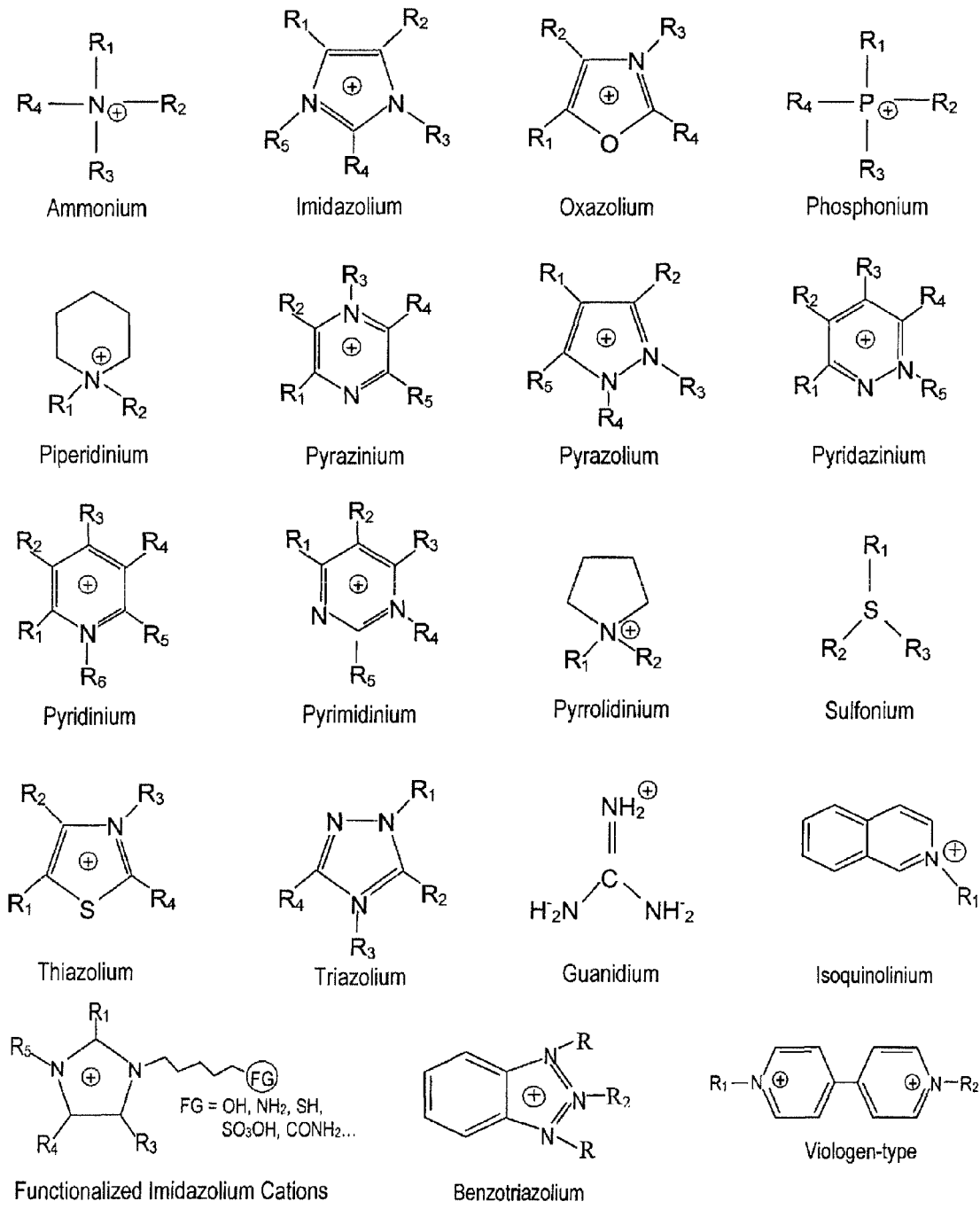
FIG. 9 depicts embodiments of primary structures for cations that may be included in the exemplary ultracapacitor.

Referring now to FIG. 9, there are shown various additional embodiments of cations 209 suited for use in an ionic liquid to provide the electrolyte 206. These cations 209 may be used alone or in combination with each other, in combination with at least some of the foregoing embodiments of cations 209, and may also be used in combination with other cations 209 that are deemed compatible and appropriate by a user, designer, manufacturer or other similarly interested party. The cations 209 depicted in FIG. 9 include, without limitation, ammonium, imidazolium, oxazolium, phosphonium, piperidinium, pyrazinium, pyrazinium, pyridazinium, pyridinium, pyrimidinium, pyrrolidinium, sulfonium, thiazolium, triazolium, guanidium, isoquinolinium, benzotriazolium, viologen-types, and functionalized imidazolium cations.

With regard to the cations 209 shown in FIG. 9, various branch groups ($R_1, R_2, R_3, \ldots R_x$) are included. In the case of the cations 209, each branch groups ($R_x$) may be one of alkyl, heteroalkyl, alkenyl, heteroalkenyl, alkynyl, heteroalkynyl, halo, amino, nitro, cyano, hydroxyl, sulfate, sulfonate, or a carbonyl group any of which is optionally substituted.

The term "alkyl" is recognized in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 20 or fewer carbon atoms in its backbone (e.g., $C_1$-$C_{20}$ for straight chain, $C_1$-$C_{20}$ for branched chain). Likewise, cycloalkyls have from about 3 to about 10 carbon atoms in their ring structure, and alternatively about 5, 6 or 7 carbons in the ring structure. Examples of alkyl groups include, but are not limited to, methyl, ethyl, propyl, butyl, pentyl, hexyl, ethyl hexyl, cyclopropyl, cyclobutyl, cyclopentyl, cyclohexyl and the like.

The term "heteroalkyl" is recognized in the art and refers to alkyl groups as described herein in which one or more atoms is a heteroatom (e.g., oxygen, nitrogen, sulfur, and the like). For example, alkoxy group (e.g., —OR) is a heteroalkyl group.

The terms "alkenyl" and "alkynyl" are recognized in the art and refer to unsaturated aliphatic groups analogous in length and possible substitution to the alkyls described above, but that contain at least one double or triple bond respectively.

The "heteroalkenyl" and "heteroalkynyl" are recognized in the art and refer to alkenyl and alkynyl alkyl groups as described herein in which one or more atoms is a heteroatom (e.g., oxygen, nitrogen, sulfur, and the like).

Generally, any ion with a negative charge maybe used as the anion 211. The anion 211 selected is generally paired with a large organic cation 209 to form a low temperature melting ionic salt. Room temperature (and lower) melting salts come from mainly large anions 209 with a charge of −1. Salts that melt at even lower temperatures generally are realized with anions 211 with easily delocalized electrons. Anything that will decrease the affinity between ions (distance, delocalization of charge) will subsequently decrease the melting point. Although possible anion formations are virtually infinite, only a subset of these will work in low temperature ionic liquid application. This is a non-limiting overview of possible anion formations for ionic liquids.

Common substitute groups (a) suited for use of the anions 211 provided in Table 1 include: —F⁻, —Cl⁻, —Br⁻, —I⁻, —OCH$_3$⁻, —CN⁻, —SCN⁻, —C$_2$H$_3$O$_2$⁻, —ClO⁻, —ClO$_2$⁻, —ClO$_3$⁻, —ClO$_4$⁻, —NCO⁻, —NCS⁻, —NCSe⁻, —NCN⁻, —OCH(CH$_3$)$_2$⁻, —CH$_2$OCH$_3$⁻, —COOH⁻, —OH⁻, —SOCH$_3$⁻, —SO$_2$CH$_3$⁻, —SOCH$_3$⁻, —SO$_2$CF$_3$⁻, —SO$_3$H⁻, —SO$_3$CF$_3$⁻, —O(CF$_3$)$_2$C$_2$(CF$_3$)$_2$O⁻, —CF$_3$⁻, —CHF$_2$⁻, —CH$_2$F⁻, —CH$_3$⁻, —NO$_3$⁻, —NO$_2$⁻, —SO$_3$⁻, —SO$_4$²⁻, —SF$_5$⁻, —CB$_{11}$H$_{12}$⁻, —CB$_{11}$H$_6$C$_{16}$⁻, —CH$_3$CB$_{11}$H$_{11}$⁻, —C$_2$HsCB$_{11}$H$_{11}$⁻, -A-PO$_4$⁻, -A-SO$_2$⁻, A-SO$_3$⁻, -A-SO$_3$H⁻, -A-COO⁻, -A-CO⁻ {where A is a phenyl (the phenyl group or phenyl ring is a cyclic group of atoms with the formula C$_6$H$_5$) or substituted phenyl, alkyl, (a radical that has the general formula CnH$_{2n+1}$, formed by removing a hydrogen atom from an alkane) or substituted alkyl group, negatively charged radical alkanes, (alkane are chemical compounds that consist only of hydrogen and carbon atoms and are bonded exclusively by single bonds) halogenated alkanes and ethers (which are a class of organic compounds that contain an oxygen atom connected to two alkyl or aryl groups).

With regard to anions 211 suited for use in an ionic liquid that provides the electrolyte 206, various organic anions 211 may be used. Exemplary anions 211 and structures thereof are provided in Table 1. In a first embodiment, (No. 1), exemplary anions 211 are formulated from the list of substitute groups (a) provided above, or their equivalent. In additional embodiments, (Nos. 2-5), exemplary anions 211 are formulated from a respective base structure (Y$_2$, Y$_3$, Y$_4$, . . . Y$_n$) and a respective number of anion substitute groups ($\alpha_1$, $\alpha_2$, $\alpha_3$, . . . $\alpha_n$), where the respective number of anion substitute groups (a) may be selected from the list of substitute ($\alpha$) groups provided above, or their equivalent. Note that in some embodiments, a plurality of anion substitute groups ($\alpha$) (i.e., at least one differing anion substitute group (a)) may be used in any one embodiment of the anion 11. Also, note that in some embodiments, the base structure (Y) is a single atom or a designated molecule (as described in Table 1), or may be an equivalent.

More specifically, and by way of example, with regard to the exemplary anions provided in Table 1, certain combinations may be realized. As one example, in the case of No. 2, the base structure (Y$_2$) includes a single structure (e.g., an atom, or a molecule) that is bonded to two anion substitute groups ($\alpha_2$). While shown as having two identical anion substitute groups ($\alpha_2$), this need not be the case. That is, the base structure (Y$_2$) may be bonded to varying anion substitute groups ($\alpha_2$), such as any of the anion substitute groups (a) listed above. Similarly, the base structure (Y$_3$) includes a single structure (e.g., an atom) that is bonded to three anion substitute groups ($\alpha_3$), as shown in case No. 3. Again, each of the anion substitute groups ($\alpha$) included in the anion may be varied or diverse, and need not repeat (be repetitive or be symmetric) as shown in Table 1. In general, with regard to the notation in Table 1, a subscript on one of the base structures denotes a number of bonds that the respective base structure may have with anion substitute groups ($\alpha$). That is, the subscript on the respective base structure (Y$_n$) denotes a number of accompanying anion substitute groups ($\alpha_n$) in the respective anion.

TABLE 1

Exemplary Organic Anions for an Ionic Liquids

| No.: | Ion | Guidelines for Anion Structure and Exemplary Ionic Liquids |
|---|---|---|
| 1 | -$\alpha_1$ | (structure of 1-butyl-3-methylimidazolium with Cl⁻)<br><br>Some of the above $\alpha$ may mix with organic cations to form an ionic liquid.<br>An exemplary anion: Cl⁻ Exemplary ionic liquid: [BMI*][Cl] |
| 2 | —Y$_2\alpha_2$ | (structure of 1-ethyl-3-methylimidazolium with bis(trifluoromethylsulfonyl)imide)<br><br>Y$_2$ may be any of the following: N, O, C═O, S═O.<br>Exemplary anions include: B (CF$_3$C0$_2$)$_4$⁻ N(SO$_2$CF$_3$)$_2$⁻<br>Exemplary ionic liquid: [EMI*][NTF$_2$] |

TABLE 1-continued

Exemplary Organic Anions for an Ionic Liquids

| No.: | Ion | Guidelines for Anion Structure and Exemplary Ionic Liquids |
|---|---|---|
| 3 | $-Y_3\alpha_3$ | 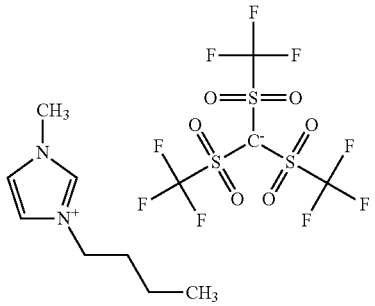<br>$Y_3$ may be any of the following: Be, C, N, O, Mg, Ca, Ba, Ra, Au.<br>Exemplary anions include:<br>—$C(SO_2CF_3)_3^-$<br>Exemplary ionic liquid: [BMI] $C(SO_2CF_3)_3^-$ |
| 4 | $-Y_4\alpha_4$ | 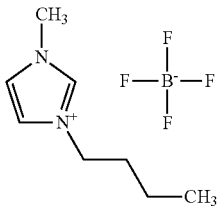<br>$Y_4$ may be any of the following: B, Al, Ga, Th, In, P.<br>Exemplary anions include:<br>—$BF_4^-$, —$AlCl_4^-$<br>Exemplary ionic liquid: [BMI][$BF_4$] |
| 5 | $-Y_6\alpha_6$ | 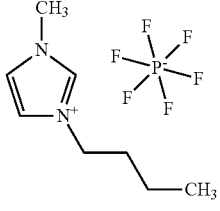<br>$Y_6$ may be any of the following: P, S, Sb, As, N, Bi, Nb, Sb.<br>Exemplary anions include:<br>—$P(CF_3)_4F_2^-$, —$AsF_6^-$<br>Exemplary ionic liquid: [BMI][$BF_6$] |

\*BMI—butyl methyl immadizolium
\*EMI—ethyl methyl immadizolium

The term "cyano" is given its ordinary meaning in the art and refers to the group, CN. The term "sulfate" is given its ordinary meaning in the art and refers to the group, $SO_2$. The term "sulfonate" is given its ordinary meaning in the art and refers to the group, $SO_3X$, where X may be an electron pair, hydrogen, alkyl or cycloalkyl. The term "carbonyl" is recognized in the art and refers to the group, C=O.

An important aspect for consideration in construction of the ultracapacitor 210 is maintaining good chemical hygiene. In order to assure purity of the components, in various embodiments, the activated carbon, carbon fibers, rayon, carbon cloth, and/or nanotubes making up the energy storage media 201 for the two electrodes 203, are dried at elevated temperature in a vacuum environment. The separator 205 is also dried at elevated temperature in a vacuum environment. Once the electrodes 203 and the separator 205 are dried under vacuum, they are packaged in the housing 207 without a final seal or cap in an atmosphere with less than 50 parts per million (ppm) of water. The uncapped ultracapacitor 210 may be dried, for example, under vacuum over a temperature range of about 100 degrees Celsius to about 300 degrees Celsius. Once this final drying is complete, the electrolyte 206 may be added and the housing 207 is sealed in a relatively dry atmosphere (such as an atmosphere with less than about 50 ppm of moisture). Of course, other methods of assembly may be used, and the foregoing provides merely a few exemplary aspects of assembly of the ultracapacitor 210.

Generally, impurities in the electrolyte 206 are kept to a minimum. For example, in some embodiments, a total concentration of halide ions (chloride, bromide, fluoride, iodide), is kept to below about 1,000 ppm. A total concentration of metallic species (e.g., Br, Cd, Co, Cr, Cu, Fe, K, Li, Mo, Na, Ni, Pb, Zn, including an at least one of an alloy and an oxide thereof), is kept to below about 1,000 ppm. Further, impurities from solvents and precursors used in the synthesis process are kept below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 210 has been measured using ion selective electrodes and the Karl Fischer titration procedure, which has been applied to electrolyte 206 of the ultracapacitor 210. It has been found that the total halide content in the ultracapacitor 210 according to the teachings herein has been found to be less than about 200 ppm of halides ($Cl^-$ and $F^-$) and water content is less than about 100 ppm.

Impurities can be measured using a variety of techniques, such as, for example, Atomic Absorption Spectrometry (AAS), Inductively Coupled Plasma-Mass Spectometry (ICPMS), or simplified solubilizing and electrochemical sensing of trace heavy metal oxide particulates. AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over seventy different elements in solution or directly in solid samples. ICPMS is a type of mass spectrometry that is highly sensitive and capable of the determination of a range of metals and several non-metals at concentrations below one part in $10^{12}$ (part per trillion). This technique is based on coupling together an inductively coupled plasma as a method of producing ions (ionization) with a mass spectrometer as a method of separating and detecting the ions. ICPMS is also capable of monitoring isotopic speciation for the ions of choice.

Additional techniques may be used for analysis of impurities. Some of these techniques are particularly advantageous for analyzing impurities in solid samples. Ion Chromatography (IC) may be used for determination of trace levels of halide impurities in the electrolyte 206 (e.g., an ionic liquid). One advantage of Ion Chromatography is that relevant halide species can be measured in a single chromatographic analysis. A Dionex AS9-HC column using an eluent consisting 20 mM NaOH and 10% (v/v) acetonitrile is one example of an apparatus that may be used for the quantification of halides from the ionic liquids. A further technique is that of X-ray fluorescence.

X-ray fluorescence (XRF) instruments may be used to measure halogen content in solid samples. In this technique, the sample to be analyzed is placed in a sample cup and the sample cup is then placed in the analyzer where it is irradiated with X-rays of a specific wavelength. Any halogen atoms in the sample absorb a portion of the X-rays and then reflect radiation at a wavelength that is characteristic for a given halogen. A detector in the instrument then quantifies the amount of radiation coming back from the halogen atoms and measures the intensity of radiation. By knowing the surface area that is exposed, concentration of halogens in the sample can be determined. A further technique for assessing impurities in a solid sample is that of pyrolysis.

Adsorption of impurities may be effectively measured through use of pyrolysis and microcoulometers. Microcoulometers are capable of testing almost any type of material for total chlorine content. As an example, a small amount of sample (less than 10 milligrams) is either injected or placed into a quartz combustion tube where the temperature ranges from about 600 degrees Celsius to about 1,000 degrees Celsius. Pure oxygen is passed through the quartz tube and any chlorine containing components are combusted completely. The resulting combustion products are swept into a titration cell where the chloride ions are trapped in an electrolyte solution. The electrolyte solution contains silver ions that immediately combine with any chloride ions and drop out of solution as insoluble silver chloride. A silver electrode in the titration cell electrically replaces the used up silver ions until the concentration of silver ions is back to where it was before the titration began. By keeping track of the amount of current needed to generate the required amount of silver, the instrument is capable of determining how much chlorine was present in the original sample. Dividing the total amount of chlorine present by the weight of the sample gives the concentration of chlorine that is actually in the sample. Other techniques for assessing impurities may be used.

Surface characterization and water content in the electrode 203 may be examined, for example, by infrared spectroscopy techniques. The four major absorption bands at around 1130, 1560, 3250 and 2300 cm$^{-1}$, correspond to $\nu C=O$ in, $\nu C=C$ in aryl, $\nu C-H$ and $\nu C-N$, respectively. By measuring the intensity and peak position, it is possible to quantitatively identify the surface impurities within the electrode 203.

Another technique for identifying impurities in the electrolyte 206 and the ultracapacitor 210 is Raman spectroscopy. This spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. Thus, this technique may be used to characterize atoms and molecules within the ultracapacitor 210. A number of variations of Raman spectroscopy are used, and may prove useful in characterizing contents the ultracapacitor 210.

Once the ultracapacitor 210 is fabricated, it may be used in high temperature applications with little or no leakage current and little increase in resistance. The ultracapacitor 210 described herein can operate efficiently at temperatures from about minus 40 degrees Celsius to about 210 degrees Celsius with leakage currents normalized over the volume of the device less than 1 amp per liter (A/L) of volume of the device within the entire operating voltage and temperature range.

By reducing the moisture content in the ultracapacitor 210 (e.g., to less than 500 part per million (ppm) over the weight and volume of the electrolyte and the impurities to less than 1,000 ppm), the ultracapacitor 210 can efficiently operate over the temperature range, with a leakage current (I/L) that is less than 1,000 mAmp per Liter within that temperature range and voltage range.

In one embodiment, leakage current (I/L) at a specific temperature is measured by holding the voltage of the ultracapacitor 210 constant at the rated voltage (i.e., the maximum rated operating voltage) for seventy two (72) hours. During this period, the temperature remains relatively constant at the specified temperature. At the end of the measurement interval, the leakage current of the ultracapacitor 210 is measured.

In some embodiments, a maximum voltage rating of the ultracapacitor 210 is about 4 V at room temperature. An approach to ensure performance of the ultracapacitor 210 at elevated temperatures (for example, over 210 degrees Celsius), is to derate (i.e., to reduce) the voltage rating of the ultracapacitor 210. For example, the voltage rating may be adjusted down to about 0.5 V, such that extended durations of operation at higher temperature are achievable.

Another embodiment for ensuring a high degree of purity includes an exemplary process for purifying the electrolyte 206. It should be noted that although the process is presented in terms of specific parameters (such as quantities, formulations, times and the like), that the presentation is merely exemplary and illustrative of the process for purifying electrolyte and is not limiting thereof.

In a first step of the process for purifying electrolyte, the electrolyte 206 (in some embodiments, the ionic liquid) is mixed with deionized water, and then raised to a moderate temperature for some period of time. In a proof of concept, fifty (50) milliliters (ml) of ionic liquid was mixed with eight hundred and fifty (850) milliliters (ml) of the deionized water. The mixture was raised to a constant temperature of sixty (60) degrees Celsius for about twelve (12) hours and subjected to constant stirring (of about one hundred and twenty (120) revolutions per minute (rpm)).

In a second step, the mixture of ionic liquid and deionized water is permitted to partition. In this example, the mixture was transferred via a funnel, and allowed to sit for about four (4) hours.

In a third step, the ionic liquid is collected. In this example, a water phase of the mixture resided on the bottom, with an ionic liquid phase on the top. The ionic liquid phase was transferred into another beaker.

In a fourth step, a solvent was mixed with the ionic liquid. In this example, a volume of about twenty five (25) milliliters (ml) of ethyl acetate was mixed with the ionic liquid. This mixture was again raised to a moderate temperature and stirred for some time.

Although ethyl acetate was used as the solvent, the solvent can be at least one of diethylether, pentone, cyclopentone, hexane, cyclohexane, benzene, toluene, 1-4 dioxane, chloroform or any combination thereof as well as other material(s) that exhibit appropriate performance characteristics. Some of the desired performance characteristics include those of a non-polar solvent as well as a high degree of volatility.

In a fifth step, carbon powder is added to the mixture of the ionic liquid and solvent. In this example, about twenty (20) weight percent (wt %) of carbon (of about a 0.45 micrometer diameter) was added to the mixture.

In a sixth step, the ionic liquid is again mixed. In this example, the mixture with the carbon powder was then subjected to constant stirring (120 rpm) overnight at about seventy (70) degrees Celsius.

In a seventh step, the carbon and the ethyl acetate are separated from the ionic liquid. In this example, the carbon was separated using Buchner filtration with a glass microfiber filter. Multiple filtrations (three) were performed. The ionic liquid collected was then passed through a 0.2 micrometer syringe filter in order to remove substantially all of the carbon particles. In this example, the solvent was then subsequently separated from the ionic liquid by employing rotary evaporation. Specifically, the sample of ionic liquid was stirred while increasing temperature from seventy (70) degrees Celsius to eighty (80) degrees Celsius, and finished at one hundred (100) degrees Celsius. Evaporation was performed for about fifteen (15) minutes at each of the respective temperatures.

The process for purifying electrolyte has proven to be very effective. For the sample ionic liquid, water content was measured by titration, with a titration instrument provided by Mettler-Toledo Inc., of Columbus, Ohio (model No: AQC22). Halide content was measured with an ISE instrument provided by Hanna Instruments of Woonsocket, R.I. (model no. AQC22). The standards solution for the ISE instrument was obtained from Hanna, and included HI 4007-03 (1,000 ppm chloride standard), HI 4010-03 (1,000 ppm fluoride standard) HI 4000-00 (ISA for halide electrodes), and HI 4010-00 (TISAB solution for fluoride electrode only). Prior to performing measurements, the ISE instrument was calibrated with the standards solutions using 0.1, 10, 100 and 1,000 parts per million (ppm) of the standards, mixed in with deionized water. ISA buffer was added to the standard in a 1:50 ratio for measurement of $Cl^-$ ions. Results are shown in Table 2.

TABLE 2

Purification Data for Electrolyte

| Impurity | Before (ppm) | After (ppm) |
|---|---|---|
| $Cl^-$ | 5,300.90 | 769 |
| F- | 75.61 | 10.61 |
| $H_2O$ | 1080 | 20 |

A four step process was used to measure the halide ions. First, $Cl^-$ and $F^-$ ions were measured in the deionized water. Next, a 0.01 M solution of ionic liquid was prepared with deionized water. Subsequently, $Cl^-$ and $F^-$ ions were measured in the solution. Estimation of the halide content was then determined by subtracting the quantity of ions in the water from the quantity of ions in the solution.

As an overview, a method of assembly of a cylindrically shaped ultracapacitor 210 is provided. Beginning with the electrodes 203, each electrode 203 is fabricated once the energy storage media 201 has been associated with the current collector 202. A plurality of leads is then coupled to each electrode 203 at appropriate locations. A plurality of electrodes 203 are then oriented and assembled with an appropriate number of separators 205 there between to form the storage cell 212. The storage cell 212 may then be rolled into a cylinder, and may be secured with a wrapper. Generally, respective ones of the leads are then bundled to form each of the terminals 208.

Prior to incorporation of the electrolyte 206 into the ultracapacitor 210 (such as prior to assembly of the storage cell 212, or thereafter) each component of the ultracapacitor 210 may be dried to remove moisture. This may be performed with unassembled components (i.e., an empty housing 207, as well as each of the electrodes 203 and each of the separators 205), and subsequently with assembled components (such as the storage cell 212).

Drying may be performed, for example, at an elevated temperature in a vacuum environment. Once drying has been performed, the storage cell 212 may then be packaged in the housing 207 without a final seal or cap. In some embodiments, the packaging is performed in an atmosphere with less than 50 parts per million (ppm) of water. The uncapped ultracapacitor 210 may then be dried again. For example, the ultracapacitor 210 may be dried under vacuum over a temperature range of about 100 degrees Celsius to about 300 degrees Celsius. Once this final drying is complete, the housing 207 may then be sealed in, for example, an atmosphere with less than 50 ppm of moisture.

In some embodiments, once the drying process (which may also be referred to a "baking" process) has been completed, the environment surrounding the components may be filled with an inert gas. Exemplary gasses include argon, nitrogen, helium, and other gasses exhibiting similar properties (as well as combinations thereof).

Generally, a fill port (a perforation in a surface of the housing 207) is included in the housing 207, or may be later added. Once the ultracapacitor 210 has been filled with electrolyte 206, the fill port may then be closed. Closing the fill port may be completed, for example, by welding material (e.g., a metal that is compatible with the housing 207) into or over the fill port. In some embodiments, the fill port may be temporarily closed prior to filling, such that the ultracapacitor 210 may be moved to another environment, for subsequent re-opening, filling and closure. However, as discussed herein, it is considered that the ultracapacitor 210 is dried and filled in the same environment.

A number of methods may be used to fill the housing 207 with a desired quantity of electrolyte 206. Generally, controlling the fill process may provide for, among other things, increases in capacitance, reductions in equivalent-series-resistance (ESR), and limiting waste of electrolyte 206. A vacuum filling method is provided as a non-limiting example of a technique for filling the housing 207 and wetting the storage cell 212 with the electrolyte 206.

First, however, note that measures may be taken to ensure that any material that has a potential to contaminate components of the ultracapacitor 210 is clean, compatible and dry. As a matter of convention, it may be considered that "good hygiene" is practiced to ensure assembly processes and components do not introduce contaminants into the ultracapacitor 210. Also, as a matter of convention, it may be considered that a "contaminant" may be defined as any unwanted material that will negatively affect performance of the ultracapacitor 210 if introduced. Also note, that generally herein, contaminants may be assessed as a concentration, such as in parts-per-million (ppm). The concentration may be taken as by weight, volume, sample weight, or in any other manner as determined appropriate.

In the "vacuum method" a container is placed onto the housing 207 around the fill port. A quantity of electrolyte 206 is then placed into the container in an environment that is substantially free of oxygen and water (i.e., moisture). A vacuum is then drawn in the environment, thus pulling any air out of the housing and thus simultaneously drawing the electrolyte 206 into the housing 207. The surrounding environment may then be refilled with inert gas (such as argon, nitrogen, or the like, or some combination of inert gases), if desired. The ultracapacitor 210 may be checked to see if the desired amount of electrolyte 206 has been drawn in. The process may be repeated as necessary until the desired amount of electrolyte 206 is in the ultracapacitor 210.

After filling with electrolyte 206, in some embodiments, material may be fit into the fill port to seal the ultracapacitor 210. The material may be, for example, a metal that is compatible with the housing 207 and the electrolyte 206. In one example, material is force fit into the fill port, essentially performing a "cold weld" of a plug in the fill port. Of course, the force fit may be complimented with other welding techniques as discussed further herein.

In order to show how the fill process effects the ultracapacitor 210, two similar embodiments of the ultracapacitor 210 were built. One was filled without a vacuum, the other was filled under vacuum. Electrical performance of the two embodiments is provided in Table 3. By repeated performance of such measurements, it has been noted that increased performance is realized with by filling the ultracapacitor 210 through applying a vacuum. It has been determined that, in general, is desired that pressure within the housing 207 is reduced to below about 150 mTorr, and more particularly to below about 40 mTorr.

TABLE 3

Comparative Performance for Fill Methods

| Parameter (at 0.1 V) | Without vacuum | With vacuum | Deviation |
| --- | --- | --- | --- |
| ESR @ 45° Φ | 3.569 Ohms | 2.568 Ohms | (−28%) |
| Capacitance @ 12 mHz | 155.87 mF | 182.3 mF | (+14.49%) |
| Phase @ 12 mHz | 79.19 degrees | 83 degrees | (+4.59%) |

In order to evaluate efficacy of vacuum filling techniques, two different pouch cells were tested. The pouch cells included two electrodes 203, each electrode 203 being based on carbonaceous material. Each of the electrodes 203 were placed opposite and facing each other. The separator 205 was disposed between them to prevent short circuit and everything was soaked in electrolyte 206. Two external tabs were used to provide for four measurement points. The separator 205 used was a polyethylene separator 205, and the cell had a total volume of about 0.468 ml. This resulted in a substantial decrease in initial leakage current, as well as a decrease in leakage current over the later portion of the measurement interval.

Leakage current may be determined in a number of ways. Qualitatively, leakage current may be considered as current drawn into a device, once the device has reached a state of equilibrium. In practice, it is always or almost always necessary to estimate the actual leakage current as a state of equilibrium that may generally only be asymptotically approached. Thus, the leakage current in a given measurement may be approximated by measuring the current drawn into the ultracapacitor 210, while the ultracapacitor 210 is held at a substantially fixed voltage and exposed to a substantially fixed ambient temperature for a relatively long period of time. In some instances, a relatively long period of time may be determined by approximating the current time function as an exponential function, then allowing for several (e.g, about 3 to 5) characteristic time constants to pass. Often, such a duration ranges from about 50 hours to about 100 hours for many ultracapacitor technologies. Alternatively, if such a long period of time is impractical for any reason, the leakage current may simply be extrapolated, again, perhaps, by approximating the current time function as an exponential or any approximating function deemed appropriate. Notably, leakage current will generally depend on ambient temperature. So, in order to characterize performance of a device at a temperature or in a temperature range, it is generally important to expose the device to the ambient temperature of interest when measuring leakage current.

Figure 10:
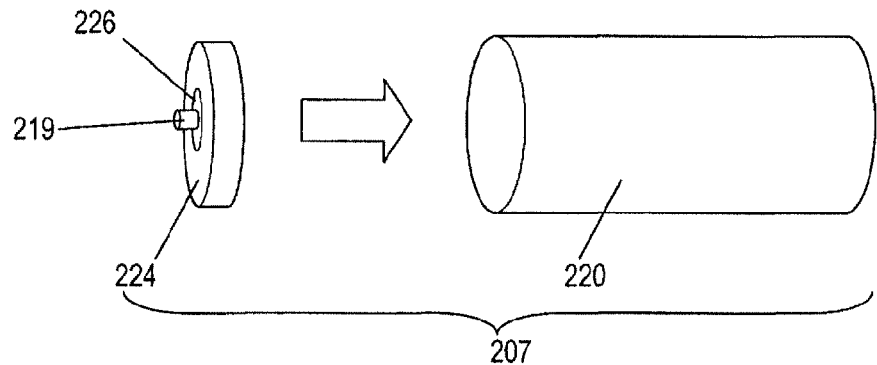
FIG. 10 depicts an embodiment of a housing for the exemplary ultracapacitor.

Refer now to FIG. 10, where aspects of an exemplary housing 207 are shown. Among other things, the housing 207 provides structure and physical protection for the ultracapacitor 210. In this example, the housing 207 includes an annular cylindrically shaped body 220 and a complimentary cap 224. In this embodiment, the cap 224 includes a central portion that has been removed and filled with an electrical insulator 226. A cap feed-through 219 penetrates through the electrical insulator 226 to provide users with access to the stored energy.

Common materials for the housing 207 include stainless steel, aluminum, tantalum, titanium, nickel, copper, tin, various alloys, laminates, and the like. Structural materials, such as some polymer-based materials may be used in the housing 207 (generally in combination with at least some metallic components).

Although this example depicts only one feed-through 219 on the cap 224, it should be recognized that the construction of the housing 207 is not limited by the embodiments discussed herein. For example, the cap 224 may include a plurality of feed-throughs 219. In some embodiments, the body 220 includes a second, similar cap 224 at an opposing end of the annular cylinder. Further, it should be recognized that the housing 207 is not limited to embodiments having an annular cylindrically shaped body 220. For example, the housing 207 may be a clamshell design, a prismatic design, a pouch, or of any other design that is appropriate for the needs of the designer, manufacturer or user.

In this example, the cap 224 is fabricated with an outer diameter that is designed for fitting snugly within an inner diameter of the body 220. When assembled, the cap 224 may be welded into the body 220, thus providing users with a hermetic seal.

Figure 11:
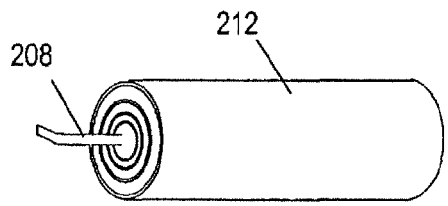
FIG. 11 illustrates an embodiment of a storage cell for the exemplary capacitor.

Referring now to FIG. 11, there is shown an exemplary energy storage cell 212. In this example, the energy storage cell 212 is a "jelly roll" type of energy storage. In these embodiments, the energy storage materials are rolled up into a tight package. A plurality of leads generally form each terminal 208 and provide electrical access to the appropriate layer of the energy storage cell 212. Generally, when assembled, each terminal 208 is electrically coupled to the housing 207 (such as to a respective feed-through 219 and/or directly to the housing 207). The energy storage cell 212 may assume a variety of forms. There are generally at least two plurality of leads (e.g., terminals 208), one for each current collector 202. For simplicity, only one of terminal 208 is shown in a number of embodiments illustrated herein.

A highly efficient seal of the housing 207 is desired. That is, preventing intrusion of the external environment (such as air, humidity, etc, . . . ) helps to maintain purity of the components of the energy storage cell 212. Further, this prevents leakage of electrolyte 206 from the energy storage cell 212.

Figure 12:
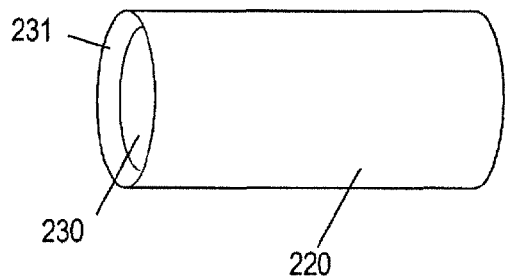
FIG. 12 depicts a barrier disposed on an interior portion of a body of the housing.

Referring now to FIG. 12, the housing 207 may include an inner barrier 230. In some embodiments, the barrier 230 is a coating. In this example, the barrier 230 is formed of polytetrafluoroethylene (PTFE). Polytetrafluoroethylene (PTFE) exhibits various properties that make this composition well suited for the barrier 30. PTFE has a melting point of about 327 degrees Celsius, has excellent dielectric properties, has a coefficient of friction of between about 0.05 to 0.10, which is the third-lowest of any known solid material, has a high corrosion resistance and other beneficial properties. Generally, an interior portion of the cap 224 may include the barrier 230 disposed thereon.

Other materials may be used for the barrier 230. Among these other materials are forms of ceramics (any type of ceramic that may be suitably applied and meet performance criteria), other polymers (preferably, a high temperature polymer) and the like. Exemplary other polymers include perfluoroalkoxy (PFA) and fluorinated ethylene propylene (FEP) as well as ethylene tetrafluoroethylene (ETFE).

The barrier 230 may include any material or combinations of materials that provide for reductions in electrochemical or other types of reactions between the energy storage cell 212 and the housing 207 or components of the housing 207. In some embodiments, the combinations are manifested as homogeneous dispersions of differing materials within a single layer. In other embodiments, the combinations are manifested as differing materials within a plurality of layers. Other combinations may be used. In short, the barrier 230 may be considered as at least one of an electrical insulator and chemically inert (i.e., exhibiting low reactivity) and therefore substantially resists or impedes at least one of electrical and chemical interactions between the storage cell 212 and the housing 207. In some embodiments, the term "low reactivity" and "low chemical reactivity" generally refer to a rate of chemical interaction that is below a level of concern for an interested party.

Figure 13A:
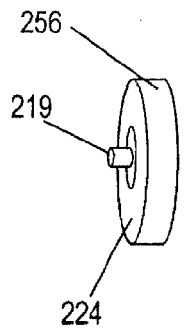
FIGS. 13A and 13B, collectively referred to herein as FIG. 13, depict aspects of a cap for the housing.
Figure 13B:
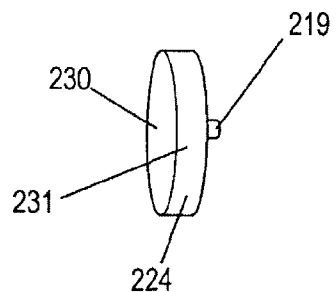

In general, the interior of the housing 207 may be host to the barrier 230 such that all surfaces of the housing 207 which are exposed to the interior are covered. At least one untreated area 231 may be included within the body 220 and on an outer surface 236 of the cap 224 (see FIG. 13A). In some embodiments, untreated areas 231 (see FIG. 13B) may be included to account for assembly requirements, such as areas which will be sealed or connected (such as by welding).

The barrier 230 may be applied to the interior portions using conventional techniques. For example, in the case of PTFE, the barrier 230 may be applied by painting or spraying the barrier 230 onto the interior surface as a coating. A mask may be used as a part of the process to ensure untreated areas 231 retain desired integrity. In short, a variety of techniques may be used to provide the barrier 230.

Figure 14:
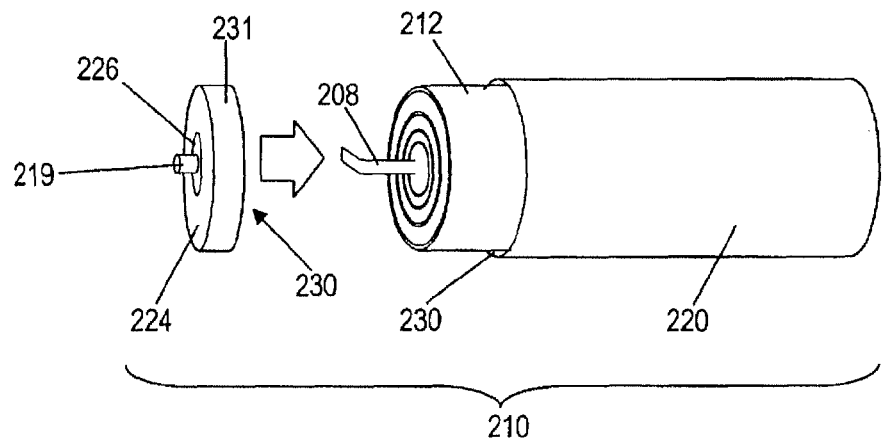
FIG. 14 depicts assembly of the ultracapacitor according to the teachings herein.

In an exemplary embodiment, the barrier 230 is about 3 mil to about 5 mil thick, while material used for the barrier 230 is a PFA based material. In this example, surfaces for receiving the material that make up the barrier 230 are prepared with grit blasting, such as with aluminum oxide. Once the surfaces are cleaned, the material is applied, first as a liquid then as a powder. The material is cured by a heat treating process. In some embodiments, the heating cycle is about 10 minutes to about 15 minutes in duration, at temperatures of about 370 degrees Celsius. This results in a continuous finish to the barrier 230 that is substantially free of pin-hole sized or smaller defects. FIG. 14 depicts assembly of an embodiment of the ultracapacitor 210 according to the teachings herein. In this embodiment, the ultracapacitor 210 includes the body 220 that includes the barrier 230 disposed therein, a cap 224 with the barrier 230 disposed therein, and the energy storage cell 212. During assembly, the cap 224 is set over the body 220. A first one of the terminals 208 is electrically coupled to the cap feed-through 219, while a second one of the terminals 208 is electrically coupled to the housing 207, typically at the bottom, on the side or on the cap 224. In some embodiments, the second one of the terminals 208 is coupled to another feed-through 219 (such as of an opposing cap 224).

With the barrier 230 disposed on the interior surface(s) of the housing 207, electrochemical and other reactions between the housing 207 and the electrolyte are greatly reduced or substantially eliminated. This is particularly significant at higher temperatures where a rate of chemical and other reactions is generally increased.

Figure 15A:
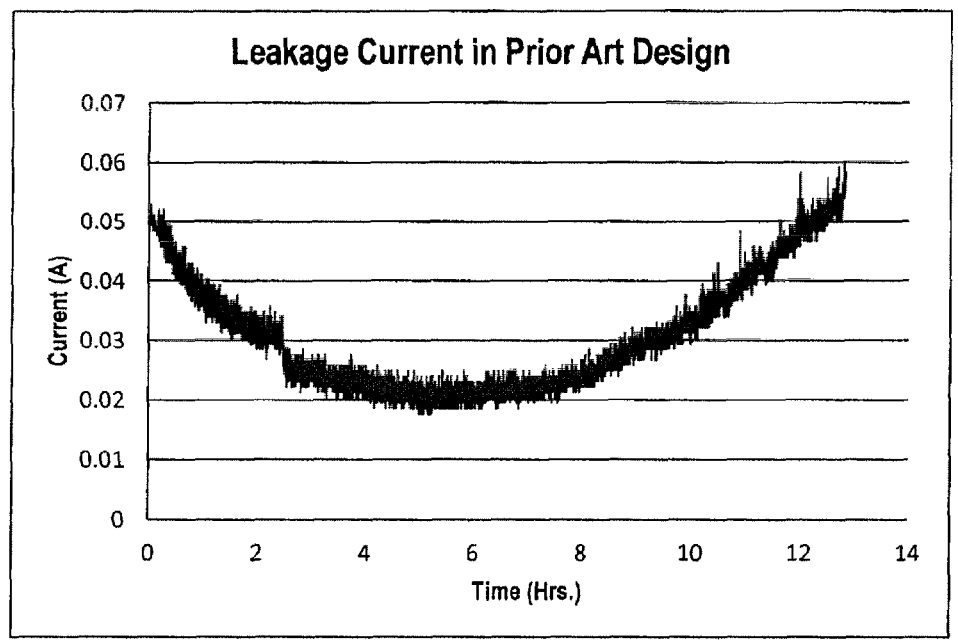
FIGS. 15A and 15B, collectively referred to herein as FIG. 15, are graphs depicting performance for the ultracapacitor for an embodiment without a barrier and a similar embodiment that includes the barrier, respectively.
Figure 15B:
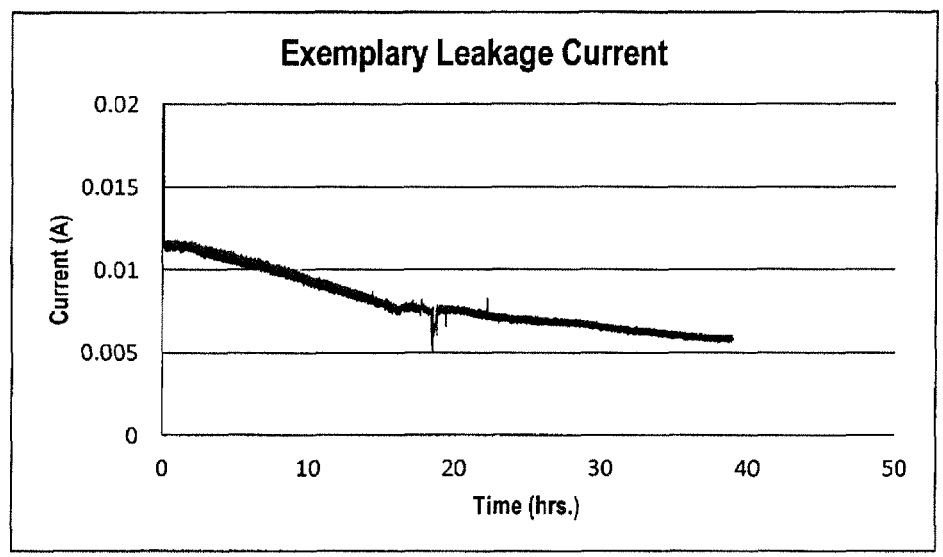

Referring now to FIG. 15, there is shown relative performance of the ultracapacitor 210 in comparison to an otherwise equivalent ultracapacitor. In FIG. 15A, leakage current is shown for a prior art embodiment of the ultracapacitor 210. In FIG. 15B, leakage current is shown for an equivalent ultracapacitor 210 that includes the barrier 230. In FIG. 15B, the ultracapacitor 210 is electrically equivalent to the ultracapacitor whose leakage current is shown in FIG. 15A. In both cases, the housing 207 was stainless steel, and the voltage supplied to the cell was 1.75 Volts, and electrolyte was not purified. Temperature was held a constant 150 degrees Celsius. Notably, the leakage current in FIG. 15B indicates a comparably lower initial value and no substantial increase over time while the leakage current in FIG. 15A indicates a comparably higher initial value as well as a substantial increase over time.

Generally, the barrier 230 provides a suitable thickness of suitable materials between the energy storage cell 212 and the housing 207. The barrier 230 may include a homogeneous mixture, a heterogeneous mixture and/or at least one layer of materials. The barrier 230 may provide complete coverage (i.e., provide coverage over the interior surface area of the housing with the exception of electrode contacts) or partial coverage. In some embodiments, the barrier 230 is formed of multiple components. Consider, for example, the embodiment presented below and illustrated in FIG. 16.

Figure 16:
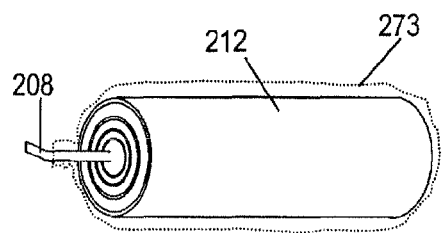
FIG. 16 depicts the barrier disposed about the storage cell as a wrapper.

Referring to FIG. 16, aspects of an additional embodiment are shown. In some embodiments, the energy storage cell 212 is deposited within an envelope 233. That is, the energy storage cell 212 has the barrier 230 disposed thereon, wrapped thereover, or otherwise applied to separate the energy storage cell 212 from the housing 207 once assembled. The envelope 233 may be applied well ahead of packaging the energy storage cell 212 into the housing 207. Therefore, use of an envelope 233 may present certain advantages, such as to manufacturers. (Note that the envelope 233 is shown as loosely disposed over the energy storage cell 212 for purposes of illustration).

In some embodiments, the envelope 233 is used in conjunction with the coating, wherein the coating is disposed over at least a portion of the interior surfaces. For example, in one embodiment, the coating is disposed within the interior of the housing 207 only in areas where the envelope 233 may be at least partially compromised (such as be a protruding terminal 208). Together, the envelope 233 and the coating form an efficient barrier 230.

Accordingly, incorporation of the barrier 230 may provide for an ultracapacitor that exhibits leakage current with comparatively low initial values and substantially slower increases in leakage current over time in view of the prior art. Significantly, the leakage current of the ultracapacitor 210 remains at practical (i.e., desirably low) levels when the ultracapacitor is exposed to ambient temperatures for which prior art capacitors would exhibit prohibitively large initial values of leakage current and/or prohibitively rapid increases in leakage current over time.

As a matter of convention, the term "leakage current" generally refers to current drawn by the capacitor which is measured after a given period of time. This measurement is performed when the capacitor terminals are held at a substantially fixed potential difference (terminal voltage). When assessing leakage current, a typical period of time is seventy two (72) hours, although different periods may be used. It is noted that leakage current for prior art capacitors generally increases with increasing volume and surface area of the energy storage media and the attendant increase in the inner surface area of the housing. In general, an increasing leakage current is considered to be indicative of progressively increasing reaction rates within the ultracapacitor 210. Performance requirements for leakage current are generally defined by the environmental conditions prevalent in a particular application. For example, with regard to an ultracapacitor 210 having a volume of 20 mL, a practical limit on leakage current may fall below 100 mA.

Having thus described embodiments of the barrier 230, and various aspects thereof, it should be recognized the ultracapacitor 210 may exhibit other benefits as a result of reduced reaction between the housing 207 and the energy storage media 201. For example, an effective series resistance (ESR) of the ultracapacitor 210 may exhibit comparatively lower values over time. Further, unwanted chemical reactions that take place in a prior art capacitor often create unwanted effects such as out-gassing, or in the case of a hermetically sealed housing, bulging of the housing. In both cases, this leads to a compromise of the structural integrity of the housing and/or hermetic seal of the capacitor. Ultimately, this may lead to leaks or catastrophic failure of the prior art capacitor. In some embodiments, these effects may be substantially reduced or eliminated by the application of a disclosed barrier 230.

It should be recognized that the terms "barrier" and "coating" are not limiting of the teachings herein. That is, any technique for applying the appropriate material to the interior of the housing 207, body 220 and/or cap 224 may be used. For example, in other embodiments, the barrier 230 is actually fabricated into or onto material making up the housing body 220, the material then being worked or shaped as appropriate to form the various components of the housing 207. When considering some of the many possible techniques for applying the barrier 230, it may be equally appropriate to roll on, sputter, sinter, laminate, print, or otherwise apply the material(s). In short, the barrier 230 may be applied using any technique deemed appropriate by a manufacturer, designer and/or user.

Materials used in the barrier 230 may be selected according to properties such as reactivity, dielectric value, melting point, adhesion to materials of the housing 207, coefficient of friction, cost, and other such factors. Combinations of materials (such as layered, mixed, or otherwise combined) may be used to provide for desired properties.

Using an enhanced housing 207, such as one with the barrier 230, may, in some embodiments, limit degradation of the electrolyte 206. While the barrier 230 presents one technique for providing an enhanced housing 207, other techniques may be used. For example, use of a housing 207 fabricated from aluminum would be advantageous, due to the electrochemical properties of aluminum in the presence of electrolyte 206. However, given the difficulties in fabrication of aluminum, it has not been possible (until now) to construct embodiments of the housing 207 that take advantage of aluminum.

Additional embodiments of the housing 207 include those that present aluminum to all interior surfaces, which may be exposed to electrolyte, while providing users with an ability to weld and hermetically seal the housing. Improved performance of the ultracapacitor 210 may be realized through reduced internal corrosion, elimination of problems associated with use of dissimilar metals in a conductive media and for other reasons. Advantageously, the housing 7 makes use of existing technology, such available electrode inserts that include glass-to-metal seals (and may include those fabricated from stainless steel, tantalum or other advantageous materials and components), and therefore is economic to fabricate.

Although disclosed herein as embodiments of the housing 207 that are suited for the ultracapacitor 10, these embodiments (as is the case with the barrier 230) may be used with any type of energy storage deemed appropriate, and may include any type of technology practicable. For example, other forms of energy storage may be used, including electrochemical batteries, in particular, lithium based batteries.

In some embodiments, a material used for construction of the body 220 includes aluminum, which may include any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 220). Additional materials (such as structural materials or electrically insulative materials, such as some polymer-based materials) may be used to compliment the body and/or the housing 207. The materials disposed over the aluminum may likewise be chosen by what is deemed appropriate by a designer or fabricator.

In general, the material(s) exposed to an interior of the housing 207 exhibit adequately low reactivity when exposed to the electrolyte 206, and therefore are merely illustrative of some of the embodiments and are not limiting of the teachings herein.

Although this example depicts only one feed-through 219 on the cap 224, it should be recognized that the construction of the housing 207 is not limited by the embodiments discussed herein. For example, the cap 224 may include a plurality of feed-throughs 219. In some embodiments, the body 220 includes a second, similar cap 224 at the opposing end of the annular cylinder. Further, it should be recognized that the housing 207 is not limited to embodiments having an annular cylindrically shaped body 220. For example, the housing 207 may be a clamshell design, a prismatic design, a pouch, or of any other design that is appropriate for the needs of the designer, manufacturer or user.

A highly efficient seal of the housing 207 is desired. That is, preventing intrusion of the external environment (such as air, humidity, etc, . . . ) helps to maintain purity of the components of the energy storage cell 212. Further, this prevents leakage of electrolyte 206 from the energy storage cell 212.

Figure 17A:
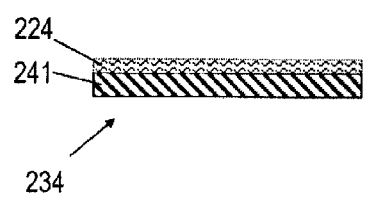
FIGS. 17A, 17B and 17C, collectively referred to herein as FIG. 17, depict embodiments of the cap that include multi-layered materials.

Referring now to FIG. 17, aspects of embodiments of a blank 234 for the cap 224 are shown. In FIG. 17A, the blank 234 includes a multi-layer material. A layer of a first material 241 is aluminum. A layer of a second material 242 is stainless steel. In the embodiments of FIG. 17, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate.

As mentioned above, the layer of first material 241 is clad onto (or with) the layer of second material 242. As used herein, the terms "clad," "cladding" and the like refer to the bonding together of dissimilar metals. Cladding is often achieved by extruding two metals through a die as well as pressing or rolling sheets together under high pressure. Other processes, such as laser cladding, may be used. A result is a sheet of material composed of multiple layers, where the multiple layers of material are bonded together such that the material may be worked with as a single sheet (e.g., formed as a single sheet of homogeneous material would be formed).

Figure 17B:
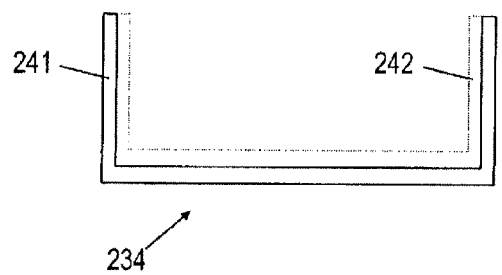
Figure 17C:
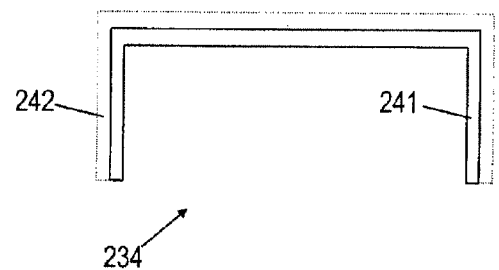

Referring still to FIG. 17A, in one embodiment, a sheet of flat stock (as shown) is used to provide the blank 234 to create a flat cap 224. A portion of the layer of second material 242 may be removed (such as around a circumference of the cap 224) in order to facilitate attachment of the cap 224 to the body 220. In FIG. 17B, another embodiment of the blank 234 is shown. In this example, the blank 234 is provided as a sheet of clad material that is formed into a concave configuration. In FIG. 17C, the blank 234 is provided as a sheet of clad material that is formed into a convex configuration. The cap 224 that is fabricated from the various embodiments of the blank 234 (such as those shown in FIG. 17), are configured to support welding to the body 220 of the housing 207. More specifically, the embodiment of FIG. 17B is adapted for fitting within an inner diameter of the body 220, while the embodiment of FIG. 17C is adapted for fitting over an outer diameter of the body 220. In various alternative embodiments, the layers of clad material within the sheet may be reversed.

When assembled, the cap 224 may be welded to the body 220, thus providing users with a hermetic seal. Exemplary welding techniques include laser welding and TIG welding, and may include other forms of welding as deemed appropriate.

Referring now to FIG. 18, there is shown an embodiment of an electrode assembly 250. The electrode assembly 250 is designed to be installed into the blank 234 and to provide electrical communication from the energy storage media to a user. Generally, the electrode assembly 250 includes a sleeve 251. The sleeve 251 surrounds the insulator 226, which in turn surrounds the feed-through 219. In this example, the sleeve 251 is an annular cylinder with a flanged top portion.

Figure 29:
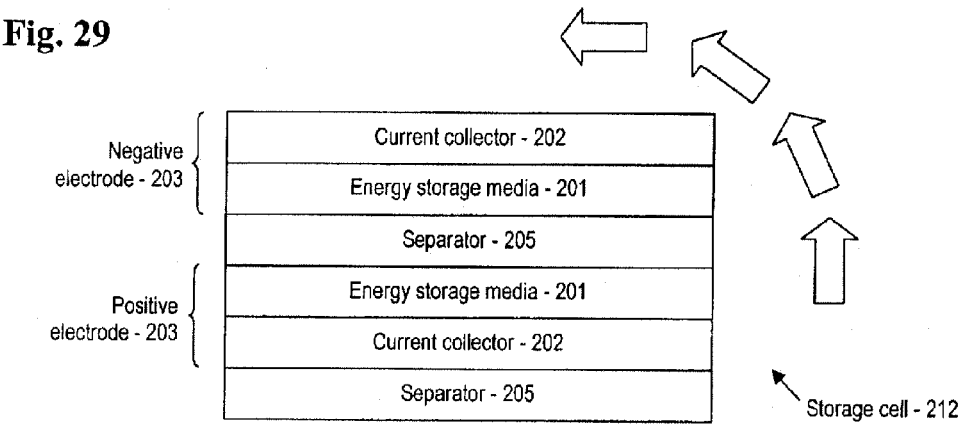
FIG. 29 is a side view of the storage cell, showing the various layers of one embodiment.

In order to assemble the cap 224, a perforation (not shown) is made in the blank 234. The perforation has a geometry that is sized to match the electrode assembly 250. Accordingly, the electrode assembly 250 is inserted into perforation of the blank 234. Once the electrode assembly 250 is inserted, the electrode assembly 250 may be affixed to the blank 234 through a technique such as welding. The welding may be laser welding which welds about a circumference of the flange of sleeve 251. Referring to FIG. 29, points 261 where welding is performed are shown. In this embodiment, the points 261 provide suitable locations for welding of stainless steel to stainless steel, a relatively simple welding procedure. Accordingly, the teachings herein provide for welding the electrode assembly 250 securely into place on the blank 234.

Material for constructing the sleeve 251 may include various types of metals or metal alloys. Generally, materials for the sleeve 251 are selected according to, for example, structural integrity and bondability (to the blank 234).

Exemplary materials for the sleeve 251 include 304 stainless steel or 316 stainless steel. Material for constructing the feed-through 219 may include various types of metals or metal alloys. Generally, materials for the feed-through 219 are selected according to, for example, structural integrity and electrical conductance. Exemplary materials for the electrode include 446 stainless steel or 52 alloy.

Generally, the insulator 226 is bonded to the sleeve 251 and the feed-through 219 through known techniques (i.e., glass-to-metal bonding). Material for constructing the insulator 226 may include, without limitation, various types of glass, including high temperature glass, ceramic glass or ceramic materials. Generally, materials for the insulator are selected according to, for example, structural integrity and electrical resistance (i.e., electrical insulation properties).

Use of components (such as the foregoing embodiment of the electrode assembly 250) that rely on glass-to-metal bonding as well as use of various welding techniques provides for hermetic sealing of the energy storage. Other components may be used to provide hermetic sealing as well. As used herein, the term "hermetic seal" generally refers to a seal that exhibits a leak rate no greater than that which is defined herein. However, it is considered that the actual seal efficacy may perform better than this standard.

Additional or other techniques for coupling the electrode assembly 250 to the blank 234 include use of a bonding agent under the flange of the sleeve 251 (between the flange and the layer of second material 242), when such techniques are considered appropriate.

Referring now to FIG. 20, the energy storage cell 212 is disposed within the body 220. The at least one terminal 208 is coupled appropriately (such as to the feed-through 219), and the cap 224 is mated with the body 220 to provide for the ultracapacitor 210.

Figure 21A:
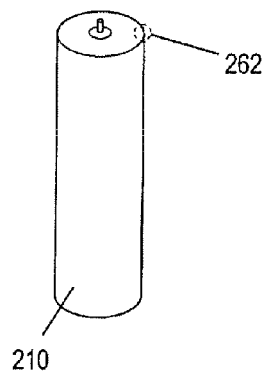
FIGS. 21A, 21B and 21C, collectively referred to herein as FIG. 21, depict embodiments of an assembled energy storage cell.
Figure 21B:
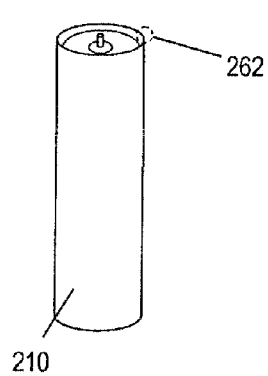
Figure 21C:
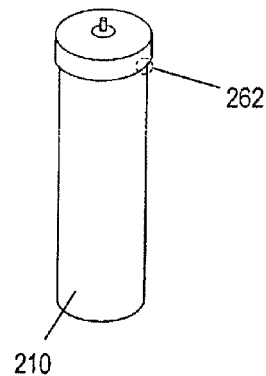

Once assembled, the cap 224 and the body 220 may be sealed. FIG. 21 depicts various embodiments of the assembled energy storage (in this case, the ultracapacitor 210). In FIG. 21A, a flat blank 234 (see FIG. 17A) is used to create a flat cap 224. Once the cap 224 is set on the body 220, the cap 224 and the body 220 are welded to create a seal 262. In this case, as the body 220 is an annular cylinder, the weld proceeds circumferentially about the body 220 and cap 224 to provide the seal 262. In a second embodiment, shown in FIG. 21B, the concave blank 234 (see FIG. 17B) is used to create a concave cap 224. Once the cap 224 is set on the body 220, the cap 224 and the body 220 are welded to create the seal 262. In a third embodiment, shown in FIG. 21C, the convex blank 234 (see FIG. 17C) is used to create a convex cap 224. Once the cap 224 is set on the body 220, the cap 224 and the body 220 may be welded to create the seal 262.

As appropriate, clad material may be removed (by techniques such as, for example, machining or etching, etc, . . . ) to expose other metal in the multi-layer material. Accordingly, in some embodiments, the seal 62 may include an aluminum-to-aluminum weld. The aluminum-to-aluminum weld may be supplemented with other fasteners, as appropriate.

Other techniques may be used to seal the housing 207. For example, laser welding, TIG welding, resistance welding, ultrasonic welding, and other forms of mechanical sealing may be used. It should be noted, however, that in general, traditional forms of mechanical sealing alone are not adequate for providing the robust hermetic seal offered in the ultracapacitor 210.

In some embodiments, the multi-layer material is used for internal components. For example, aluminum may be clad with stainless steel to provide for a multi-layer material in at least one of the terminals 208. In some of these embodiments, a portion of the aluminum may be removed to expose the stainless steel. The exposed stainless steel may then be used to attach the terminal 208 to the feed-through 219 by use of simple welding procedures.

Using the clad material for internal components may call for particular embodiments of the clad material. For example, it may be beneficial to use clad material that include aluminum (bottom layer), stainless steel and/or tantalum (intermediate layer) and aluminum (top layer), which thus limits exposure of stainless steel to the internal environment of the ultracapacitor 210. These embodiments may be augmented by, for example, additional coating with polymeric materials, such as PTFE.

In general, assembly of the housing often involves placing the storage cell 212 within the body 220 and filling the body 220 with the electrolyte 206. A drying process may be performed. Exemplary drying includes heating the body 220 with the storage cell 212 and electrolyte 206 therein, often under a reduced pressure (e.g., a vacuum). Once adequate (optional) drying has been performed, final steps of assembly may be performed. In the final steps, internal electrical connections are made, the cap 224 is installed, and the cap 224 is hermetically sealed to the body 220, by, for example, welding the cap 224 to the body 220.

Accordingly, providing a housing 207 that takes advantage of multi-layered material provides for an energy storage that exhibits leakage current with comparatively low initial values and substantially slower increases in leakage current over time in view of the prior art. Significantly, the leakage current of the energy storage remains at practical (i.e., desirably low) levels when the ultracapacitor 210 is exposed to ambient temperatures for which prior art capacitors would exhibit prohibitively large initial values of leakage current and/or prohibitively rapid increases in leakage current over time.

Additionally, the ultracapacitor 210 may exhibit other benefits as a result of reduced reaction between the housing 207 and the energy storage cell 212. For example, an effective series resistance (ESR) of the energy storage may exhibit comparatively lower values over time. Further, the unwanted chemical reactions that take place in a prior art capacitor often create unwanted effects such as out-gassing, or in the case of a hermetically sealed housing, bulging of the housing 207. In both cases, this leads to a compromise of the structural integrity of the housing 207 and/or hermetic seal of the energy storage. Ultimately, this may lead to leaks or catastrophic failure of the prior art capacitor. These effects may be substantially reduced or eliminated by the application of a disclosed barrier.

Accordingly, users are now provided with a housing 207 for the energy storage, where a substantial portion up to all of the interior surfaces of the housing 207 are aluminum (and may include a non-interfering material, as described below). Thus, problems of internal corrosion are avoided and designers are afforded greater flexibility in selection of appropriate materials for the electrolyte 206.

By use of a multi-layer material (e.g., a clad material), stainless steel may be incorporated into the housing 207, and thus components with glass-to-metal seals may be used. The components may be welded to the stainless steel side of the clad material using techniques such as laser or resistance welding, while the aluminum side of the clad material may be welded to other aluminum parts (e.g., the body 220).

Figure 22:
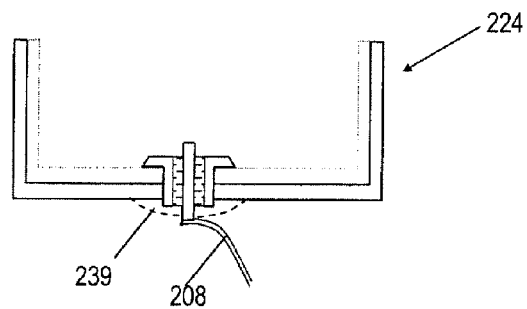
FIG. 22 depicts use of polymeric insulation over the electrode assembly.

In some embodiments, an insulative polymer may be used to coat parts of the housing 207. In this manner, it is possible to insure that the components of the energy storage are only exposed to acceptable types of metal (such as the aluminum). Exemplary insulative polymer includes PFA, FEP, TFE, and PTFE. Suitable polymers (or other materials) are limited only by the needs of a system designer or fabricator and the properties of the respective materials. Reference may be had to FIG. 22, where a small amount of insulative material 239 is included to limit exposure of electrolyte 206 to the stainless steel of the sleeve 251 and the feed-through 219. In this example, the terminal 208 is coupled to the feed-through 219, such as by welding, and then coated with the insulative material 239.

Figure 23A:
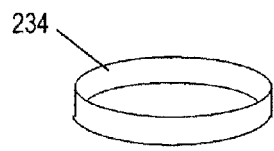
FIGS. 23A, 23B and 23C, collectively referred to herein as FIG. 23, depict aspects of a template for another embodiment of the cap for the energy storage.
Figure 23B:
Figure 23C:
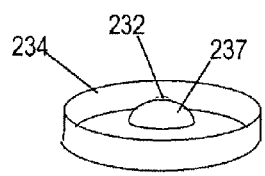

Refer now to FIG. 23 in which aspects of assembly another embodiment of the cap 224 are depicted. FIG. 23A depicts a template (i.e., the blank 234) that is used to provide a body of the cap 224. The template is generally sized to mate with the housing 207 of an appropriate type of energy storage cell (such as the ultracapacitor 210). The cap 224 may be formed by initially providing the template forming the template, including a dome 237 within the template (shown in FIG. 23B) and by then perforating the dome 237 to provide a through-way 232 (shown in FIG. 23C). Of course, the blank 234 (e.g., a circular piece of stock) may be pressed or otherwise fabricated such that the foregoing features are simultaneously provided.

In general, and with regard to these embodiments, the cap may be formed of aluminum, or an alloy thereof. However, the cap may be formed of any material that is deemed suitable by a manufacturer, user, designer and the like. For example, the cap 224 may be fabricated from steel and passivated (i.e., coated with an inert coating) or otherwise prepared for use in the housing 207.

Figure 24:
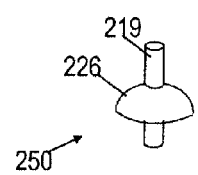
FIG. 24 is a perspective view of an electrode assembly that includes hemispherically shaped material.

Referring now also to FIG. 24, there is shown another embodiment of the electrode assembly 250. In these embodiments, the electrode assembly 250 includes the feed-through 219 and a hemispherically shaped material disposed about the feed-through 219. The hemispherically shaped material serves as the insulator 226, and is generally shaped to conform to the dome 237. The hemispheric insulator 226 may be fabricated of any suitable material for providing a hermetic seal while withstanding the chemical influence of the electrolyte 206. Exemplary materials include PFA (perfluoroalkoxy polymer), FEP (fluorinated ethylene-propylene), PVF (polyvinylfluoride), TFE (tetrafluoroethylene), CTFE (chlorotrifluoroethylene), PCTFE (polychlorotrifluoroethylene), ETFE (polyethylenetetrafluoroethylene), ECTFE (polyethylenechlorotrifluoroethylene), PTFE (polytetrafluoroethylene), another fluoropolymer based material as well as any other material that may exhibit similar properties (in varying degrees) and provide for satisfactory performance (such as by exhibiting, among other things, a high resistance to solvents, acids, and bases at high temperatures, low cost and the like).

The feed-through 219 may be formed of aluminum, or an alloy thereof. However, the feed-through 219 may be formed of any material that is deemed suitable by a manufacturer, user, designer and the like. For example, the feed-through 219 may be fabricated from steel and passivated (i.e., coated with an inert coating, such as silicon) or otherwise prepared for use in the electrode assembly 250. An exemplary technique for passivation includes depositing a coating of hydrogenated amorphous silicon on the surface of the substrate and functionalizing the coated substrate by exposing the substrate to a binding reagent having at least one unsaturated hydrocarbon group under pressure and elevated temperature for an effective length of time. The hydrogenated amorphous silicon coating is deposited by exposing the substrate to silicon hydride gas under pressure and elevated temperature for an effective length of time.

The hemispheric insulator 226 may be sized relative to the dome 237 such that a snug fit (i.e., hermetic seal) is achieved when assembled into the cap 224. The hemispheric insulator 226 need not be perfectly symmetric or of classic hemispheric proportions. That is, the hemispheric insulator 226 is substantially hemispheric, and may include, for example, slight adjustments in proportions, a modest flange (such as at the base) and other features as deemed appropriate. The hemispheric insulator 226 is generally formed of homogeneous material, however, this is not a requirement. For example, the hemispheric insulator 226 may include an air or gas filled torus (not shown) therein to provide for desired expansion or compressability.

Figure 25:
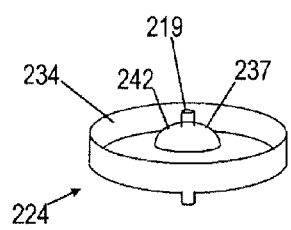
FIG. 25 is a perspective view of a cap including the electrode assembly of FIG. 24 installed in the template of FIG. 23C.

As shown in FIG. 25, the electrode assembly 250 may be inserted into the template (i.e., the formed blank 234) to provide for an embodiment of the cap 224 that includes a hemispheric hermetic seal.

Figure 26:
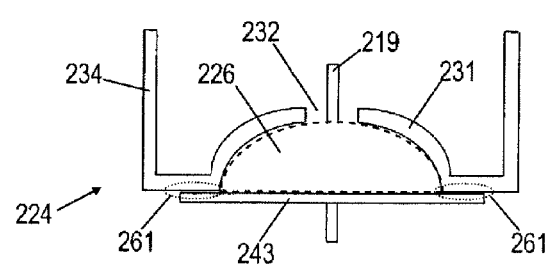
FIG. 26 is a cross-sectional view of the cap of FIG. 25.

As shown in FIG. 26, in various embodiments, a retainer 243 may be bonded or otherwise mated to a bottom of the cap 224 (i.e., a portion of the cap 224 that faces to an interior of the housing 207 and faces the energy storage cell 212). The retainer 243 may be bonded to the cap 224 through various techniques, such as aluminum welding (such as laser, ultrasonic and the like). Other techniques may be used for the bonding, including for example, stamping (i.e., mechanical bonding) and brazing. The bonding may occur, for example, along a perimeter of the retainer 243. Generally, the bonding is provided for in at least one bonding point to create a desired seal 271. At least one fastener, such as a plurality of rivets may be used to seal the insulator 226 within the retainer 243.

In the example of FIG. 26, the cap 224 is of a concave design (see FIG. 17B). However, other designs may be used. For example, a convex cap 224 may be provided (FIG. 17C), and an over-cap 224 may also be used (a variation of the embodiment of FIG. 17C, which is configured to mount as depicted in FIG. 21C).

In some embodiments, at least one of the housing 207 and the cap 224 include materials that include a plurality of layers. For example, a first layer of material may include aluminum, with a second layer of material being stainless steel. In this example, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate. Advantageously, this provides for welding of stainless steel to stainless steel, a relatively simple welding procedure.

The material used for the cap as well as the feed-through 219 may be selected with regard for thermal expansion of the hemispheric insulator 226. Further, manufacturing techniques may also be devised to account for thermal expansion. For example, when assembling the cap 224, a manufacturer may apply pressure to the hemispheric insulator 226, thus at least somewhat compressing the hemispheric insulator 226. In this manner, there at least some thermal expansion of the cap 224 is provided for without jeopardizing efficacy of the hermetic seal.

While material used for construction of the body 220 includes aluminum, any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 220. Additional materials (such as structural materials or electrically insulative materials, such as some polymer-based materials) may be used to compliment the body and/or the housing 207. The materials disposed over the aluminum may likewise be chosen by what is deemed appropriate by a designer or fabricator.

Use of aluminum is not necessary or required. In short, material selection may provide for use of any material deemed appropriate by a designer, fabricator, or user and the like. Considerations may be given to various factors, such as, for example, reduction of electrochemical interaction with the electrolyte 206, structural properties, cost and the like.

Figure 27:
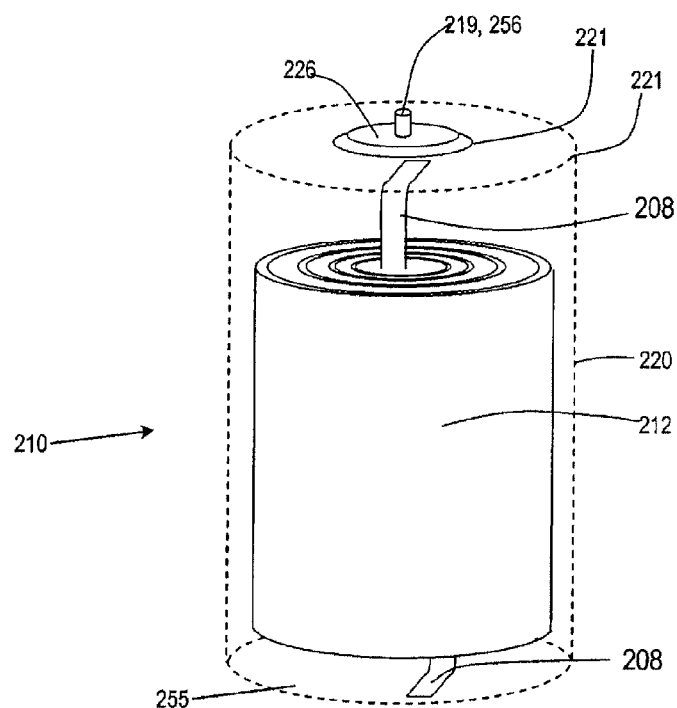
FIG. 27 is a transparent isometric view of the energy storage cell disposed in a cylindrical housing.

The storage cell 212 is now discussed in greater detail. Refer to FIG. 27, where a cut-away view of the ultracapacitor 210 is provided. In this example, the storage cell 212 is inserted into and contained within the body 220. Each plurality of leads are bundled together and coupled to the housing 207 as one of the terminals 208. In some embodiments, the plurality of leads are coupled to a bottom of the body 220 (on the interior), thus turning the body 220 into a negative contact 255. Likewise, another plurality of leads are bundled and coupled to the feed-through 219, to provide a positive contact 256. Electrical isolation of the negative contact 255 and the positive contact 256 is preserved by the electrical insulator 226. Generally, coupling of the leads is accomplished through welding, such as at least one of laser and ultrasonic welding. Of course, other techniques may be used as deemed appropriate.

It should be recognized that robust assembly techniques are required to provide a highly efficient energy storage. Accordingly, some of the techniques for assembly are now discussed.

Figure 28:
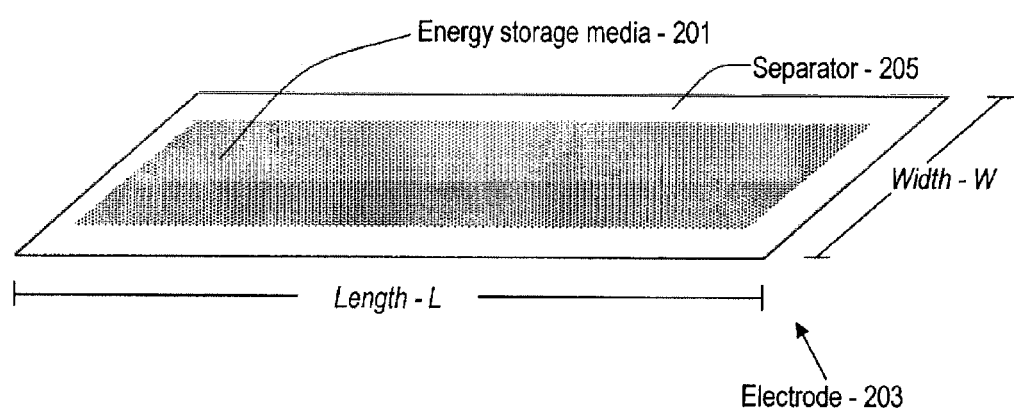
FIG. 28 is an isometric view of an embodiment of the energy storage cell prior to being rolled into a rolled storage cell.

Referring now to FIG. 28, components of an exemplary electrode 203 are shown. In this example, the electrode 203 will be used as the negative electrode 203 (however, this designation is arbitrary and merely for referencing).

As may be noted from the illustration, at least in this embodiment, the separator 205 is generally of a longer length and wider width than the energy storage media 201 (and the current collector 202). By using a larger separator 205, protection is provided against short circuiting of the negative electrode 203 with the positive electrode 203. Use of additional material in the separator 205 also provides for better electrical protection of the leads and the terminal 208.

Refer now to FIG. 29 which provides a side view of an embodiment of the storage cell 212. In this example, a layered stack of energy storage media 201 includes a first separator 205 and a second separator 205, such that the electrodes 203 are electrically separated when the storage cell 212 is assembled into a rolled storage cell 223. Note that the term "positive" and "negative" with regard to the electrode 203 and assembly of the ultracapacitor 210 is merely arbitrary, and makes reference to functionality when configured in the ultracapacitor 210 and charge is stored therein. This convention, which has been commonly adopted in the art, is not meant to apply that charge is stored prior to assembly, or connote any other aspect other than to provide for physical identification of different electrodes.

Prior to winding the storage cell 212, the negative electrode 203 and the positive electrode 203 are aligned with respect to each other. Alignment of the electrodes 203 gives better performance of the ultracapacitor 210 as a path length for ionic transport is generally minimized when there is a highest degree of alignment. Further, by providing a high degree of alignment, excess separator 205 is not included and efficiency of the ultracapacitor 210 does not suffer as a result.

Figure 30:
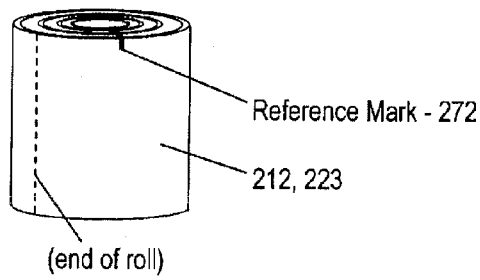
FIG. 30 is an isometric view of a rolled storage cell which includes a reference mark for placing a plurality of leads.

Referring now also to FIG. 30, there is shown an embodiment of the storage cell 212 wherein the electrodes 203 have been rolled into the rolled storage cell 223. One of the separators 205 is present as an outermost layer of the storage cell 212 and separates energy storage media 201 from an interior of the housing 207.

"Polarity matching" may be employed to match a polarity of the outermost electrode in the rolled storage cell 223 with a polarity of the body 220. For example, in some embodiments, the negative electrode 203 is on the outermost side of the tightly packed package that provides the rolled storage cell 223. In these embodiments, another degree of assurance against short circuiting is provided. That is, where the negative electrode 203 is coupled to the body 220, the negative electrode 203 is the placed as the outermost electrode in the rolled storage cell 223. Accordingly, should the separator 205 fail, such as by mechanical wear induced by vibration of the ultracapacitor 210 during usage, the ultracapacitor 210 will not fail as a result of a short circuit between the outermost electrode in the rolled storage cell 223 and the body 220.

For each embodiment of the rolled storage cell 223, a reference mark 272 may be in at least the separator 205. The reference mark 272 will be used to provide for locating the leads on each of the electrodes 203. In some embodiments, locating of the leads is provided for by calculation. For example, by taking into account an inner diameter of the jelly roll and an overall thickness for the combined separators 205 and electrodes 203, a location for placement of each of the leads may be estimated. However, practice has shown that it is more efficient and effective to use a reference mark 272. The reference mark 272 may include, for example, a slit in an edge of the separator(s) 205.

Generally, the reference mark 272 is employed for each new specification of the storage cell 212. That is, as a new specification of the storage cell 212 may call for differing thickness of at least one layer therein (over a prior embodiment), use of prior reference marks may be at least somewhat inaccurate.

Figure 31:
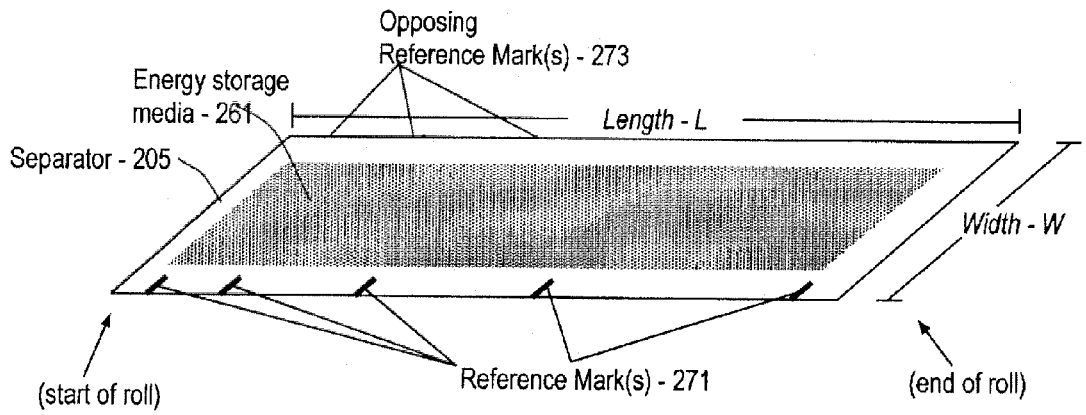
FIG. 31 is an isometric view of the storage cell of FIG. 30 with reference marks prior to being rolled.
Figure 32:
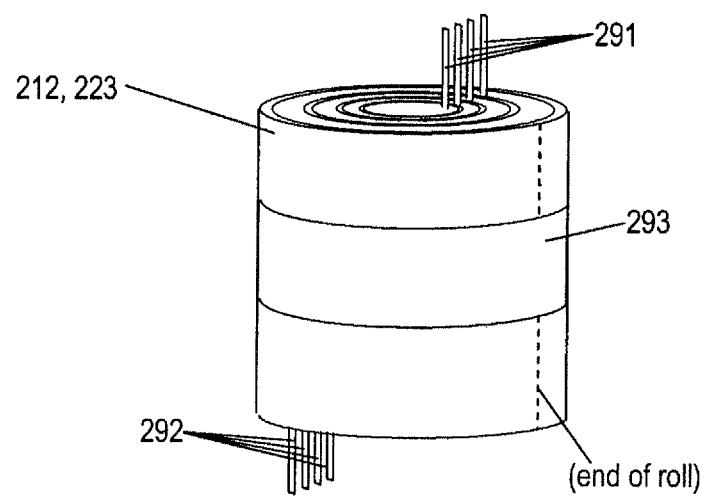
FIG. 32 depicts the rolled up storage cell with the plurality of leads included.

In general, the reference mark 272 is manifested as a single radial line that traverses the roll from a center thereof to a periphery thereof. Accordingly, when the leads are installed along the reference mark 272, each lead will align with the remaining leads (as shown in FIG. 32). However, when the storage cell 212 is unrolled (for embodiments where the storage cell 212 is or will become a roll), the reference mark 272 may be considered to be a plurality of markings (as shown in FIG. 31). As a matter of convention, regardless of the embodiment or appearance of marking of the storage cell 212, identification of a location for incorporation of the lead is considered to involve determination of a "reference mark 272" or a "set of reference marks 272."

Referring now to FIG. 31, once the reference mark 272 has been established (such as by marking a rolled up storage cell 212), an installation site for installation each of the leads is provided (i.e., described by the reference mark 272). Once each installation site has been identified, for any given build specification of the storage cell 212, the relative location of each installation site may be repeated for additional instances of the particular build of storage cell 212.

Generally, each lead is coupled to a respective current collector 202 in the storage cell 212. In some embodiments, both the current collector 202 and the lead are fabricated from aluminum. Generally, the lead is coupled to the current collector 202 across the width, W, however, the lead may be coupled for only a portion of the width, W. The coupling may be accomplished by, for example, ultrasonic welding of the lead to the current collector 202. In order to accomplish the coupling, at least some of the energy storage media 201 may be removed (as appropriate) such that each lead may be appropriately joined with the current collector 202. Other preparations and accommodations may be made, as deemed appropriate, to provide for the coupling.

Of course, opposing reference marks 273 may be included. That is, in the same manner as the reference marks 272 are provided, a set of opposing reference marks 273 may be made to account for installation of leads for the opposing polarity. That is, the reference marks 272 may be used for installing leads to a first electrode 203, such as the negative electrode 203, while the opposing reference marks 273 may be used for installing leads to the positive electrode 203. In the embodiment where the rolled storage cell 223 is cylindrical, the opposing reference marks 273 are disposed on an opposite side of the energy storage media 201, and offset lengthwise from the reference marks 272 (as depicted).

Note that in FIG. 31, the reference marks 272 and the opposing reference marks 273 are both shown as being disposed on a single electrode 203. That is, FIG. 31 depicts an embodiment that is merely for illustration of spatial (i.e., linear) relation of the reference marks 272 and the opposing reference marks 273. This is not meant to imply that the positive electrode 203 and the negative electrode 203 share energy storage media 201. However, it should be noted that in instances where the reference marks 272 and the opposing reference marks 273 are placed by rolling up the storage cell 212 and then marking the separator 205, that the reference marks 272 and the opposing reference marks 273 may indeed by provided on a single separator 205. However, in practice, only one set of the reference marks 272 and the opposing reference marks 273 would be used to install the leads for any given electrode 203. That is, it should be recognized that the embodiment depicted in FIG. 31 is to be complimented with another layer of energy storage media 201 for another electrode 203 which will be of an opposing polarity.

As shown in FIG. 32, the foregoing assembly technique results in a storage cell 212 that includes at least one set of aligned leads. A first set of aligned leads 291 are particularly useful when coupling the storage cell 212 in its form as a rolled storage cell 223 to one of the negative contact 255 and the positive contact 256, while a set of opposing aligned leads 292 provide for coupling the energy storage media 201 to an opposite contact (255, 256).

The rolled storage cell 223 may be surrounded by a wrapper 293. The wrapper 293 may be realized in a variety of embodiments. For example, the wrapper 293 may be provided as KAPTON™ tape (which is a polyimide film developed by DuPont of Wilmington Del.), or PTFE tape. In this example, the KAPTON™ tape surrounds and is adhered to the rolled storage cell 223. The wrapper 293 may be provided without adhesive, such as a tightly fitting wrapper 293 that is slid onto the rolled storage cell 223. The wrapper 293 may be manifested more as a bag, such as one that generally engulfs the rolled storage cell 223 (e.g., such as the envelope 273 discussed above). In some of these embodiments, the wrapper 293 may include a material that functions as a shrink-wrap would, and thereby provides an efficient physical (and in some embodiments, chemical) enclosure of the rolled storage cell 223. Generally, the wrapper 293 is formed of a material that does not interfere with electrochemical functions of the ultracapacitor 210. The wrapper 293 may also provide partial coverage as needed, for example, to aid insertion of the rolled storage cell 223.

In some embodiments, the negative leads and the positive leads are located on opposite sides of the rolled storage cell 223 (in the case of a jelly-roll type rolled storage cell 223, the leads for the negative polarity and the leads for the positive polarity may be diametrically opposed). Generally, placing the leads for the negative polarity and the leads for the positive polarity on opposite sides of the rolled storage cell 223 is performed to facilitate construction of the rolled storage cell 223 as well as to provide improved electrical separation.

In some embodiments, once the aligned leads 291, 292 are assembled, each of the plurality of aligned leads 291, 292 are bundled together (in place) such that a shrink-wrap (not shown) may be disposed around the plurality of aligned leads 291, 292. Generally, the shrink-wrap is formed of PTFE, however, any compatible material may be used.

Figure 33:
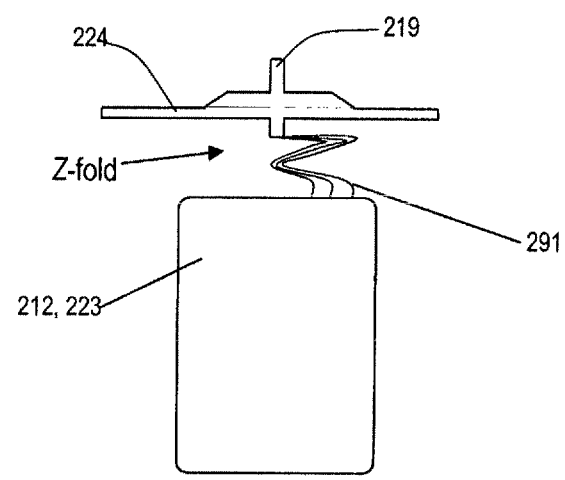
FIG. 33 depicts a Z-fold imparted into aligned leads (i.e., a terminal) coupled to the storage cell.
Figure 34:
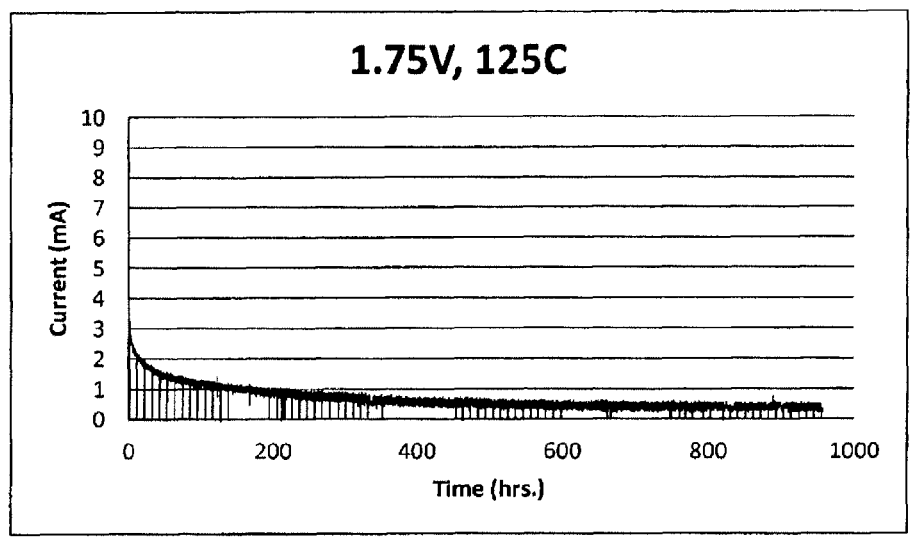
FIGS. 34-42 are graphs depicting aspects of performance for exemplary ultracapacitors.
Figure 35:
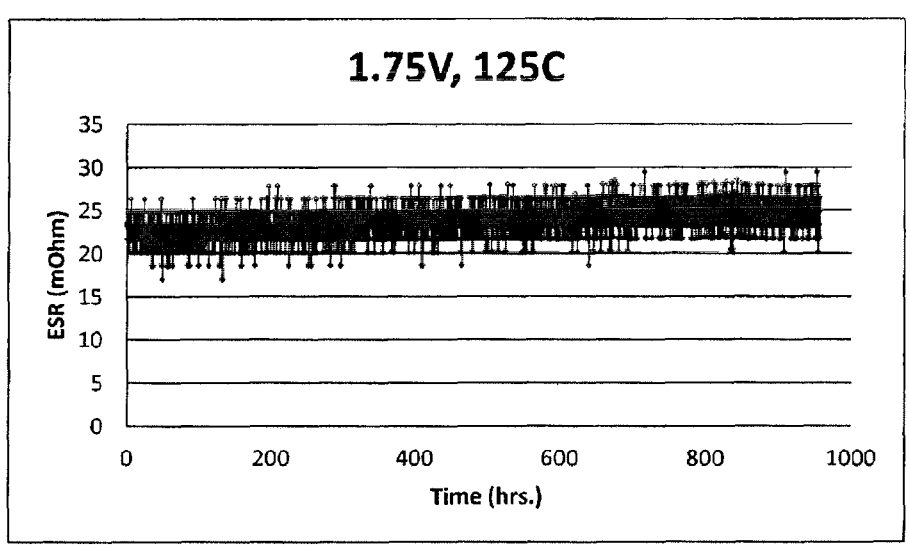
Figure 36:
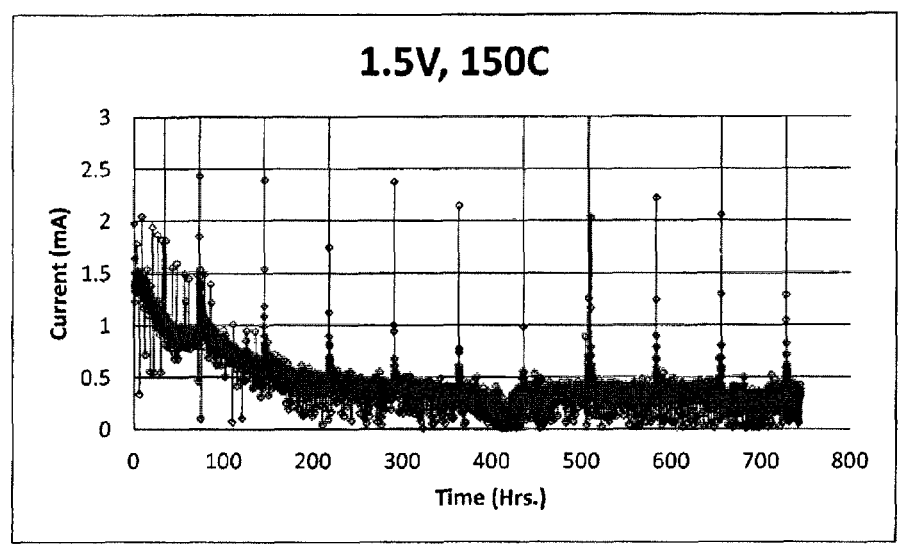
Figure 37:
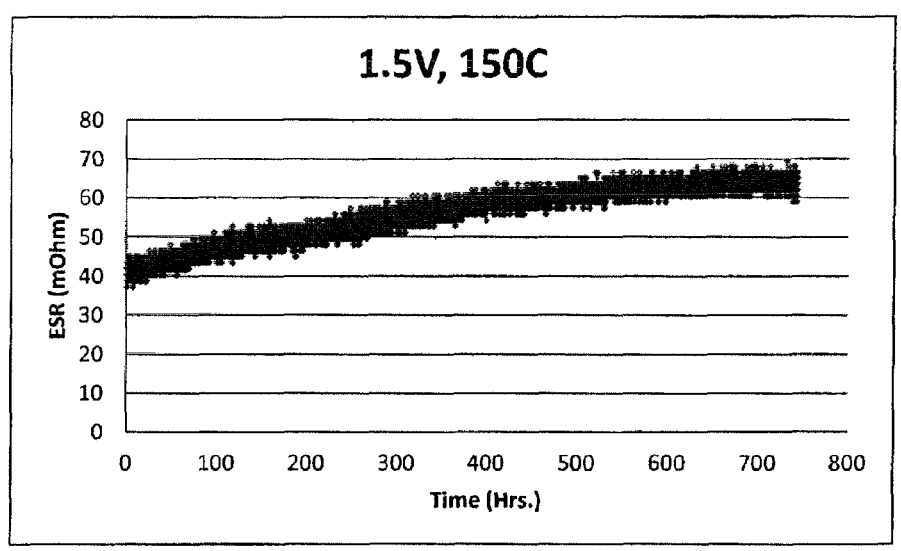
Figure 38:
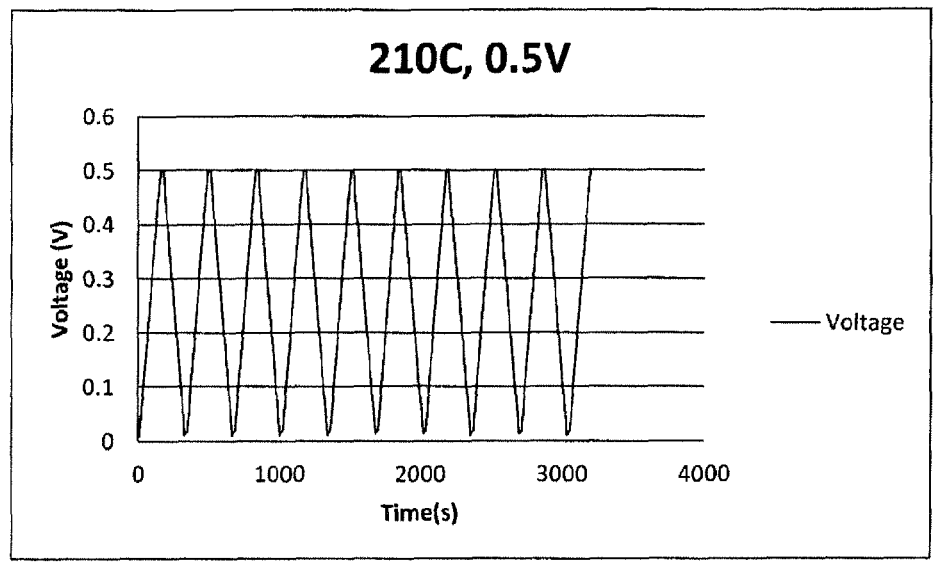
Figure 39:
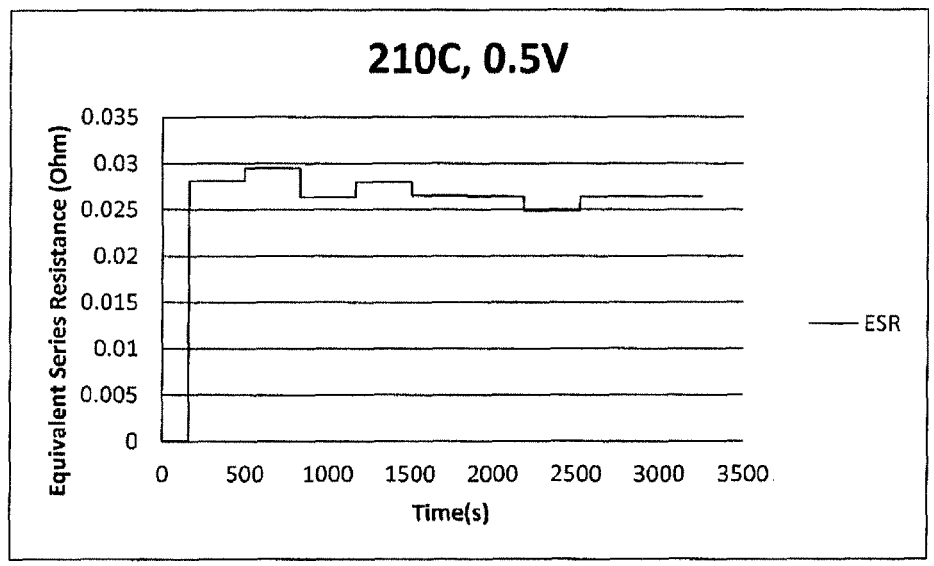
Figure 40:
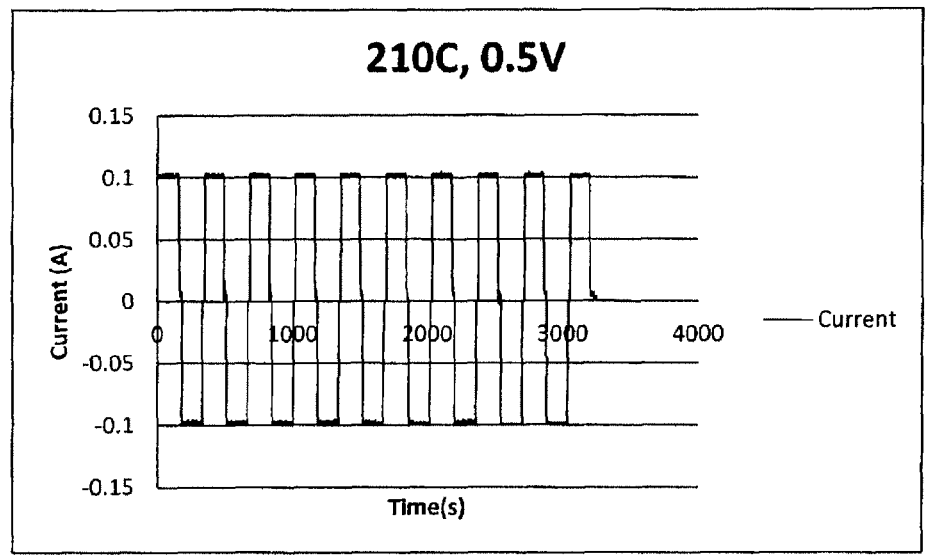
Figure 41:
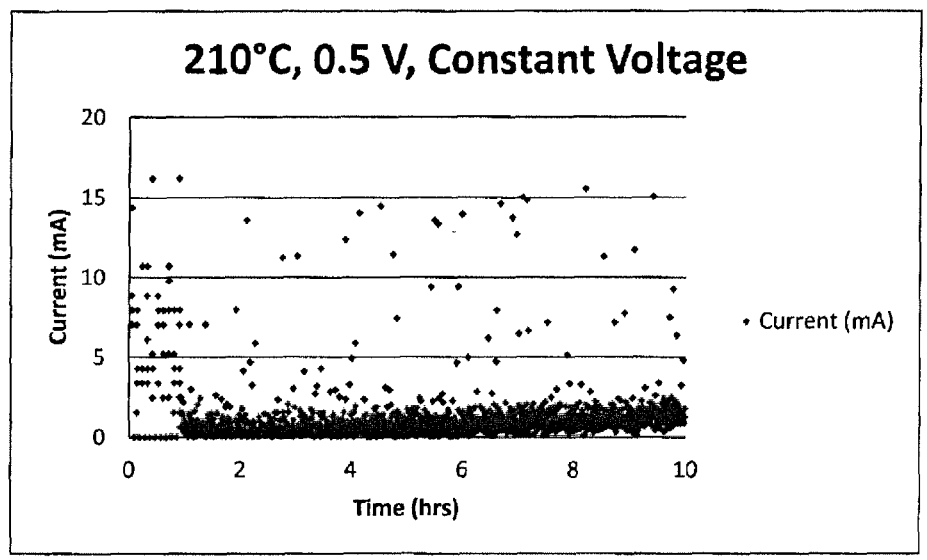
Figure 42:
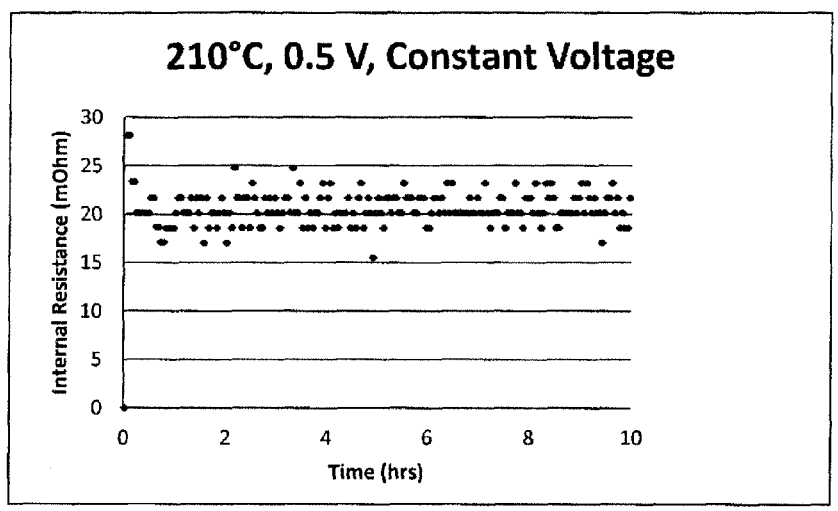

In some embodiments, once shrink-wrap material has been placed about the aligned leads 291, the aligned leads 291 are folded into a shape to be assumed when the ultracapacitor 210 has been assembled. That is, with reference to FIG. 33, it may be seen that the aligned leads assume a "Z" shape. After imparting a "Z-fold" into the aligned leads 291, 292 and applying the shrink-wrap, the shrink-wrap may be heated or otherwise activated such that the shrink-wrap shrinks into place about the aligned leads 291, 292. Accordingly, in some embodiments, the aligned leads 291, 292 may be strengthened and protected by a wrapper. Use of the Z-fold is particularly useful when coupling the energy storage media 201 to the feed-through 219 disposed within the cap 224.

Of course, other embodiments for coupling each set of aligned leads 291, 292 (i.e., each terminal 208) to a respective contact 255, 256 may be practiced. For example, in one embodiment, an intermediate lead is coupled to the one of the feed-through 219 and the housing 207, such that coupling with a respective set of aligned leads 291, 292 is facilitated.

Materials used may be selected according to properties such as reactivity, dielectric value, melting point, adhesion to other materials, weldability, coefficient of friction, cost, and other such factors. Combinations of materials (such as layered, mixed, or otherwise combined) may be used to provide for desired properties.

In a variety of embodiments, it is useful to use a plurality of the ultracapacitors 210 together to provide a power supply. In order to provide for reliable operation, individual ultracapacitors 210 may be tested in advance of use. In order to perform various types of testing, each of the ultracapacitors 210 may be tested as a singular cell, in series or in parallel with multiple ultracapacitors 210 attached. Using different metals joined by various techniques (such as by welding) can reduce the ESR of the connection as well as increase the strength of the connections. Some aspects of connections between ultracapacitors 210 are now introduced.

In some embodiments, the ultracapacitor 210 includes two contacts. The two contacts are the glass-to-metal seal pin (i.e., the feed-through 219) and the entire rest of the housing 207. When connecting a plurality of the ultracapacitors 210 in series, it is often desired to couple an interconnection between a bottom of the housing 207 (in the case of the cylindrical form housing 207), such that distance to the internal leads is minimized, and therefore of a minimal resistance. In these embodiments, an opposing end of the interconnection is usually coupled to the pin of the glass-to-metal seal.

With regard to interconnections, a common type of weld involves use of a parallel tip electric resistance welder. The weld may be made by aligning an end of the interconnection above the pin and welding the interconnection directly to the pin. Using a number of welds will increase the strength and connection between the interconnection and the pin. Generally, when welding to the pin, configuring a shape of the end of the interconnection to mate well with the pin serves to ensure there is substantially no excess material overlapping the pin that would cause a short circuit.

An opposed tip electric resistance welder may be used to weld the interconnection to the pin, while an ultrasonic welder may be used to weld the interconnection to the bottom of the housing 207. Soldering techniques may be used when metals involved are compatible.

With regard to materials used in interconnections, a common type of material used for the interconnection is nickel. Nickel may be used as it welds well with stainless steel and has a strong interface. Other metals and alloys may be used in place of nickel, for example, to reduce resistance in the interconnection.

Generally, material selected for the interconnection is chosen for compatibility with materials in the pin as well as materials in the housing 207. Exemplary materials include copper, nickel, tantalum, aluminum, and nickel copper clad. Further metals that may be used include silver, gold, brass, platinum, and tin.

In some embodiments, such as where the pin (i.e., the feed-through 219) is made of tantalum, the interconnection may make use of intermediate metals, such as by employing a short bridge connection. An exemplary bridge connection includes a strip of tantalum, which has been modified by use of the opposed tip resistance welder to weld a strip of aluminum/copper/nickel to the bridge. A parallel resistance welder is then used to weld the tantalum strip to the tantalum pin.

The bridge may also be used on the contact that is the housing 207. For example, a piece of nickel may be resistance welded to the bottom of the housing 207. A strip of copper may then be ultrasonic welded to the nickel bridge. This technique helps to decrease resistance of cell interconnections. Using different metals for each connection can reduce the ESR of the interconnections between cells in series.

Having thus described aspects of a robust ultracapacitor 210 that is useful for high temperature environments (i.e., up to about 210 degrees Celsius), some additional aspects are now provided and/or defined.

A variety of materials may be used in construction of the ultracapacitor 210. Integrity of the ultracapacitor 210 is essential if oxygen and moisture are to be excluded and the electrolyte 206 is to be prevented from escaping. To accomplish this, seam welds and any other sealing points should meet standards for hermiticity over the intended temperature range for operation. Also, materials selected should be compatible with other materials, such as ionic liquids and solvents that may be used in the formulation of the electrolyte 206.

In some embodiments, the feed-through 219 is formed of metal such as at least one of KOVAR™ (a trademark of Carpenter Technology Corporation of Reading, Pa., where KOVAR is a vacuum melted, iron-nickel-cobalt, low expansion alloy whose chemical composition is controlled within narrow limits to assure precise uniform thermal expansion properties), Alloy 252 (a nickel iron alloy suitable for glass and ceramic sealing to metal), tantalum, molybdenum, niobium, tungsten, Stainless Steel 446 (a ferritic, non-heat treatable stainless steel that offers good resistance to high temperature corrosion and oxidation) and titanium.

The body of glass-to-metal seals that take advantage of the foregoing may be fabricated from 300 series stainless steels, such as 304, 304L, 316, and 316L alloys. The bodies may also be made from metal such as at least one of various nickel alloys, such as Inconel (a family of austenitic nickel-chromium-based superalloys that are oxidation and corrosion resistant materials well suited for service in extreme environments subjected to pressure and heat) and Hastelloy (a highly corrosion resistant metal alloy that includes nickel and varying percentages of molybdenum, chromium, cobalt, iron, copper, manganese, titanium, zirconium, aluminum, carbon, and tungsten).

The insulating material between the feed-through 219 and the surrounding body in the glass-to-metal seal is typically a glass, the composition of which is proprietary to each manufacturer of seals and depends on whether the seal is under compression or is matched. Other insulative materials may be used in the glass-to-metal seal. For example, various polymers may be used in the seal. As such, the term "glass-to-metal" seal is merely descriptive of a type of seal, and is not meant to imply that the seal must include glass.

The housing 207 for the ultracapacitor 210 may be made from, for example, types 304, 304L, 316, and 316L stainless steels. They may also be constructed from, but not limited to, some of the aluminum alloys, such as 1100, 3003, 5052, 4043 and 6061. Various multi-layer materials may be used, and may include, for example, aluminum clad to stainless steel. Other non-limiting compatible metals that may be used include platinum, gold, rhodium, ruthenium and silver.

Specific examples of glass-to-metal seals that have been used in the ultracapacitor 210 include two different types of glass-to-metal seals. A first one is from SCHOTT with a US location in Elmsford, N.Y. This embodiment uses a stainless steel pin, glass insulator, and a stainless steel body. A second glass-to-metal seal is from HERMETIC SEAL TECHNOLOGY of Cincinnatti, Ohio. This second embodiment uses a tantalum pin, glass insulator and a stainless steel body. Varying sizes of the various embodiments may be provided.

An additional embodiment of the glass-to-metal seal includes an embodiment that uses an aluminum seal and an aluminum body. Yet another embodiment of the glass-to-metal seal includes an aluminum seal using epoxy or other insulating materials (such as ceramics or silicon).

A number of aspects of the glass-to-metal seal may be configured as desired. For example, dimensions of housing and pin, and the material of the pin and housing may be modified as appropriate. The pin can also be a tube or solid pin, as well as have multiple pins in one cover. While the most common types of material used for the pin are stainless steel alloys, copper cored stainless steel, molybdenum, platinum-iridium, various nickel-iron alloys, tantalum and other metals, some non-traditional materials may be used (such as aluminum). The housing is usually formed of stainless steel, titanium and/or various other materials.

A variety of fastening techniques may be used in assembly of the ultracapacitor 210. For example, and with regards to welding, a variety of welding techniques may be used. The following is an illustrative listing of types of welding and various purposes for which each type of welding may be used.

Ultrasonic welding may be used for, among other things: welding aluminum tabs to the current collector; welding tabs to the bottom clad cover; welding a jumper tab to the clad bridge connected to the glass-to-metal seal pin; and welding jelly roll tabs together. Pulse or resistance welding may be used for, among other things: welding leads onto the bottom of the can or to the pin; welding leads to the current collector; welding a jumper to a clad bridge; welding a clad bridge to the terminal 208; welding leads to a bottom cover. Laser welding may be used for, among other things: welding a stainless steel cover to a stainless steel can; welding a stainless steel bridge to a stainless steel glass-to-metal seal pin; and welding a plug into the fill port. TIG welding may be used for, among other things: sealing aluminum covers to an aluminum can; and welding aluminum seal into place. Cold welding (compressing metals together with high force) may be used for, among other things: sealing the fillport by force fitting an aluminum ball/tack into the fill port.

Physical aspects of an exemplary ultracapacitor 210 are now provided. Note that in the following tables, the terminology "tab" generally refers to the "lead" as discussed above; the terms "bridge" and "jumper" also making reference to aspects of the lead (for example, the bridge may be coupled to the feed-through, or "pin," while the jumper is useful for connecting the bridge to the tabs, or leads). Use of various connections may facilitate the assembly process, and take advantage of certain assembly techniques. For example, the bridge may be laser welded or resistance welded to the pin, and coupled with an ultrasonic weld to the jumper.

FIGS. 34-42 are graphs depicting performance of exemplary ultracapacitors 210, and depict performance of the ultracapacitor 210 at 1.75 volts and 125 degrees Celsius as well as performance of the ultracapacitor 210 at 1.5 volts and 150 degrees Celsius and performance of the ultracapacitor 210 at 0.5 volts and 210 degrees Celsius. In these latter examples (210 degrees Celsius), the ultracapacitor 210 was a closed cell (i.e., housing). The ultracapacitor was cycled 10 times, with a charge and discharge of 100 mA, charged to 0.5 Volts, resistance measurement, discharged to 10 mV, 10 second rest then cycled again.

Generally, the ultracapacitor 210 may be used under a variety of environmental conditions and demands. For example, terminal voltage may range from about 100 mV to 10 V. Ambient temperatures may range from about minus 40 degrees Celsius to plus 210 degrees Celsius. Typical high temperature ambient temperatures range from plus 60 degrees Celsius to plus 210 degrees Celsius.

Figure 43:
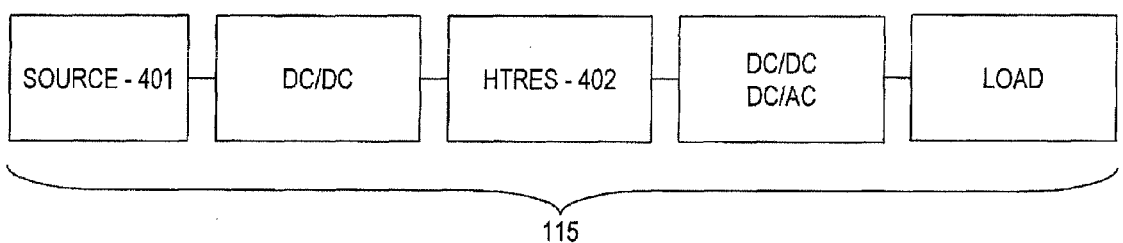
FIG. 43 depicts an embodiment of a power supply that includes the generator and the ultracapacitor.

Referring now to FIG. 43, exemplary electronics are shown in communication with at least one source 401 and at least one high temperature rechargeable energy storage 402 (HTRES, which may be, for example, the ultracapacitor 210). In this non-limiting example, the power supply 115 includes a charger (first subsystem) for charging the HTRES in communication with the source and the HTRES. A second subsystem in communication with the HTRES and a load may include a DC/DC power supply and/or a DC/AC power supply. Various power converters may be included in the power supply 115, and may be used between the source and the HTRES, as well as between the HTRES and a load.

The energy source 401 that is included in the power supply 115 may include a variety of energy inputs. The energy inputs may be generally divided into three categories. The categories include primary batteries, remote systems, and generators.

In some embodiments, the power supply includes a primary battery as a part of the energy source 401. Exemplary batteries include those that are adapted for operation in a harsh environment. Specific examples include various chemical batteries, including those with lithium. More specific examples include lithium-thionyl-chloride (Li—SOCl$_2$) and batteries based on similar technologies and/or chemistries. However, it is recognized that some of these technologies may not be capable of achieving the desired temperature ratings, and that some of these technologies may only support the energy storage on a short term basis (i.e., the energy storage may include, for example, elements that are not rechargeable, or that have a shortened life when compared with other elements). Other exemplary batteries that may be included in the power supply 115 include lithium-bromine-chloride, as well as lithium-sulfuryl-chloride and fused salt.

The source 401 may include at least one connection to a remote power supply. That is, energy may be supplied via an external source, such as via wireline. Given that external energy sources are not constrained by the downhole environment, the primary concern for receiving energy includes methods and apparatus for communicating the energy downhole. Exemplary techniques for communicating energy to the logging instrument 100 and the power supply 115 include wired casing, wired pipe, coiled tubing and other techniques as may be known in the art.

Figure 44:
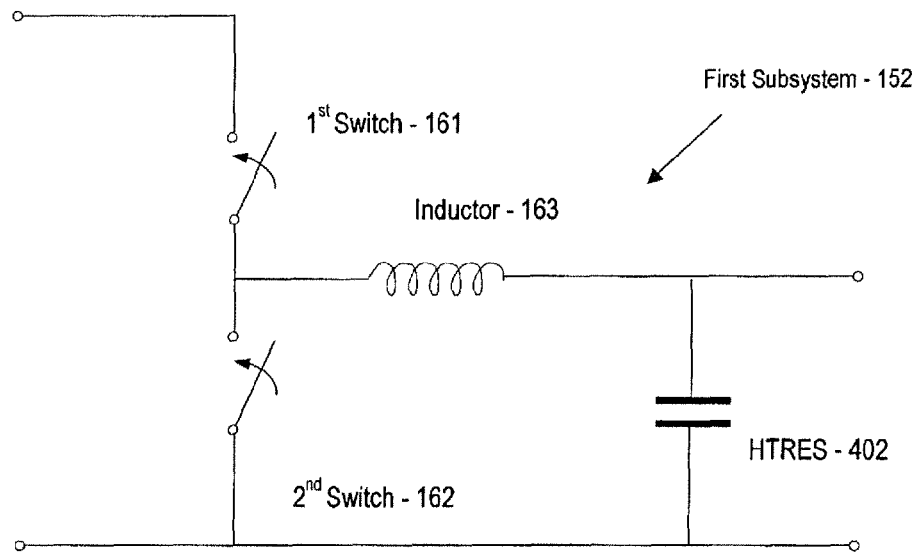
FIGS. 44-50 depict embodiments of control circuits for the power supply.

Refer now to FIGS. 44-50, where aspects of power conversion circuits are shown. As shown in FIG. 44, an exemplary embodiment of the first subsystem 152 includes a first switching device 161, and a second switching device 162 as well as a filter inductor 163. The external energy supply 151 may couple to the first subsystem 152 and to the HTRES 402 (for example, a high temperature ultracapacitor). The action of the first switching device 161 and the second switching device 162 may be controlled to achieve current limiting and battery conditioning features described above. Specifically, the relative on-time of the first switching device 161 and the second switching device 162 operating in a complimentary fashion (duty ratio) may be used to adjust the conversion ratio and the flow of current. The exemplary first subsystem 152 shown in FIG. 44 may be useful when voltage of the external energy supply 151 is larger in value when compared to voltage of the HTRES 402. Current limiting or regulation may be achieved by way of a feedback control system (not shown).

An exemplary embodiment of the second subsystem 153 includes power converters either DC-DC or DC-AC depending on the tool requirements. A function of a second subsystem 153 may be to regulate the voltage or current delivered to the load (for example, the logging instrument 100 and/or the downhole electronics 113). Due to a capacitive nature of the HTRES 402, when implanted with an ultracapacitor, voltage of the HTRES 402 may decrease in an approximately linear fashion as charge is withdrawn from the HTRES 402. A function of the second subsystem 153 then may be to regulate the voltage or current delivered to the logging instrument 100, despite the varying voltage presented by the HTRES 402. Voltage limiting or regulation may be achieved by way of a feedback control system (not shown).

Figure 45:
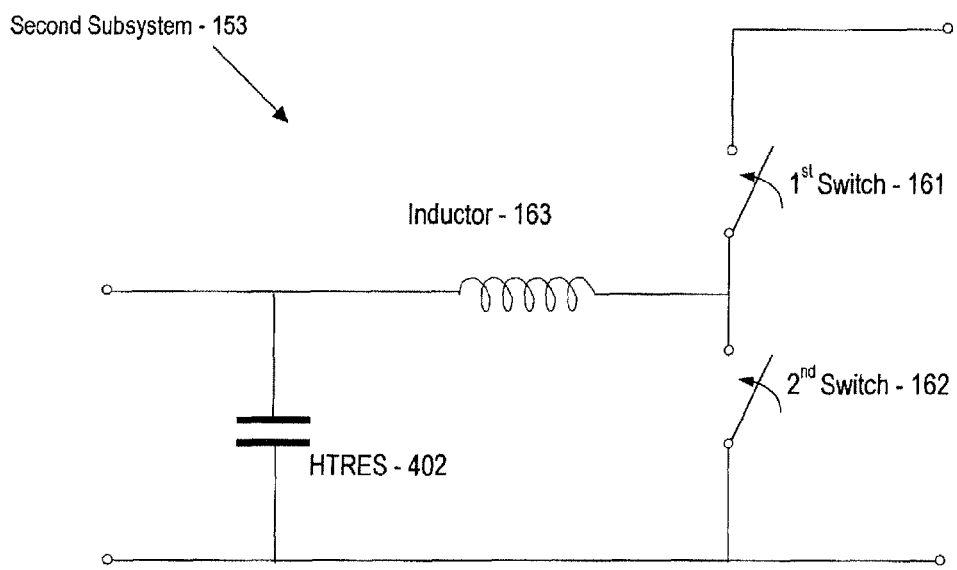

As shown in FIG. 45, an exemplary embodiment of the second subsystem 153 may include respective embodiments of the first switching device 161, the second switching device 162 as well as the filter inductor 163. The load may couple to the second subsystem 153 and to the HTRES 402. The action of the respective embodiments of the first switching device 161 the second switching device 162 may be controlled to achieve desired current or voltage regulation features described above. Specifically, the duty ratio of the relative on-time of the respective embodiments of the first switching device 161 and the second switching device 162 may be used to adjust the conversion ratio and the flow of current or the presented voltage. The exemplary second subsystem 153 shown in FIG. 45 may be useful when the voltage required is larger in value when compared to the voltage of the HTRES 402. Voltage limiting or regulation may be achieved by way of a feedback control system (not shown).

Figure 46:
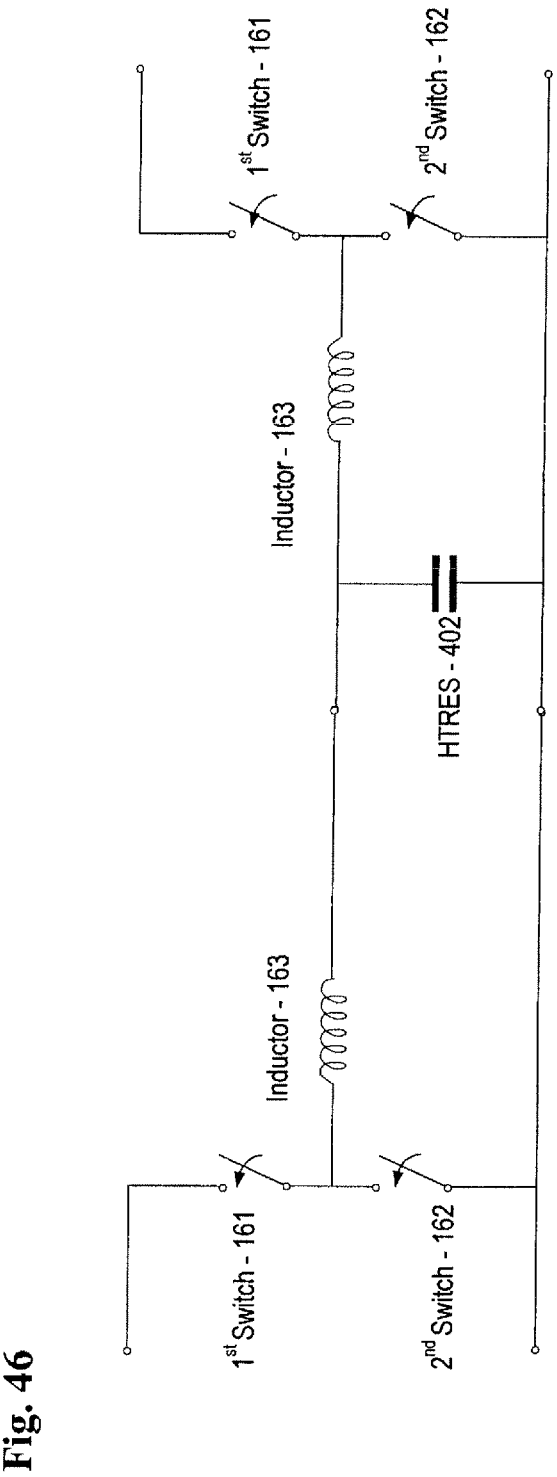

As shown in FIG. 46, the first subsystem 152 and the second subsystems 153 may be coupled together and to the HTRES 402 as well to provide an embodiment of the power supply 115. In this embodiment, the exemplary power supply 115 may be particularly advantageous when the terminal voltage of the external energy supply 151 is either larger in value or smaller in value when compared to the terminal voltage of the load as long as the terminal voltage of the HTRES 402 is smaller in value than both.

The power converters may generally be of any topology. Non-limiting examples include converters commonly referred to as "buck," "boost," "buck-boost," "Cúk," "switched capacitor," and isolated versions of non-isolated converters (e.g., "flyback," "forward,"), as well as cascades of any such converters (e.g., buck+boost).

Figure 47:
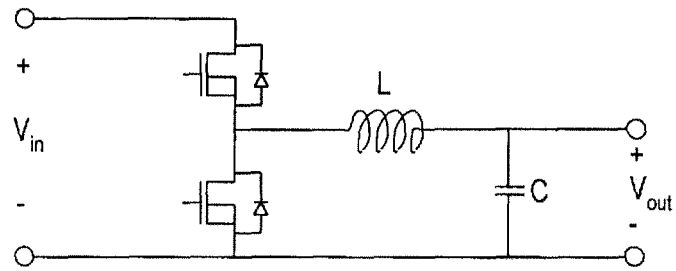

An exemplary converter 181 is shown in FIG. 47. In this example, the converter 181 is a bi-directional buck converter. This embodiment is suitable for, among other things, use as a power converter when the output voltage is required to be less than the input voltage.

Figure 48:
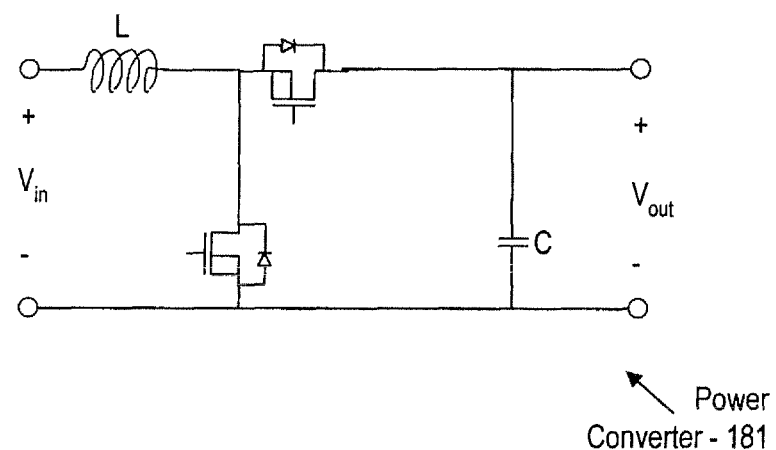
Figure 49:
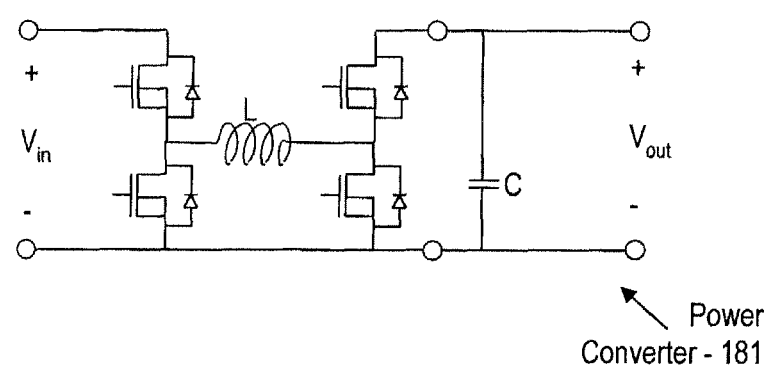

Another exemplary converter 181 is shown in FIG. 48. In this example, the converter 181 is a bi-directional boost converter. A further exemplary converter 181 is shown in FIG. 49. In this example, the converter 181 is a merged bi-directional buck-boost converter.

Figure 50:
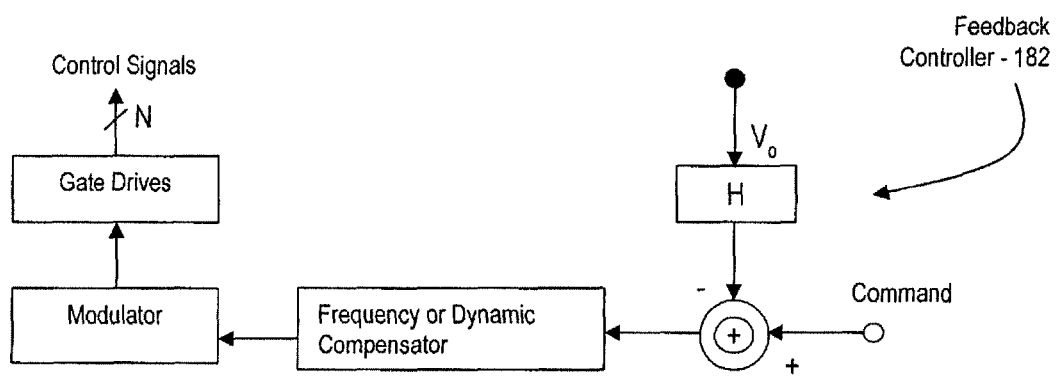

An exemplary embodiment of the feedback controller 182 is provided in FIG. 50. The components shown therein may be implemented in analog or digital domains, or in a combination, as determined appropriate by a designer, manufacturer or user. The feedback controller 182 may include elements for monitoring and controlling various properties. For example, the feedback controller 182 may include components for frequency compensation, pulse width modulation, deadtime protection, duty cycle limiting, providing for a soft start (i.e., ramping voltage) and the like.

High-temperature electronics are used to provide for signal conditioning, telemetry and power electronics, and are generally adapted for operation at temperatures up to as high as about 200 degrees Celsius, and in some embodiments, up to about 300 degrees Celsius. Non-limiting embodiments of high-temperature electronics include discrete and integrated off-the-shelf bare die silicon and silicon-on-insulator active devices as well as silicon carbide active power devices. Some commercially available high temperature rated and low temperature coefficient ceramic passives (COG or NPO dielectrics) and high temperature magnetic passives may be used. In exemplary embodiments, substrate material for circuitry will be polyimide, high temperature epoxy, or AlN (aluminum nitride) ceramics, which are chosen for excellent thermal stability and thermal conductivity. In some of these embodiments, circuit interconnects will be oxidation resistant Au traces. Bonding strategies will employ flip chip or Au wire bonding for bare die active components using AuGe high temperature solder, and/or similar types of bonding. However, for some implementations it is expected that Au wire bonding be advantageous over flip chip bonding due to the added mechanical compliance especially in the presence of thermal expansion and shock and vibration. A non-exhaustive list of suppliers for all of the components above is included in the table below:

TABLE 5

High Temperature Circuit Component Suppliers

| Component | Vendor |
| --- | --- |
| SiC Bare Die Transistors | Micross Components, Los Angeles, CA |
| SiC Bare Die Schottky Diodes | Micross Components, CA |
| Si and SOI Bare Die linear and digital circuits | Minco Technology Labs LLC, Austin, TX |
| Ceramic Surface Mount CGO, NPO capacitors | Digikey, Minneapolis, MN |
| Ceramic Surface Mount Resistors | Digikey, Minneapolis, MN |
| Bare Die Magnetics | Minco Technology Labs LLC, Austin, TX |
| Ceramic Printed Circuit Board | Complete Hermetics, Santa Ana, CA |
| Terminals, Headers, Packages | HCC Ametek Ind., New Bedford, MA |
| AuGe Solder | Hi-Rel Alloys, Ontario CA |

In one embodiment of a charger for the at least one ultracapacitor 10, the electronics include a dual mode feedback regulated buck (down) converter that limits its own current in the case of a low voltage on the at least one ultracapacitor 10 and regulates its voltage otherwise. In some embodiments, the regulated DC/DC converter includes a suitable topology for implementing a wide input voltage feedback regulated boost (up) converter for providing a stable voltage bus.

One skilled in the art will recognize that the power supply 115 may be used in conjunction with technologies and instrumentation in support of resistivity, capacitance, nuclear including pulsed neutron and gamma measuring, passive gamma measuring, as well as others, magnetic resonance imaging, acoustic, and/or seismic measurements, flow measurements, various sampling protocols, communications, data processing and storage, geo-steering and a myriad of other requirements for power use downhole. A great compliment of components may also be powered by the power supply 115. Non-limiting examples include accelerometers, magnetometers, sensors, transducers, digital and/or analog devices (including those listed below) and the like.

Among other things, the production logging instrument 100 enables use of cheaper, stronger, thinner, and higher bandwidth cables and lines. Due to, at least in part, properties of the energy storage 42, the use of conventional copper cable 8 may be replaced with steel cable, fiber optic line and other types of cable and line. In some embodiments, the production logging instrument 100 operates independently, such as when equipped with an on-board generator 41. Exemplary steels include types 304, 304L, 316, and 316L steels as well as carbon steel. Generally a type of steel will be chosen for its resistance to corrosion, mechanical strength and electrical conductivity. 316 stainless steel is a common choice for some long-lived downhole components including cable armor.

By including HTRES in the logging instrument, new types of cables and transmission media become practical. For instance, the HTRES may be slowly charged "trickle charged" over a relatively long period of time, for instance several hours and then provide power to the rest of the logging instrument for normal operation in relatively short bursts, for instance several minutes. In this mode of operation, the resistance of the cable for power transmission may be substantially higher than in the prior art. For example, a cable may be employed with a steel inner conductor in place of prior art cables' copper inner conductor. Holding the diameter fixed, and choosing a carbon steel inner conductor, the cost of the inner conductor material will be approximately 13% of that for a copper inner conductor. The tensile strength of the carbon steel inner conductor will be approximately 7,000% that of the copper inner conductor. However, the resistance of the carbon steel inner conductor will be approximately 8,500% that of the copper inner conductor.

For a 22 AWG inner conductor, a copper conductor would exhibit approximately 16.14 Ohms per 1,000 ft, while a carbon steel inner conductor would exhibit approximately 137 Ohms per 1,000 ft. A typical well may require a cable of approximately 10,000 ft yielding corresponding cable resistances of 161 Ohms and 1,370 Ohms respectively. For a 48 V power supply on the surface, the maximum powers available at the ends of the cables are 3.57 W and 420 mW respectively. While 3.57 W may be enough to run typical logging instruments, 420 mW would be prohibitively limiting. On the other hand, having the HTRES coupled to the logging instrument, the system may trickle charge the HTRES with the available 420 mW until enough energy has been accumulated and then power the loads in a typical logging instrument. This analysis assumes that the cable comprises an outer conducting armor that serves as a second conductor and that the armor presents negligible resistance compared to that for the inner conductor.

The design example above may be permuted in any number of ways. For instance, the cable may be designed to exhibit a smaller outer diameter than prior art cables, again owing to the fact that the trickle charging method accommodates higher resistance in the cable. For instance, a cable may be designed with an inner conductor wire gauge of 22 AWG where an inner conductor wire gauge of 10 AWG was needed for a prior art design. The resulting cable diameter is approximately 25% of the prior art cable in this example. A benefit of the smaller cable diameter is the resulting decrease in obstruction to fluid flow.

The cable may also employ smaller copper inner conductors. It may employ fewer conductors, for instance, in which one conductor transmits all of the required power for the loads rather than transmitting the power over multiple conductors.

In one embodiment, the benefit of a smaller, simplified cable, may be amplified by multi-purposing one or fewer (as compared to prior art designs) conductors. For instance, whereas in prior art designs, multiple conductors were used to provide power for multiple aspects of a logging tool, a single conductor may be used to provide all of the required power. In another example, a single conductor may be used to provide all of the required power for a plurality of logging tools, such as those disposed at distinct locations within the well. In such a design, each of the logging tools may include control of their respective electronics to provide for trickle charging of a respective HTRES, while accommodating power delivery to other tools. For instance, a control algorithm may limit current draw from a cable such that the resulting voltage at other tools accommodates a useful current draw there as well. Such a control algorithm may make use of a-priori known nominal resistance values of the cable used in the application, length of said cable, respective inter-tool lengths of said cable and a physical order of the respective tools along the well-bore. In another example, a single conductor may be multi-purposed for both power and information transmission. Information transmission may be bi-directional, i.e. from the surface to the tool and from the tool to the surface, or it may be unidirectional. For instance, an electrical signal, for example, a sinusoid, may be superposed on a nominal DC voltage. Said superposed sinusoid may be amplitude or frequency modulated to convey information to a tool. Another method includes time multiplexing of power and information transmission. For instance, power may be transferred during a period of time after which information is transferred during a separate period of time. Any number of other methods may be used to combine information and power transmission into one aggregate electrical signal or to multipurpose a one or few cables for information and power transmission.

Because steel is generally more resistant to corrosion and to mechanical stress when compared to copper, different configurations of the cable also become practical. For instance, the cable may be a simple twisted pair of insulated and steel conductors with or without encapsulation but without armor when H2S is not present in substantial concentrations.

Other methods of transmitting power and information may become practical. For instance, fiber optic cable may provide a minimal amount of power and a high rate of information transfer by way of laser light. The relatively minimal amount of transmitted power may be used as a power source for trickle charging the HTRES. For instance, transducers from light power to electrical power include photodiodes and phototransistors. Including such a transducer in a logging tool and coupling said tool to a fiber optic line and coupling said fiber optic line to a source of light on the surface creates a means for transmitting both power and information between the surface and the tool. Advantageously, materials typically used in fabricating a fiber optic line are generally less susceptible to corrosion when compared to electrical (metallic) conductors and so require less protection from the borehole environment.

The use of stronger cable materials despite higher electrical resistivity may also allow for dual use of the cable for electrical transmission and for mechanical purposes. For instance, an armor or encapsulation or otherwise added mechanical support of a cable for protection or added tensile strength in various conveyance methods may not be required when a steel inner conductor is used in place of a copper inner conductor. In a tubing conveyed permanent downhole logging tool, a PDC in prior art designs may be armored to prevent mechanical stress on a copper inner conductor during insertion into the well, even though the PDC may not provide for substantial tensile support. In the current design, a steel inner conductor provides for up to 150% more sheer strength when compared to copper prior art designs, obviating or reducing the need for added protection. In another example, a cable made with steel inner conductor material may be used in production logging activities in which the tool is moved vertically in the well. In this example, the cable provides for substantial tensile support. Such a system may be used for both vertical logging and permanent logging activities, for instance, it may move vertically by way of spooling the cable at the surface and then it may be left in the well at a fixed location for a long period of time, for example, several weeks or months. In some embodiments, a cable may make use of steel inner conductors or steel conductors in parallel, twisted, or otherwise paired configurations. Other materials for said conductor may also be employed as seen fit by the designer to achieve tradeoffs in mechanical strength, resistance to corrosion, temperature stability, electrical resistance, mechanical density or otherwise. Examples of other potentially useful materials include titanium, aluminum, nickel, silver, gold and alloys.

Other embodiments of ultracapacitors may be used for the energy storage 42. Further, embodiments of batteries may be used with or in place of an ultracapacitor.

Having described aspects of the production logging instrument 100 and some of the capabilities thereof, it should now be apparent that producers may make use of data collected from production logging in a variety of ways. For example, dynamic mapping of production areas may be realized, where production between various wells are related. The various parameters tracked and evaluated may be used to predict meaningful information, such as locations of future wells, depletion of wells, assessment of current status and the like. Such activities may be greatly enhanced by the use of software running on a computer (i.e., machine executable instructions stored on machine readable media).

Having thus described certain aspects of the invention, additional benefits and features are now discussed. By making use of the production logging instrument provided herein, users are provided with capabilities to characterize and monitor conditions downhole on a continuing basis. Measurements may be performed on a real time basis, a near real time basis, or periodically as determined appropriate and as otherwise described herein.

In support of the teachings herein, various analysis components may be used, including a digital system and/or an analog system. The system(s) may have components such as a processor, storage media, memory, input, output, various communications links (wired, wireless, pulsed fluid, optical or other), user interfaces, software and firmware programs, signal processors (digital or analog) and other such components (such as resistors, capacitors, inductors, pumps, sensors, fluid storage, sampling apparatus and other such components) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus comprising:
a logging system configured to be permanently installed at a downhole location, the logging system comprising:
a logging instrument including a rechargeable energy storage and electronics;
wherein:
the electronics comprises an electromagnetic telemetry transmitter configured to transmit information to a surface location;
the rechargeable energy storage comprises at least one rechargeable ultracapacitor coupled to an energy supply permanently installed at a downhole location;
the rechargeable energy storage is configured to be repetitively charged using energy from the energy supply for periods of a first duration at a first power level, and to repetitively provide energy to the electronics for periods of a second duration at a second power level, wherein the first duration is longer than the second duration and the first power level is less than the second power level; and
the rechargeable ultracapacitor is configured to have a leakage current of less than 1 Ampere per liter and a maximum rated operating voltage of at least 0.5 Volts.

2. An apparatus as defined in claim 1, wherein the rechargeable energy storage is a high temperature rechargeable energy storage configured to operate at temperatures greater than 125° C.

3. An apparatus as defined in claim 2, wherein the high temperature rechargeable energy storage is configured to operate at temperatures greater than 210° C.

4. An apparatus as defined in claim 1, wherein the energy supply comprises a generator configured to generate electrical energy in response to a flow of fluid through a wellbore.

5. An apparatus as defined in claim 1, wherein at least a portion of the logging system is fixed to a portion of wellbore casing.

6. An apparatus as defined in claim 1, wherein the logging electronics are configured to operate during selected time periods to transmit logging data via the electromagnetic transmitter to the surface location.

7. An apparatus as defined in claim 6, wherein the logging electronics are configured to operate in a high power mode during the selected time periods and in a lower power or off mode at times between the selected time periods.

8. A method comprising:
permanently installing a logging system at a downhole location, the logging system comprising a logging instrument including a rechargeable energy storage and electronics, wherein:
the rechargeable energy storage comprises at least one rechargeable ultracapacitor coupled to an energy supply permanently installed at a downhole location, the ultracapacitor configured to have a leakage current of less than 1 Ampere per liter and a maximum rated operating voltage of at least 0.5 Volts; and
the electronics comprises an electromagnetic telemetry transmitter configured to transmit information to a surface location;
repetitively charging the rechargeable energy storage with energy from the energy supply for periods of a first duration at a first power level,
repetitively providing energy from the rechargeable energy storage to the electronics for periods of a second duration at a second power level, wherein the first duration is longer than the second duration and the first power level is less than the second power level.

9. The method of claim 8, comprising operating the high temperature rechargeable energy storage at temperatures greater than 125° C.

10. The method of claim 8, comprising operating the high temperature rechargeable energy storage at temperatures greater than 150° C.

11. The method of claim 8, comprising operating the high temperature rechargeable energy storage at temperatures greater than 210° C.

12. The method of claim 8, using the energy supply to generate electrical energy in response to a flow of fluid through a wellbore.

13. The method of claim 8, wherein at least a portion of the logging system is fixed to a portion of wellbore casing, and wherein permanently installing a logging system at a downhole location comprises inserting the portion of wellbore casing into the wellbore.

* * * * *